(12) United States Patent
Atsumi

(10) Patent No.: US 12,202,593 B2
(45) Date of Patent: Jan. 21, 2025

(54) WORK DEVICE PROVIDED WITH A CYLINDRICAL ROTATING BODY

(71) Applicant: ATSUMI REAL ESTATE & CORPORATION, INC., Tokyo (JP)

(72) Inventor: Kazuya Atsumi, Tokyo (JP)

(73) Assignee: ATSUMI REAL ESTATE & CORPORATION, INC., Tokyo (JP)

( * ) Notice: Subject to any disclaimer, the term of this patent is extended or adjusted under 35 U.S.C. 154(b) by 490 days.

(21) Appl. No.: 17/598,851

(22) PCT Filed: Mar. 26, 2020

(86) PCT No.: PCT/JP2020/013611
§ 371 (c)(1),
(2) Date: Sep. 27, 2021

(87) PCT Pub. No.: WO2020/196733
PCT Pub. Date: Oct. 1, 2020

(65) Prior Publication Data
US 2022/0194556 A1  Jun. 23, 2022

(30) Foreign Application Priority Data

Mar. 28, 2019 (JP) .................................. 2019-063167

(51) Int. Cl.
*B64C 11/46* (2006.01)
*B64C 39/02* (2023.01)
(Continued)

(52) U.S. Cl.
CPC .............. *B64C 11/46* (2013.01); *B64C 39/02* (2013.01); *B64U 10/13* (2023.01); *B64U 2101/00* (2023.01); *B64U 2201/20* (2023.01)

(58) Field of Classification Search
CPC ........................... B64U 30/293; B64U 30/296
See application file for complete search history.

(56) References Cited

U.S. PATENT DOCUMENTS 4,383,401 A    5/1983   Lessard et al.
9,051,050 B2 *  6/2015   Achtelik ................ B64U 20/50
                         (Continued)

FOREIGN PATENT DOCUMENTS

CN         104859836 A    8/2015
JP         201595987 A    5/2015
                         (Continued)

OTHER PUBLICATIONS

Office Action in JP Application No. 2020-543120, mailed Apr. 20, 2021, 18pp.

*Primary Examiner* — Philip J Bonzell
*Assistant Examiner* — Michael B. Kreiner
(74) *Attorney, Agent, or Firm* — HAUPTMAN HAM, LLP

(57) ABSTRACT

An apparatus including a cylindrical rotating body having a surface section that functions as a driving wheel or a working member. The apparatus includes a main body, a cylindrical rotating body disposed below the main body, and a control unit configured to control driving of the cylindrical rotating body, where the cylindrical rotating body includes a motor, and an exterior body configured to be rotated by the motor, and the exterior body or a member provided on a surface of the exterior body functions as a driving wheel or a working member.

12 Claims, 63 Drawing Sheets

(51) Int. Cl.
*B64U 10/13* (2023.01)
*B64U 101/00* (2023.01)

(56) References Cited

U.S. PATENT DOCUMENTS

| | | | | |
|---|---|---|---|---|
| 9,914,537 | B2 * | 3/2018 | Wu | B64U 30/291 |
| 10,407,162 | B2 * | 9/2019 | Datta | B64D 27/40 |
| 10,562,622 | B2 * | 2/2020 | Baek | B64C 27/14 |
| 10,703,459 | B2 * | 7/2020 | Yang | B64C 29/0033 |
| 11,453,480 | B2 * | 9/2022 | Poltorak | B64U 30/24 |
| 11,554,856 | B2 * | 1/2023 | Yamato | B64C 27/16 |
| 11,702,202 | B1 * | 7/2023 | Anderson | B64C 1/30 |
| | | | | 244/17.23 |
| 2013/0206915 | A1 * | 8/2013 | Desaulniers | B64U 10/20 |
| | | | | 244/165 |
| 2016/0159471 | A1 * | 6/2016 | Chan | B64D 47/08 |
| | | | | 244/39 |
| 2016/0340028 | A1 | 11/2016 | Datta | |
| 2018/0086442 | A1 | 3/2018 | Regev | |

FOREIGN PATENT DOCUMENTS

| | | |
|---|---|---|
| JP | 2017525621 A | 9/2017 |
| JP | 201918623 A | 2/2019 |

* cited by examiner

[Fig.1]
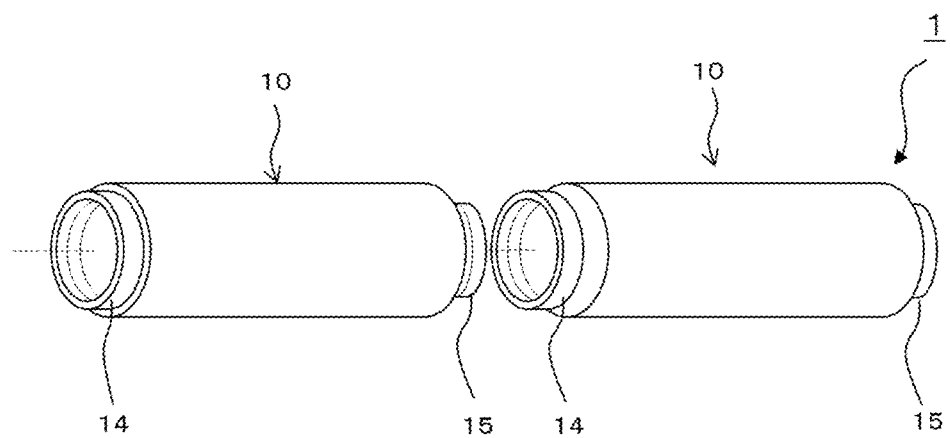

[Fig.2A] 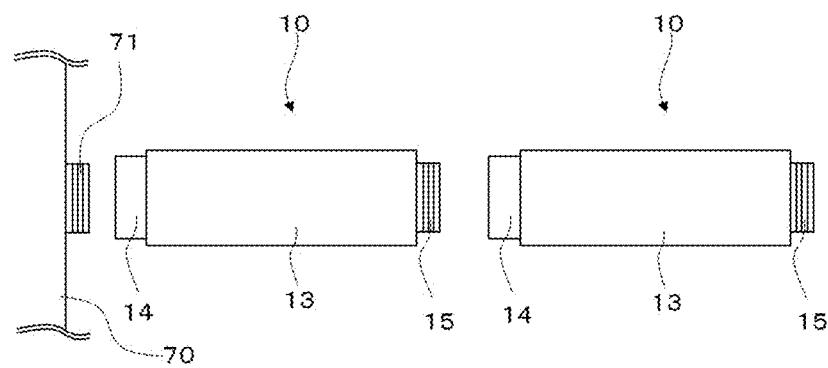
[Fig.2B] 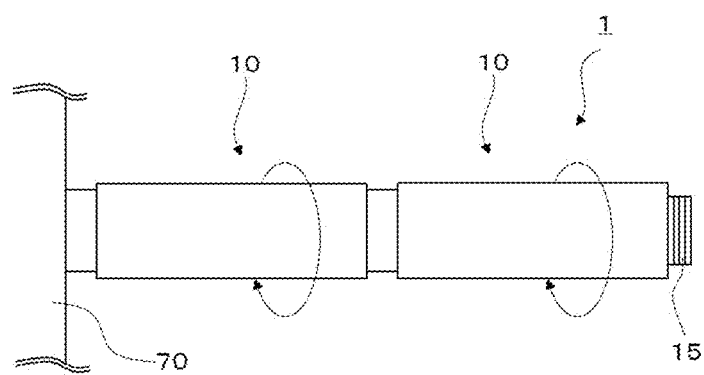
[Fig.2C] 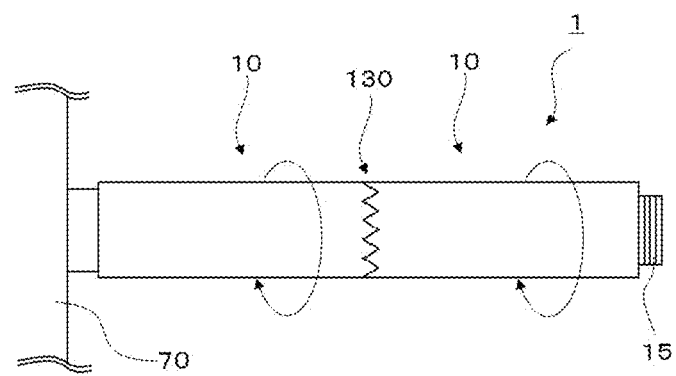

[Fig.3]
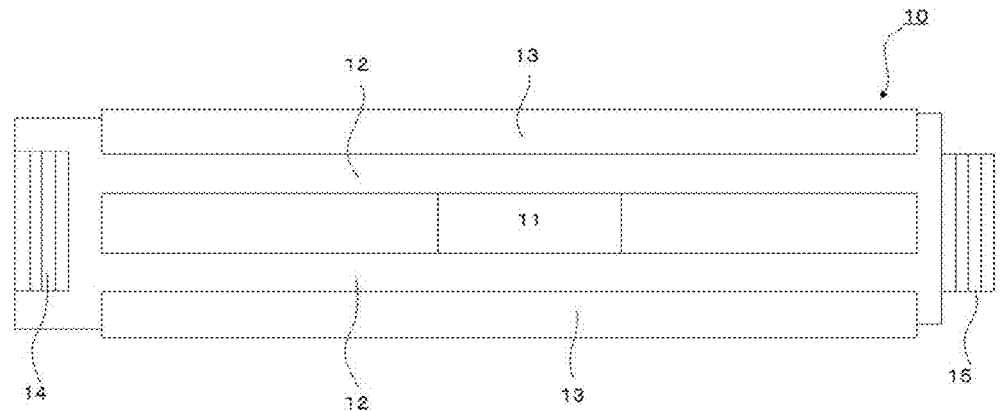
[Fig.4A]
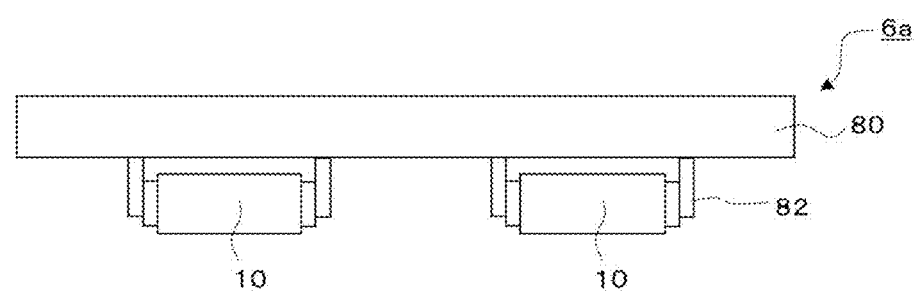
[Fig.4B]
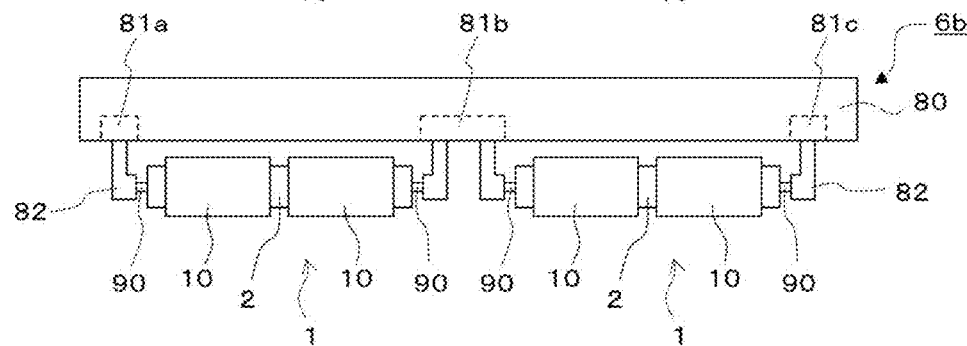
[Fig.4C]
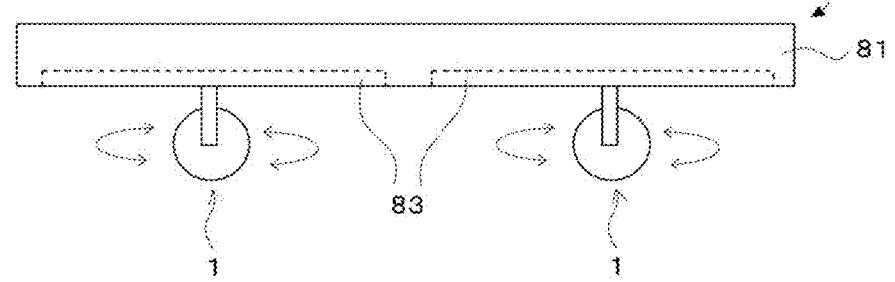

[Fig.5A]
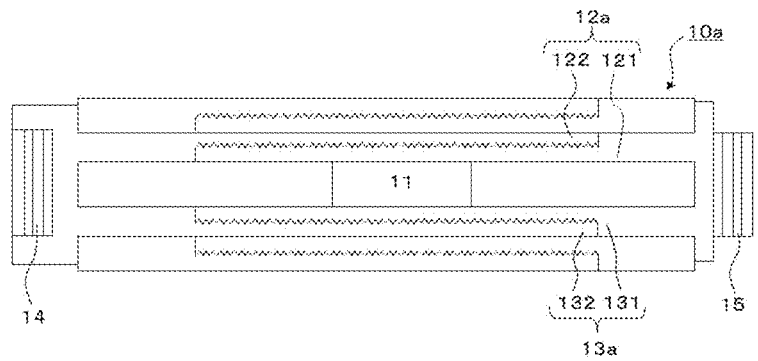
[Fig.5B]
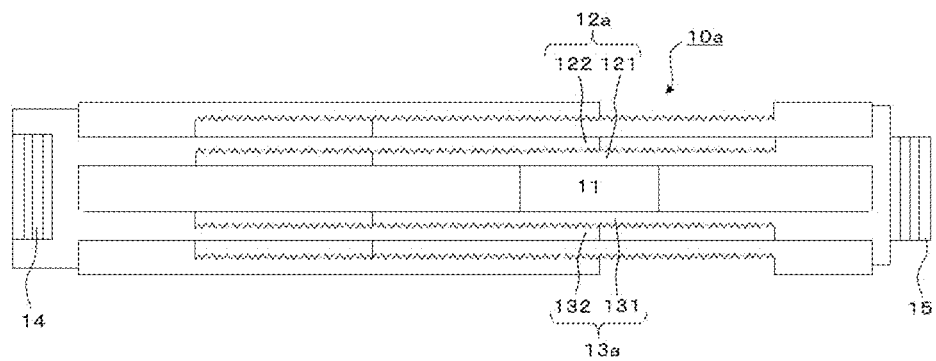
[Fig.6]
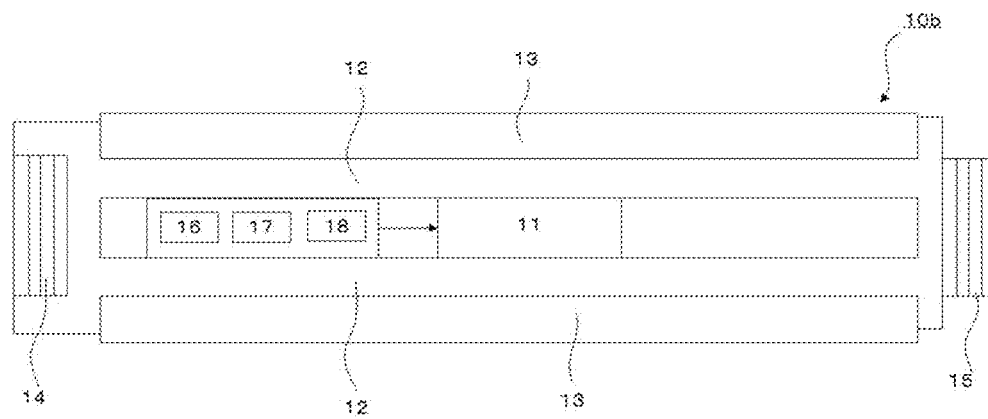

[Fig.7]
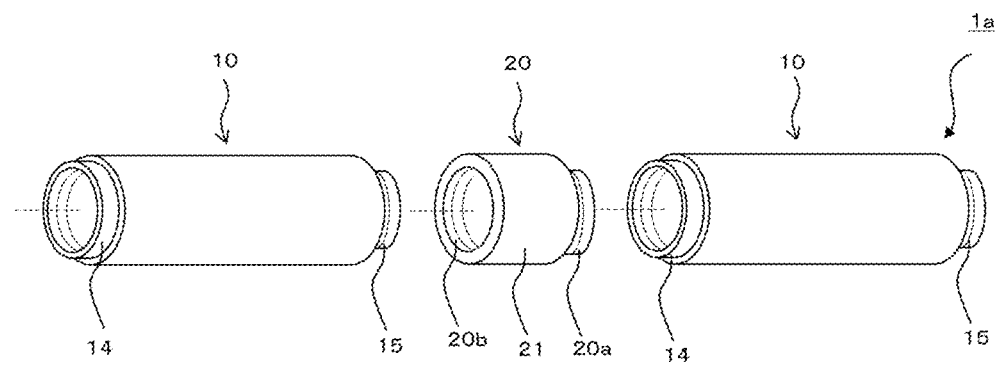
[Fig.8]
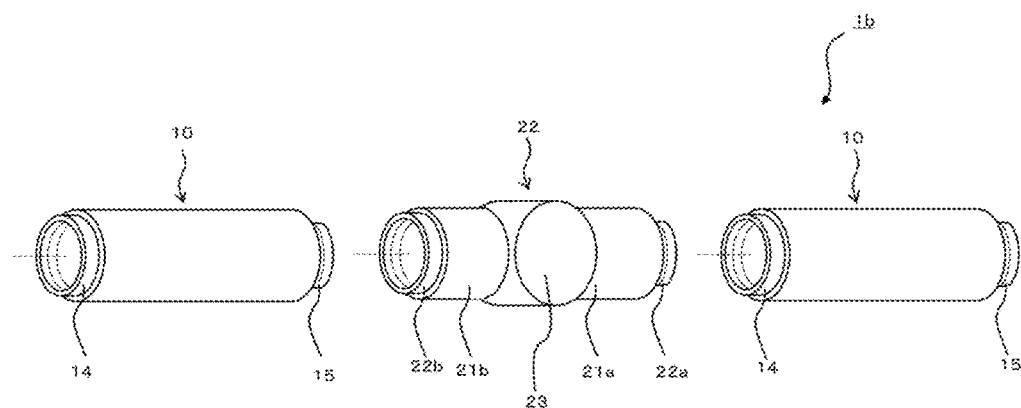

[Fig.9]
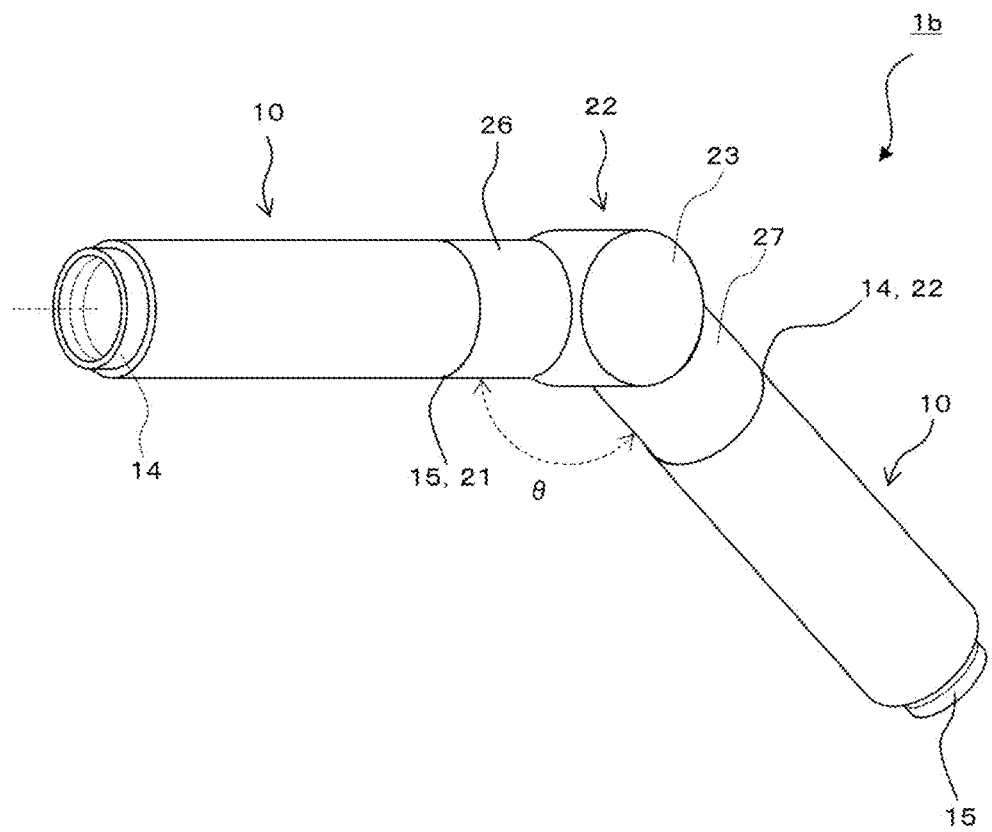

[Fig.10A]
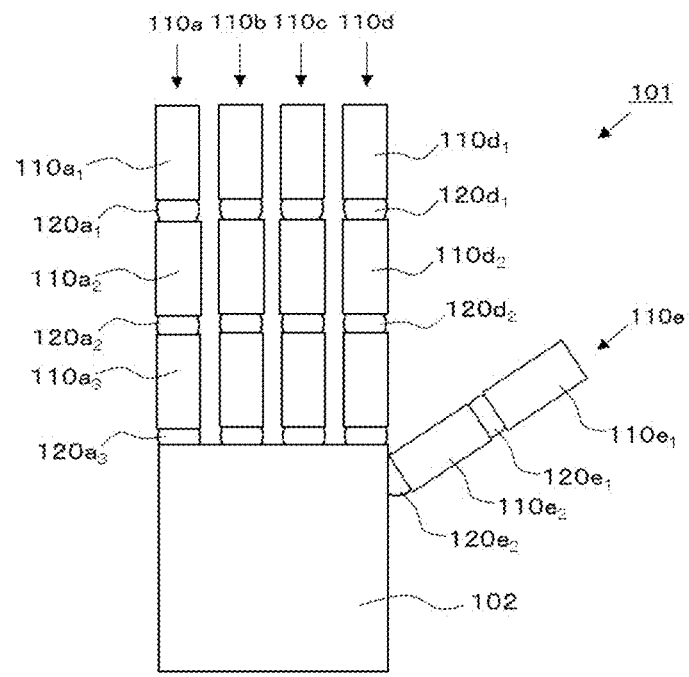
[Fig.10B]
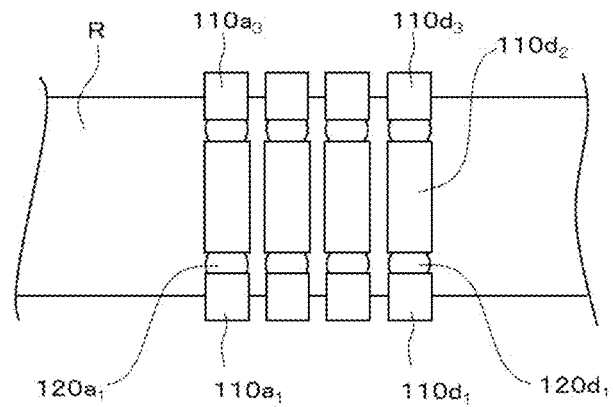
[Fig.10C]
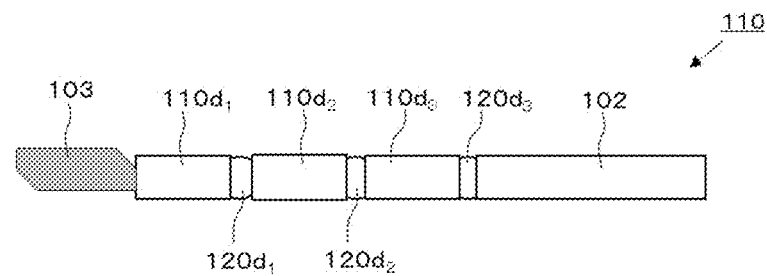

[Fig.11]
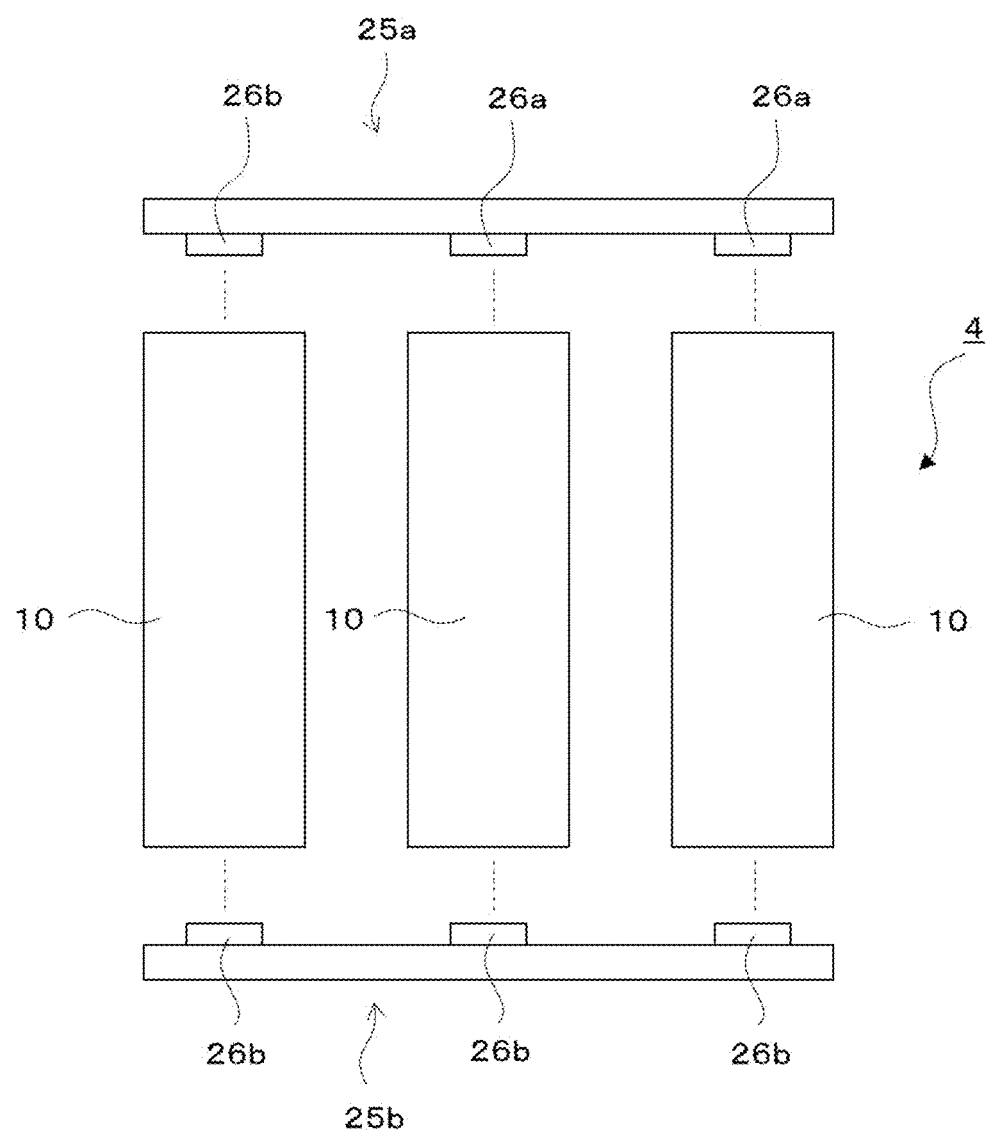

[Fig.12]
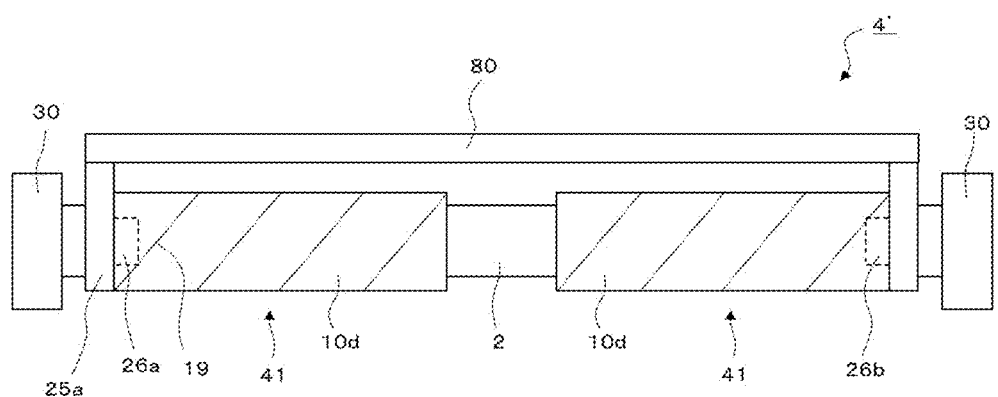

[Fig.13A]
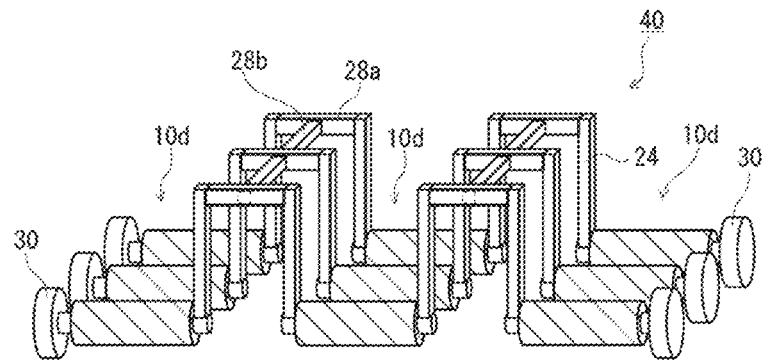
[Fig.13B]
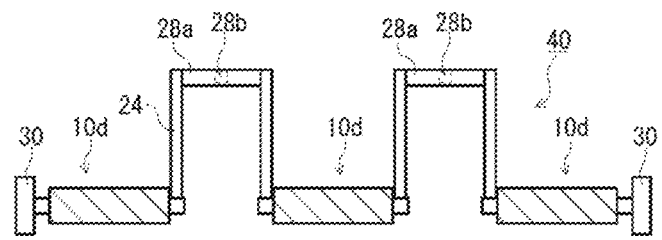
[Fig.13C]
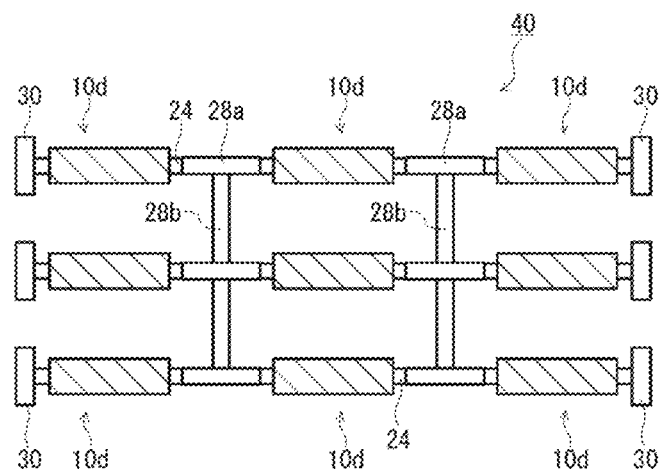
[Fig.13D]
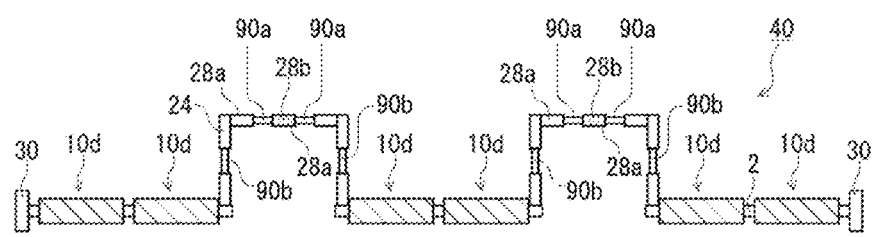

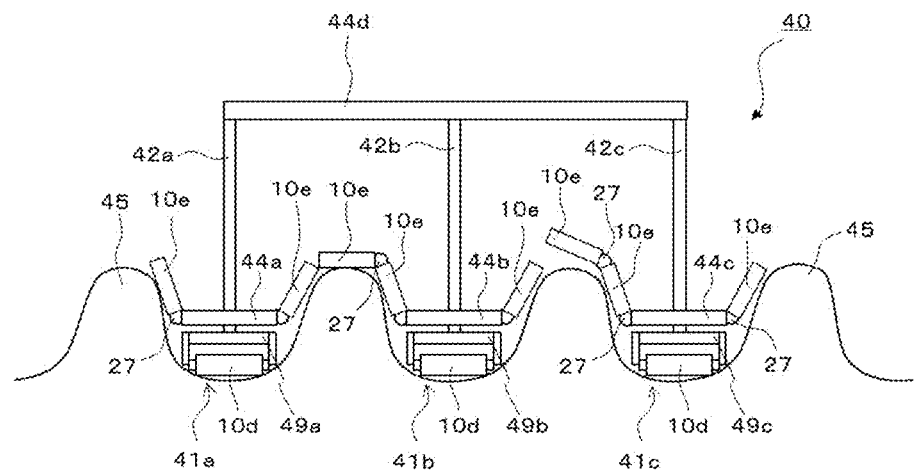
[Fig.14A]
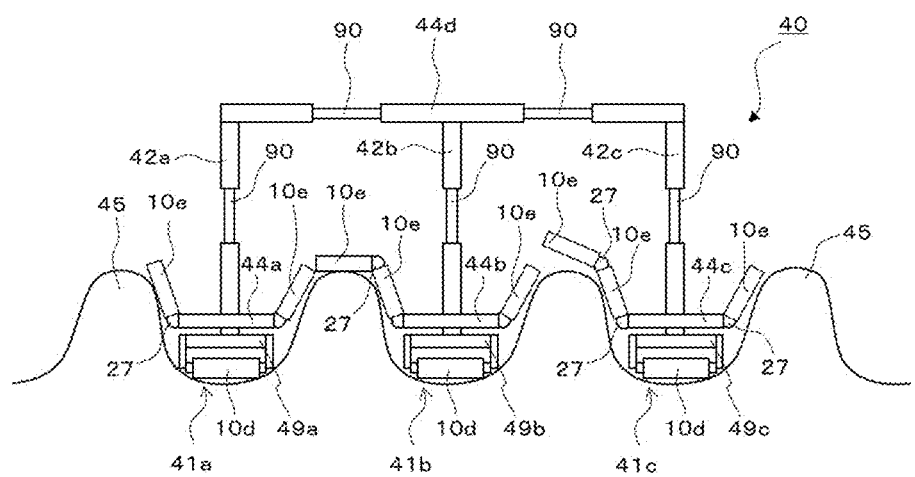
[Fig.14B]
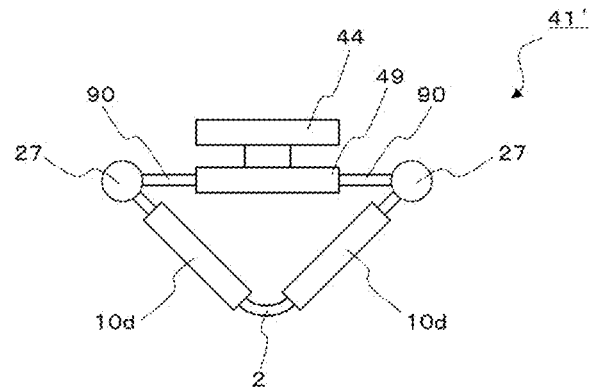
[Fig.14C]

[Fig.15]
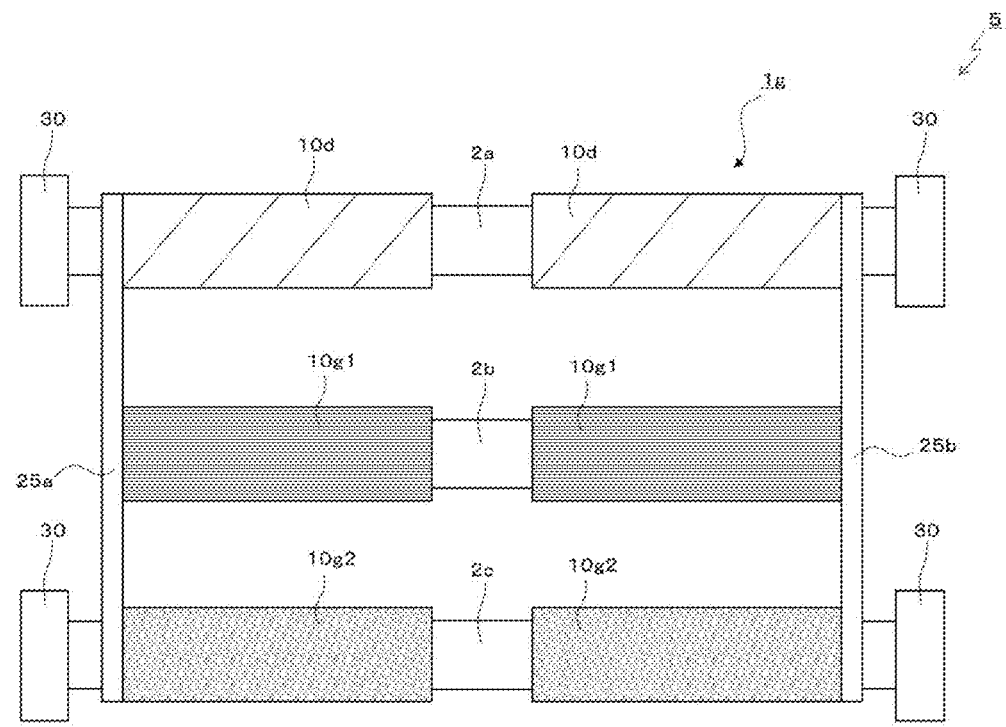
[Fig.16A]   [Fig.16B]   [Fig.16C]
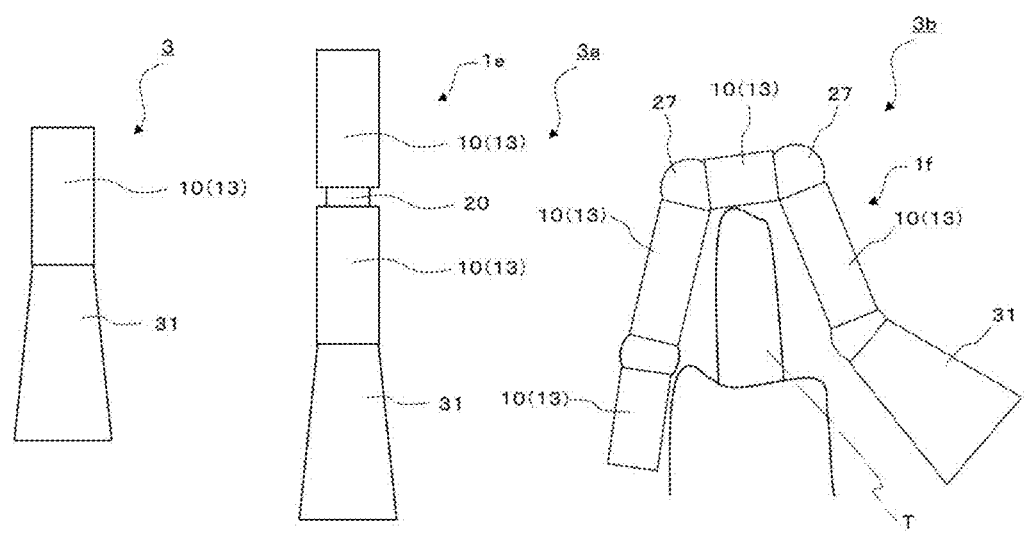

[Fig.17A] 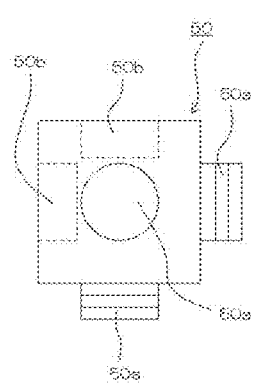
[Fig.17B] 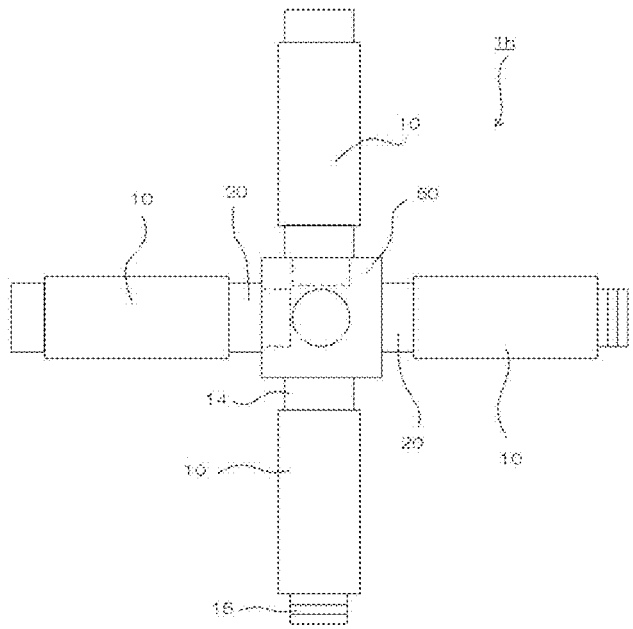

[Fig.18A]
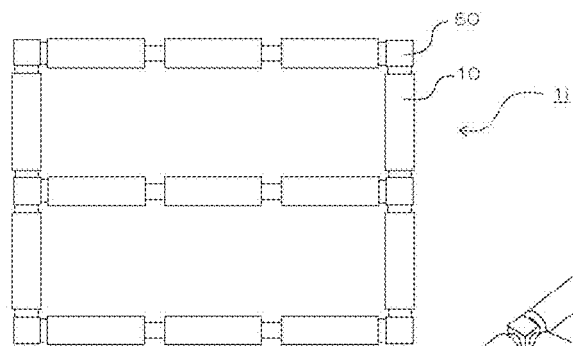
[Fig.18B]
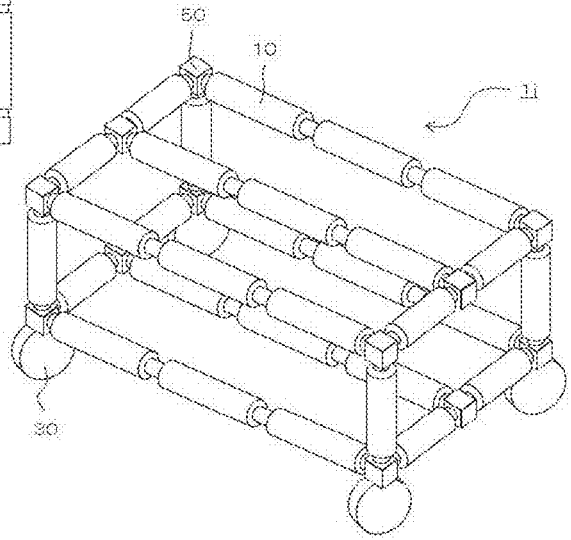
[Fig.18C]
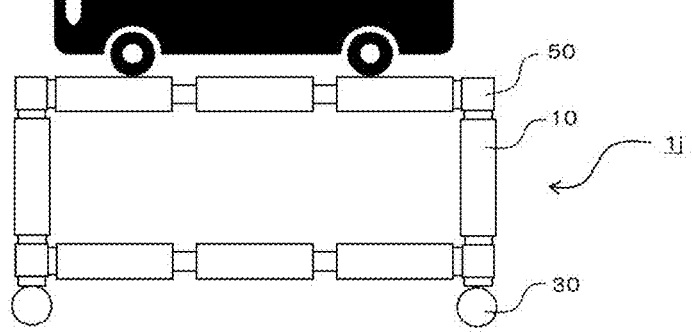

[Fig.19]
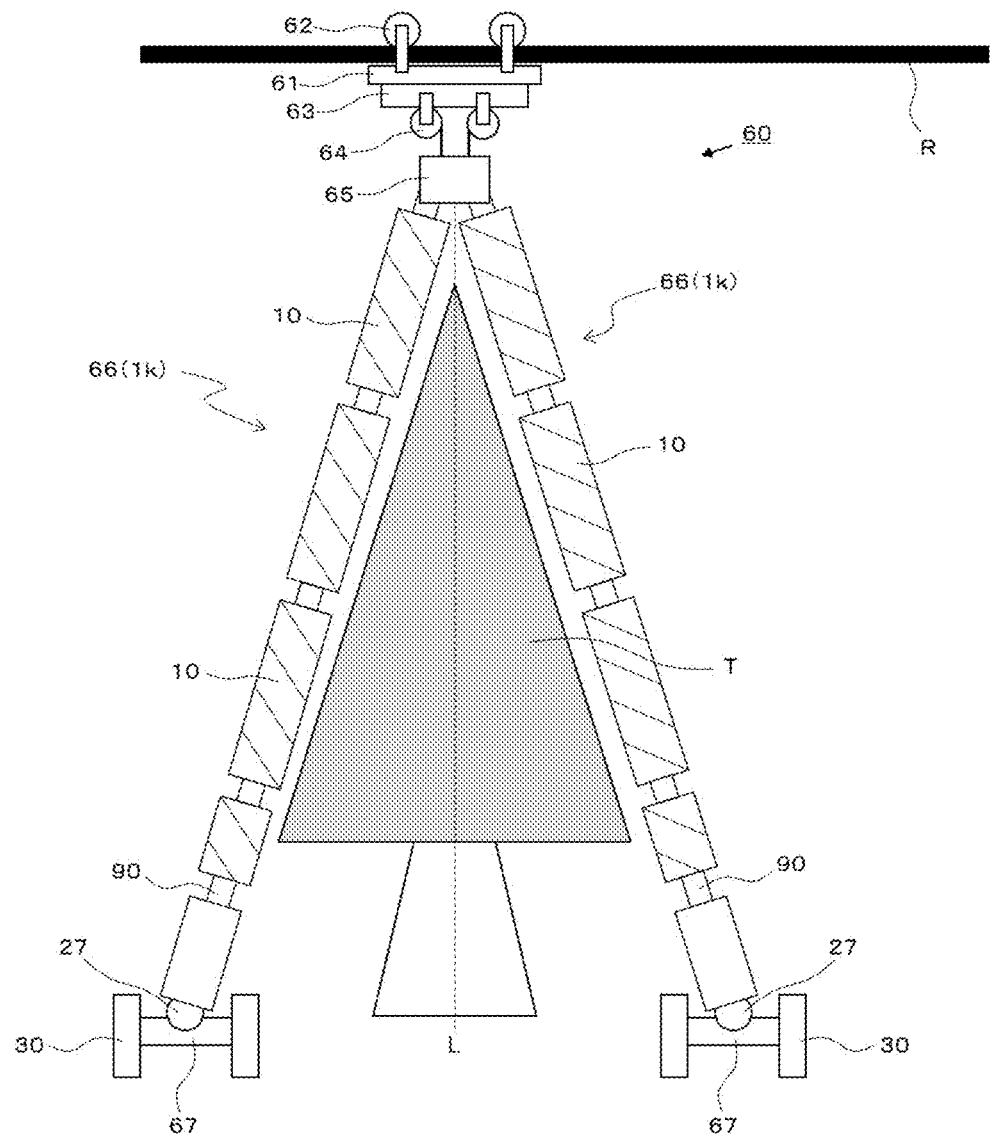

[Fig.20A]
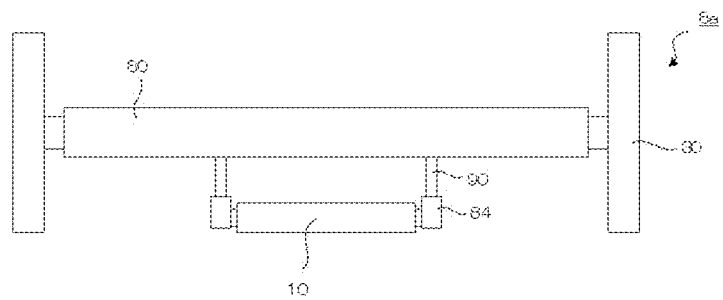
[Fig.20B]
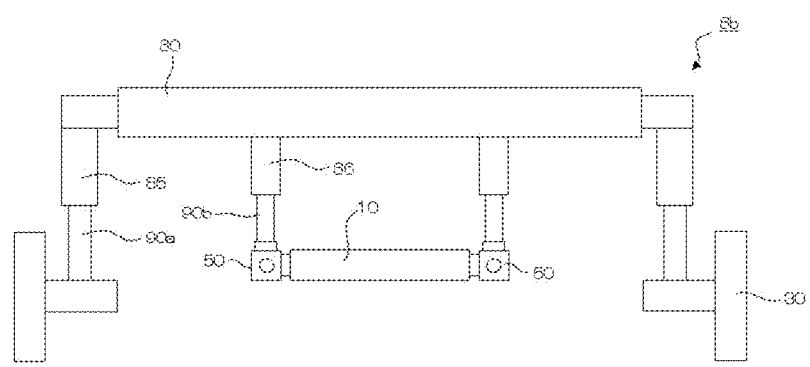
[Fig.20C]
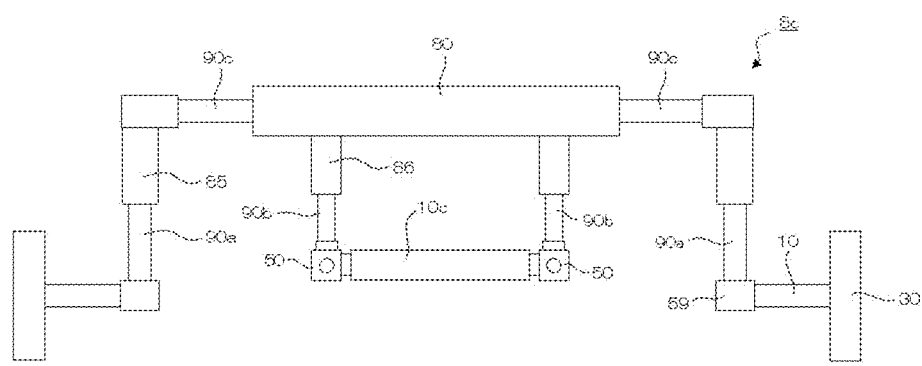

[Fig.21]
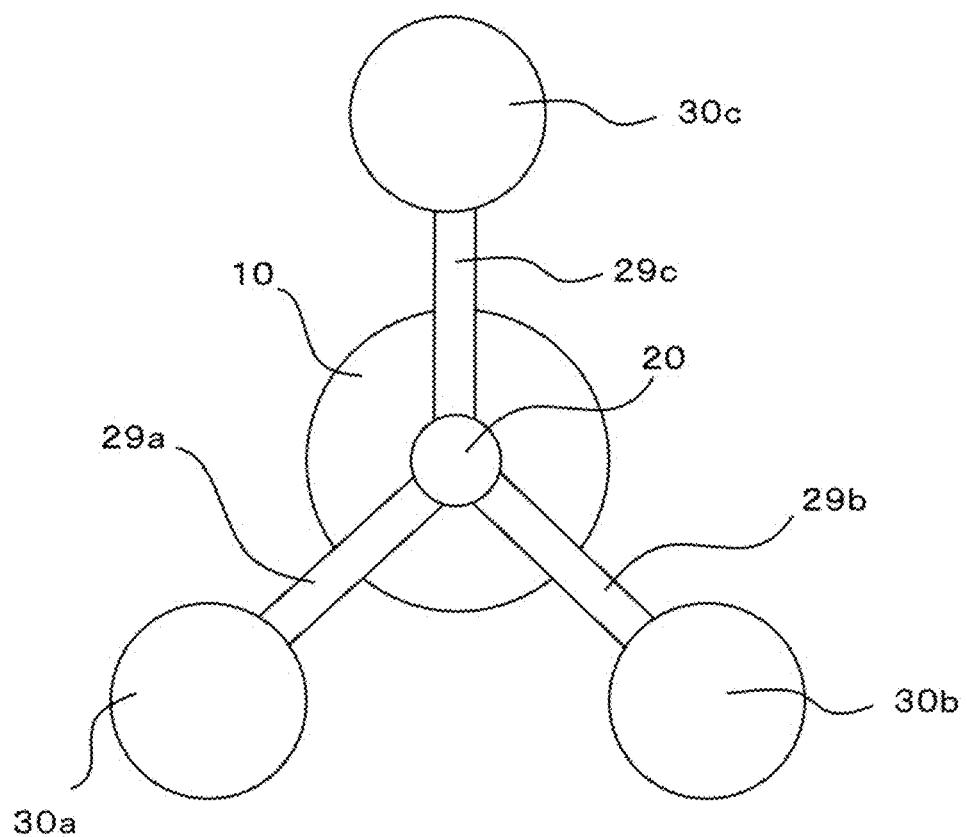

[Fig.22A]
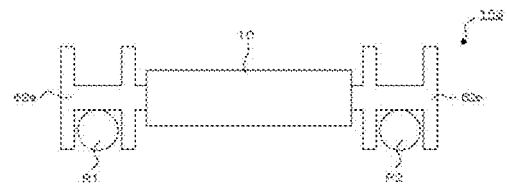
[Fig.22B]
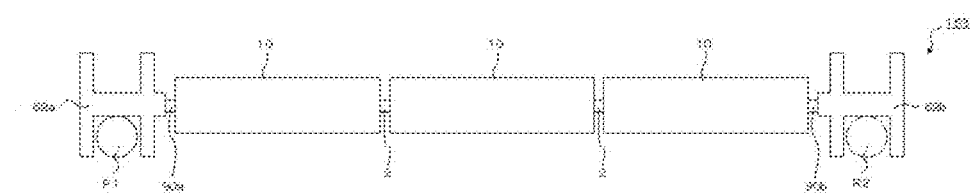
[Fig.23A] [Fig.23B]
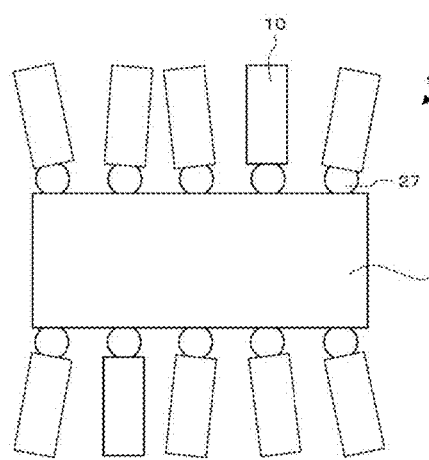 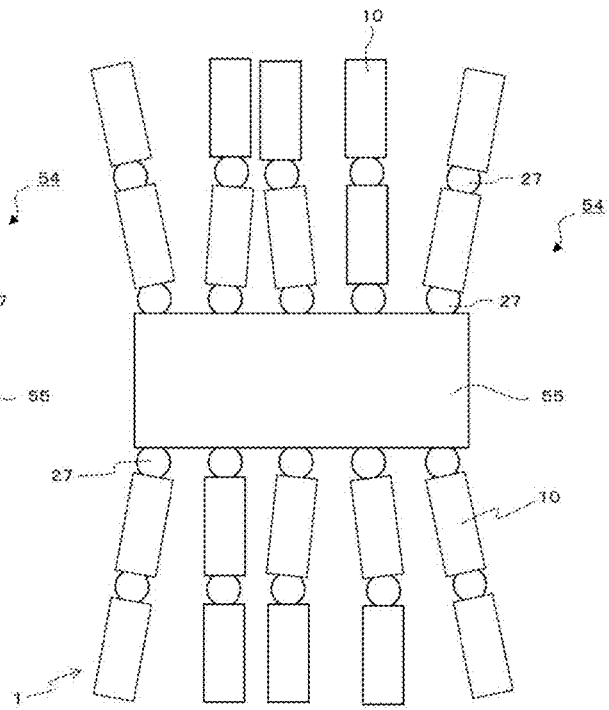

[Fig.24A]
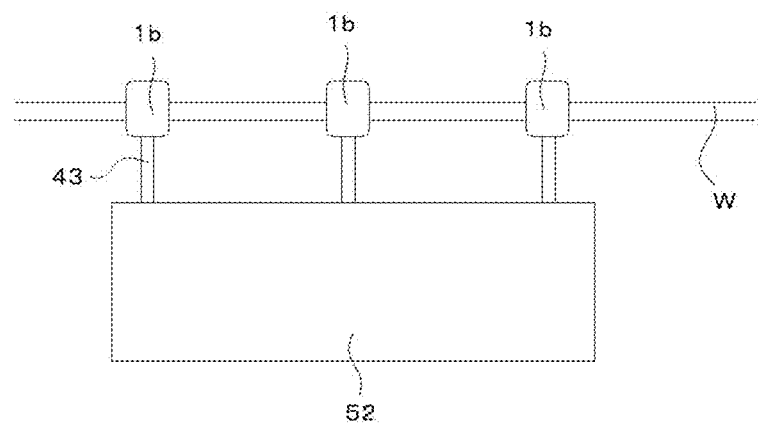
[Fig.24B]                    [Fig.24C]
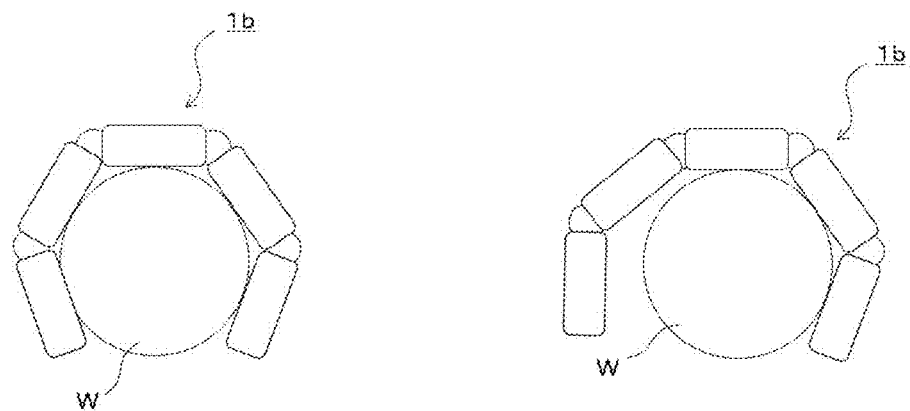

[Fig.25A]
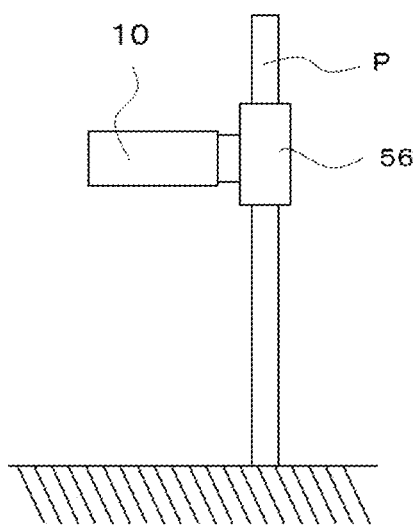
[Fig.25B]
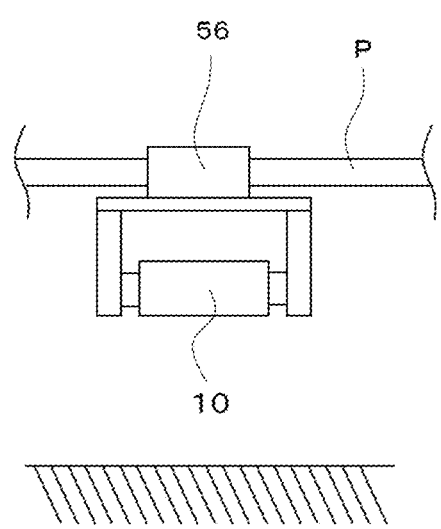

[Fig.26A]
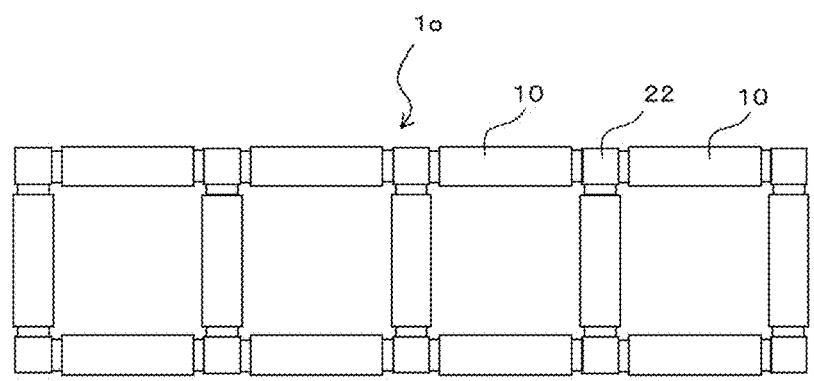
[Fig.26B]
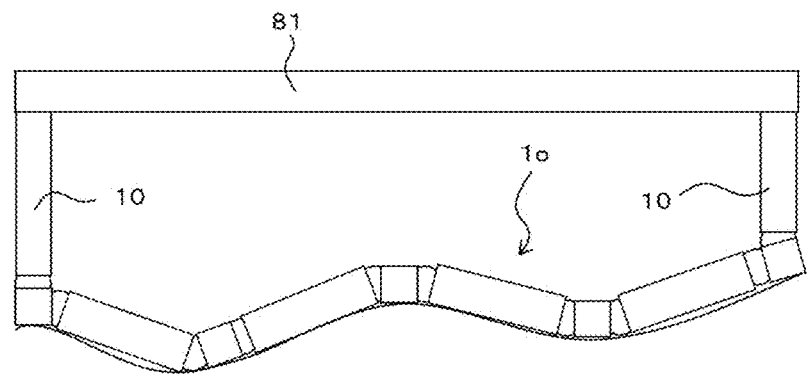

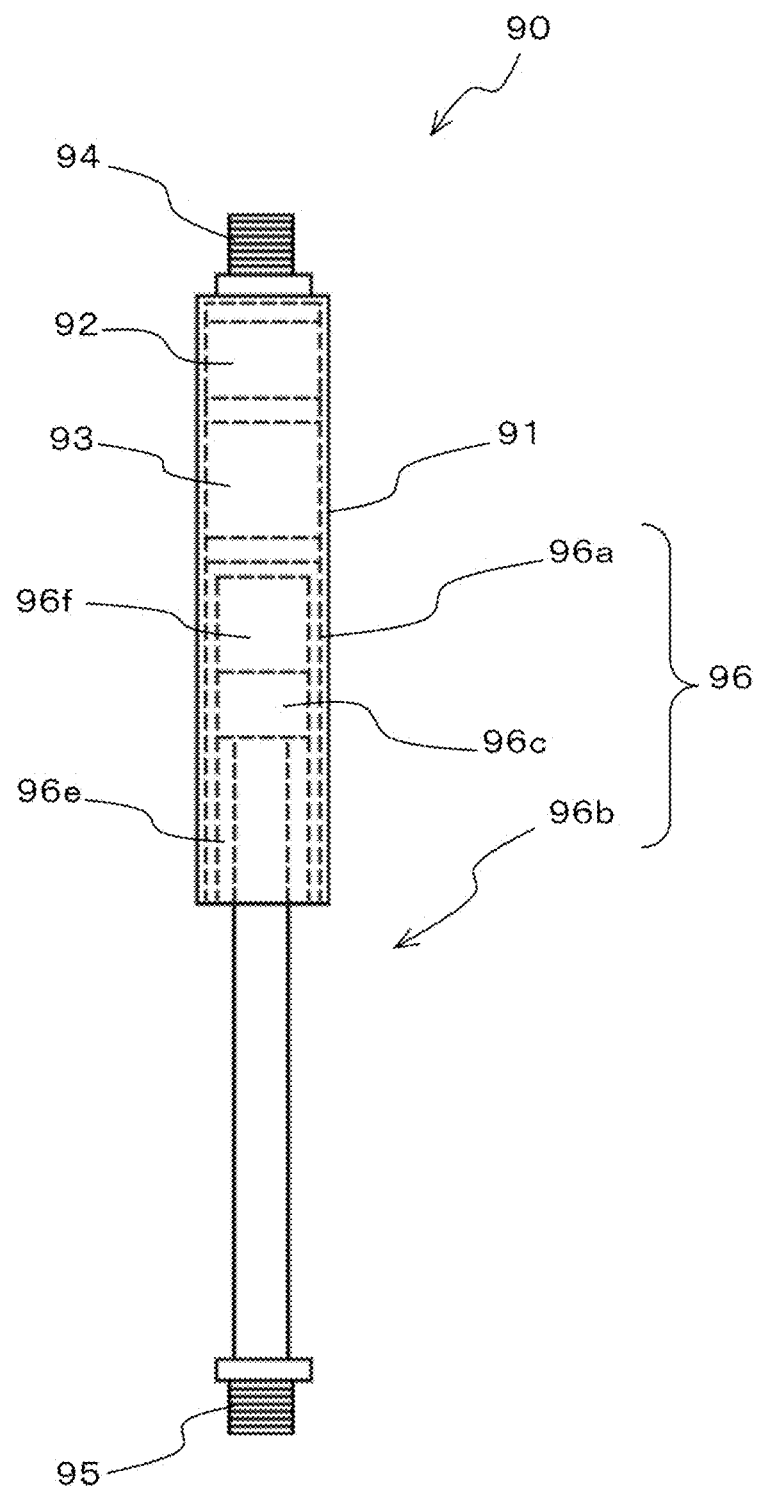
[Fig.27]

[Fig.28]
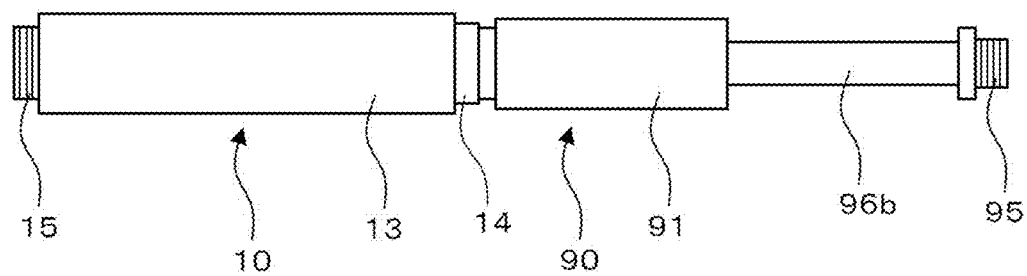
[Fig.29]
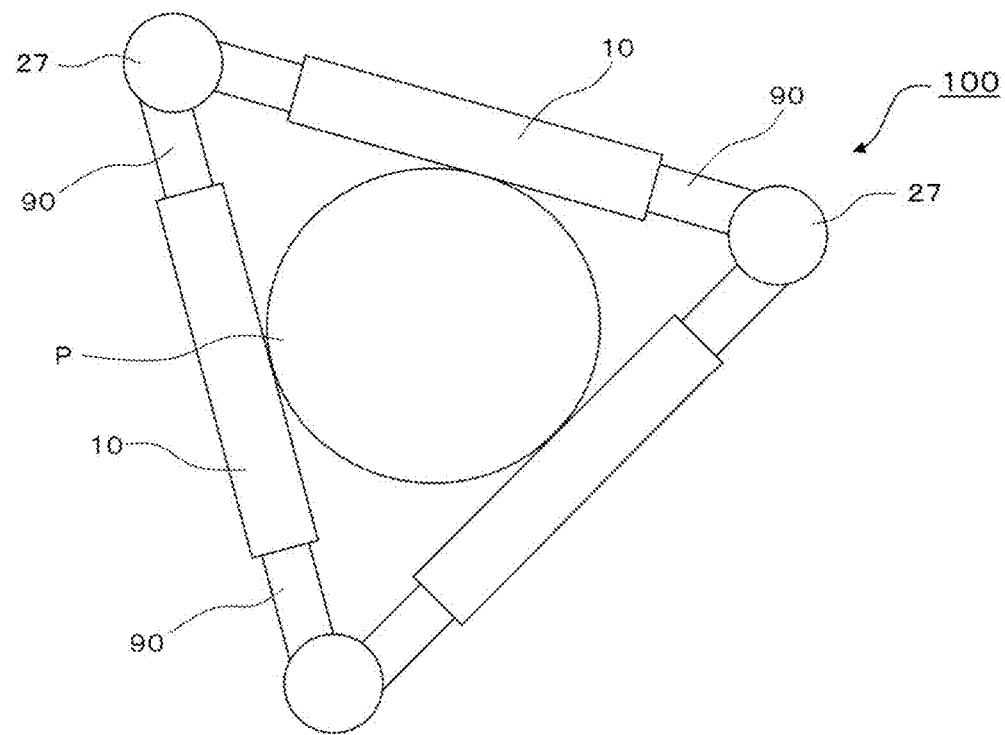

[Fig.30]
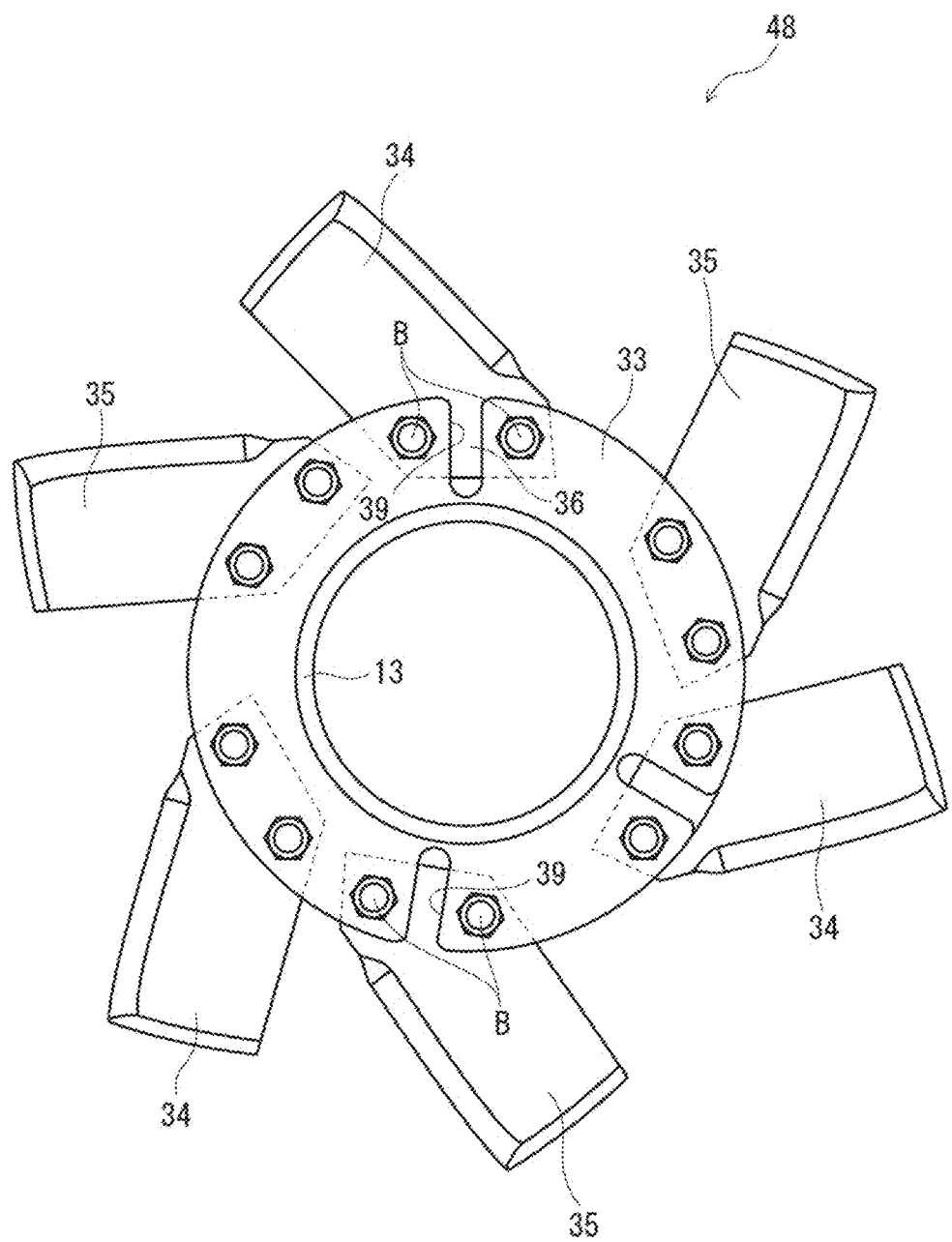

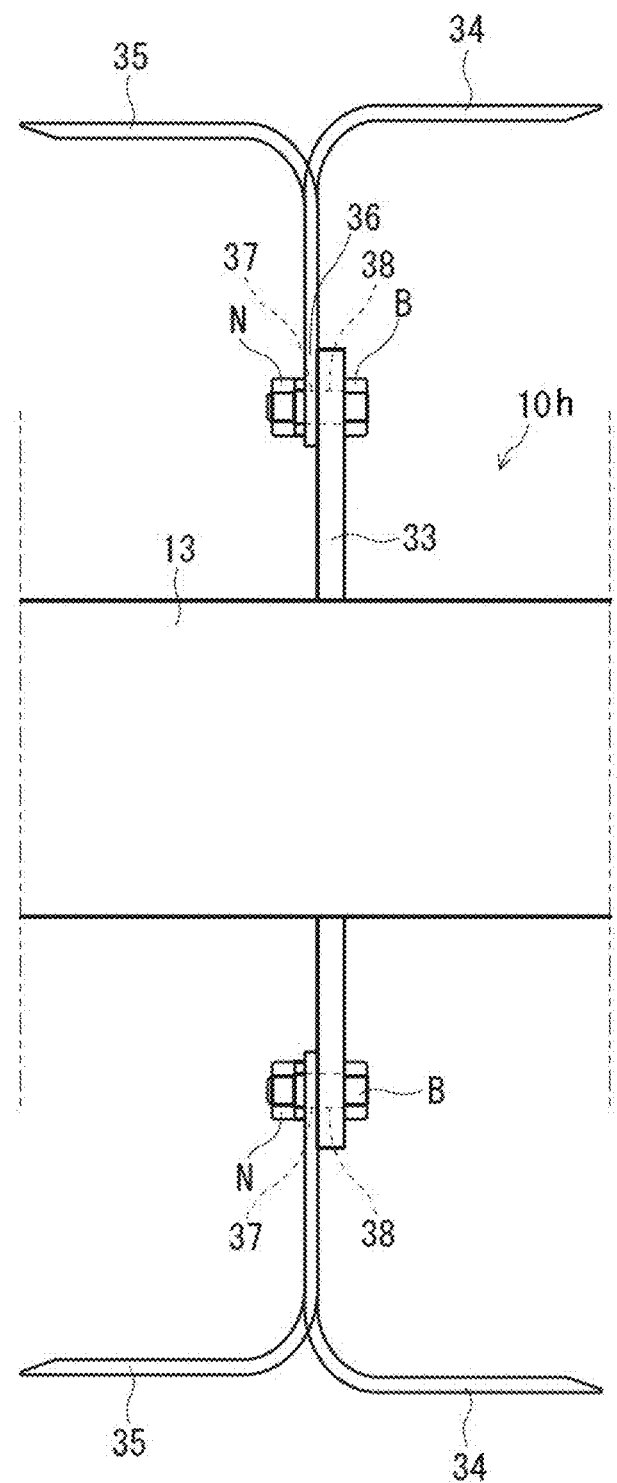
[Fig.31]

[Fig.32A]
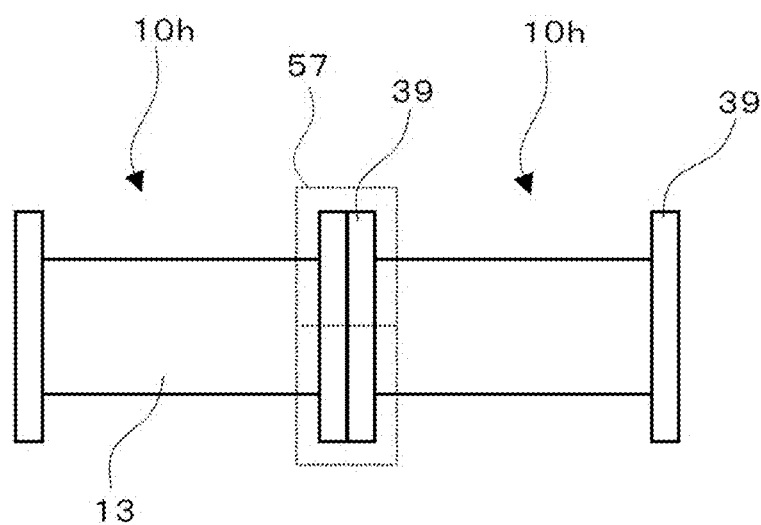
[Fig.32B]
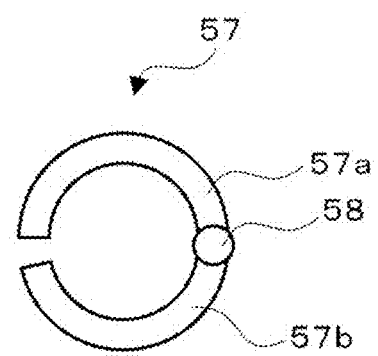

[Fig.33]
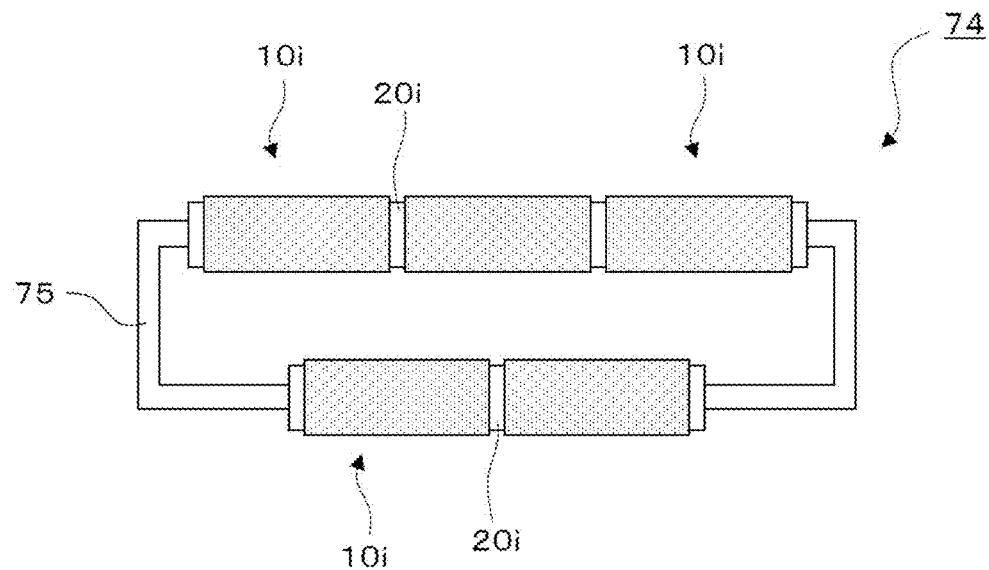
[Fig.34]
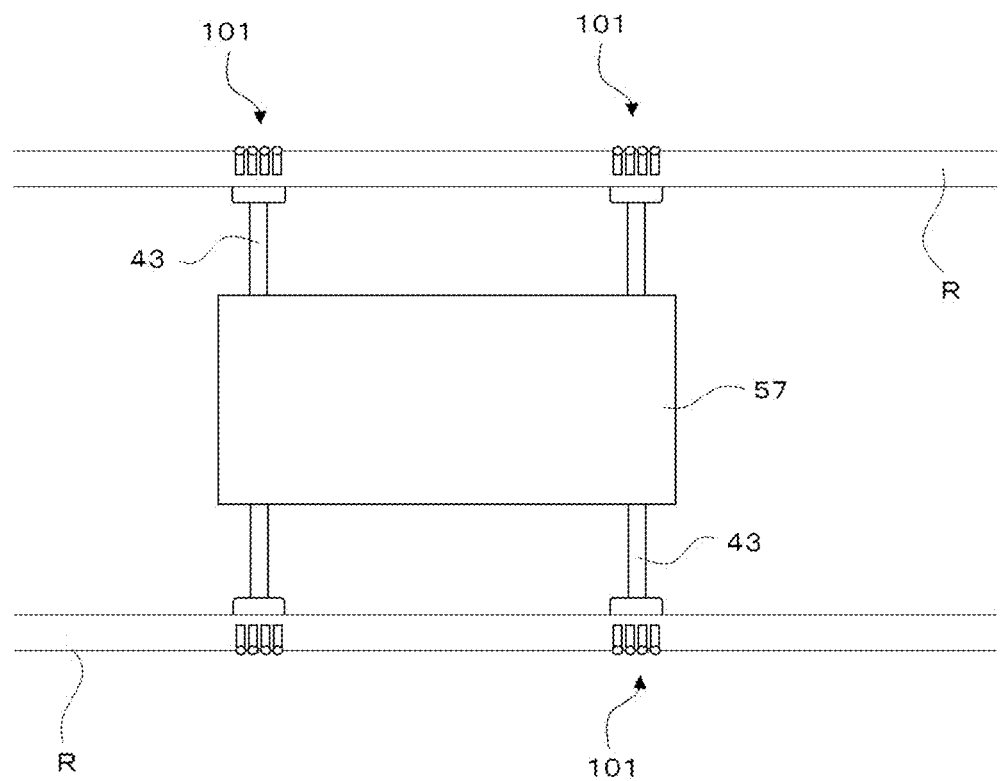

[Fig.35]
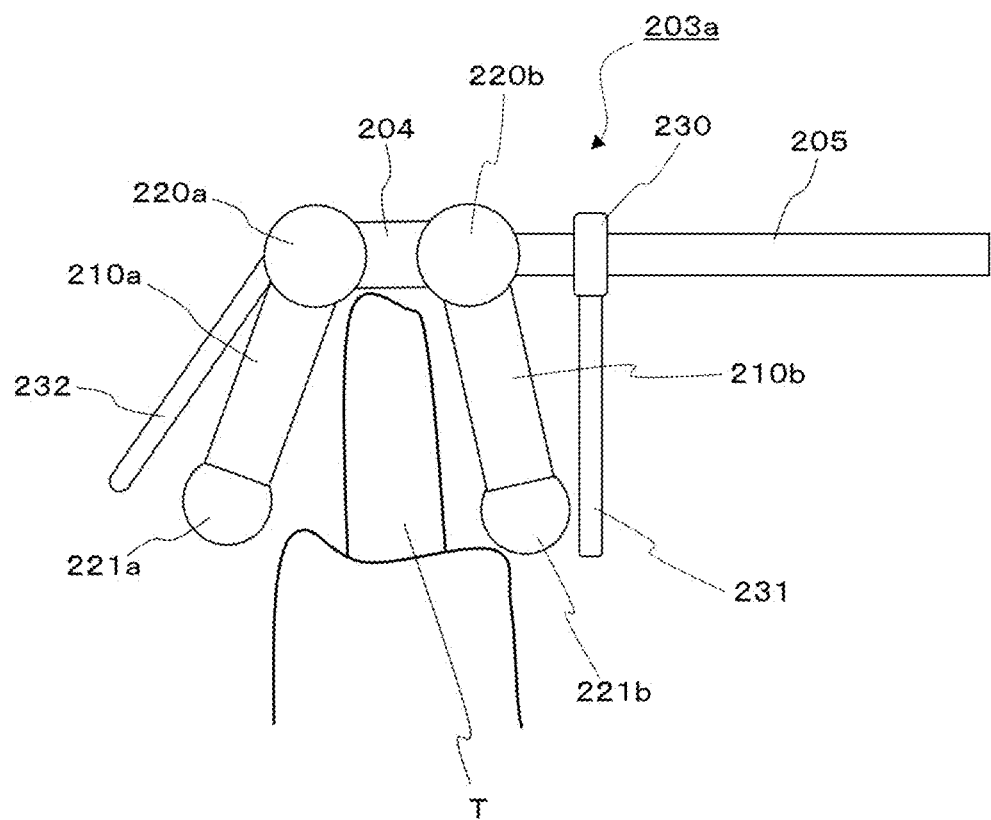

[Fig.36]
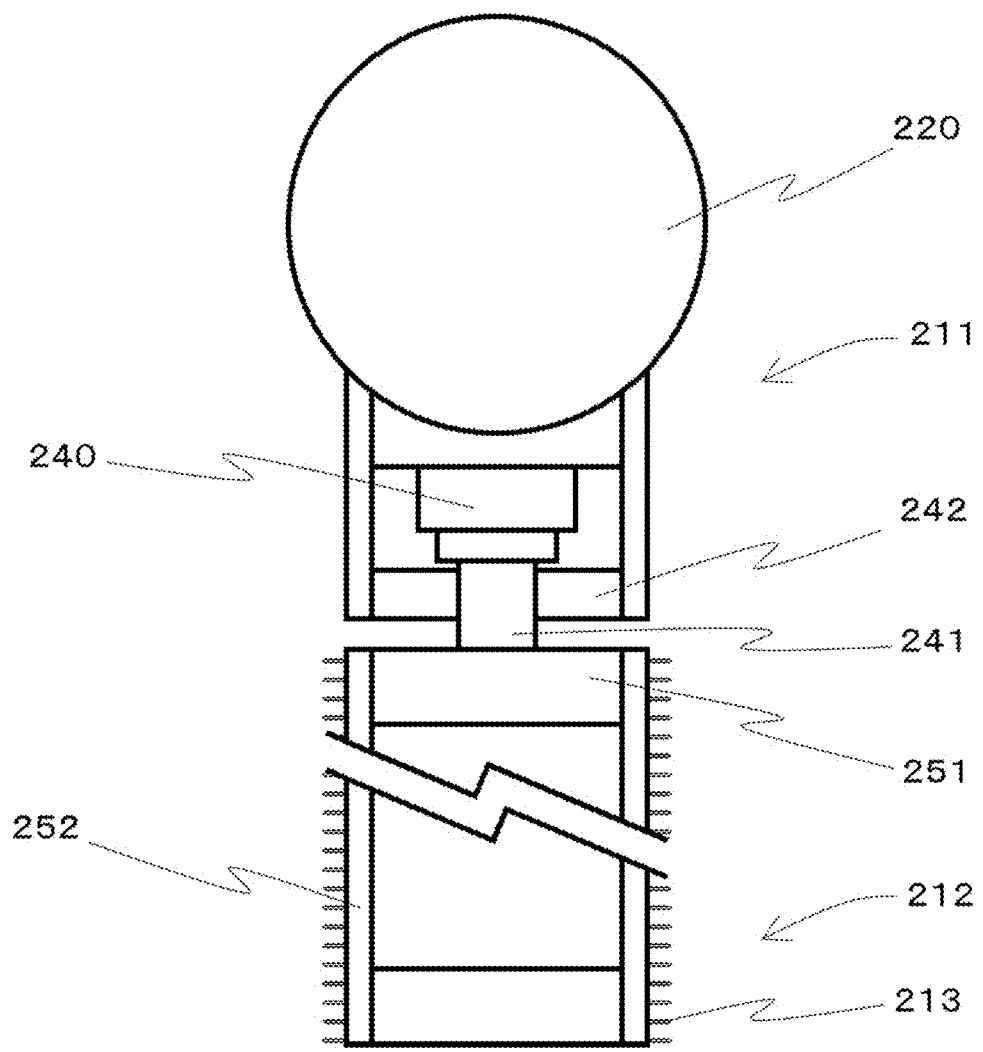

[Fig.37]
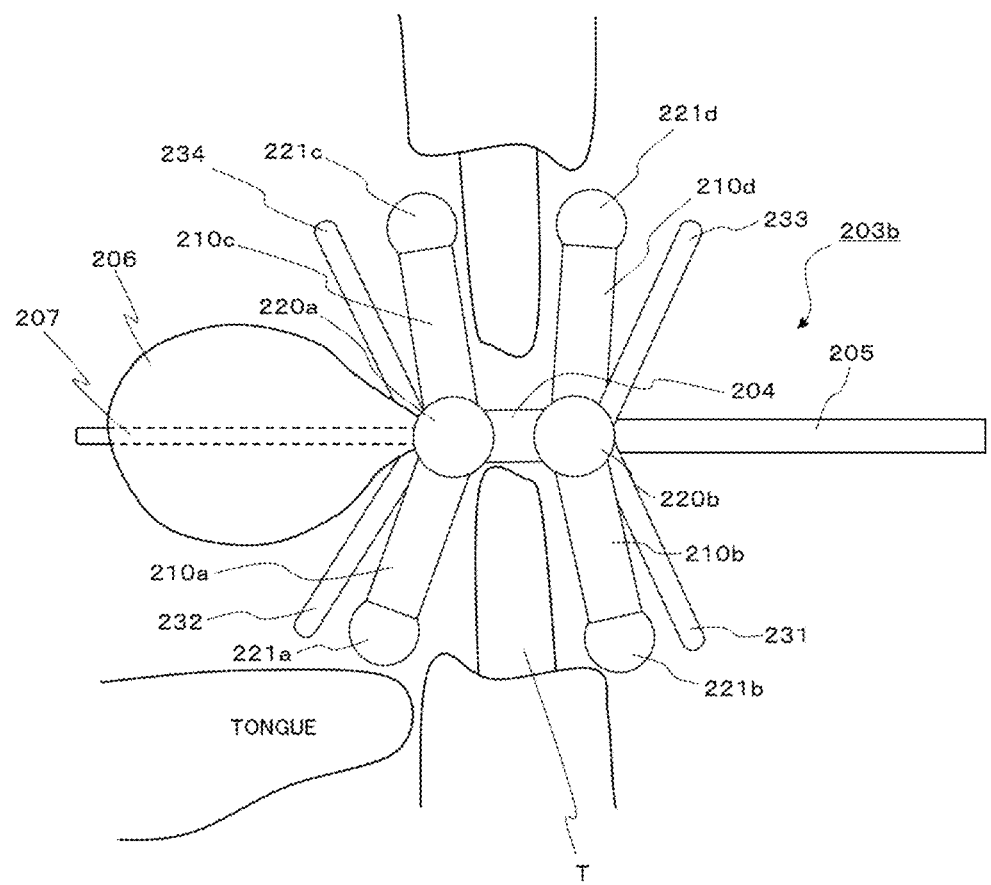

[Fig.38A]
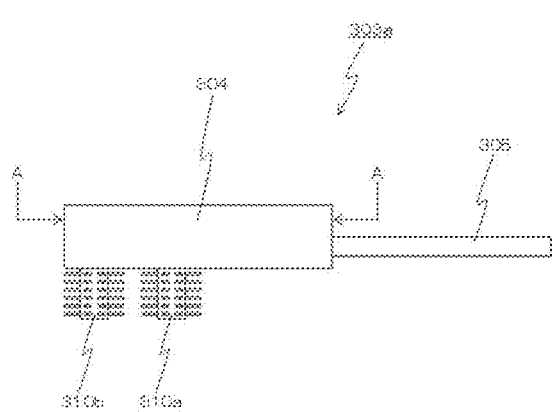
[Fig.38B]
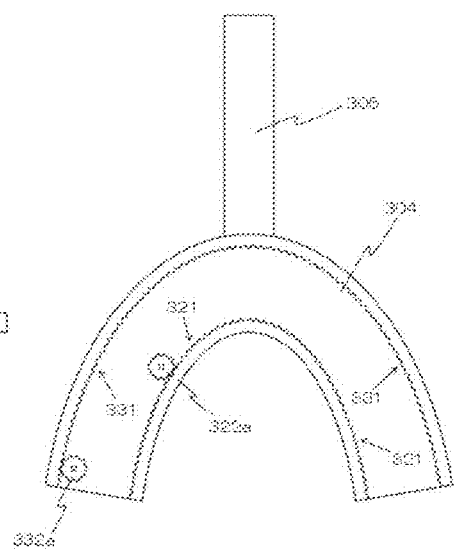

[Fig.39A]
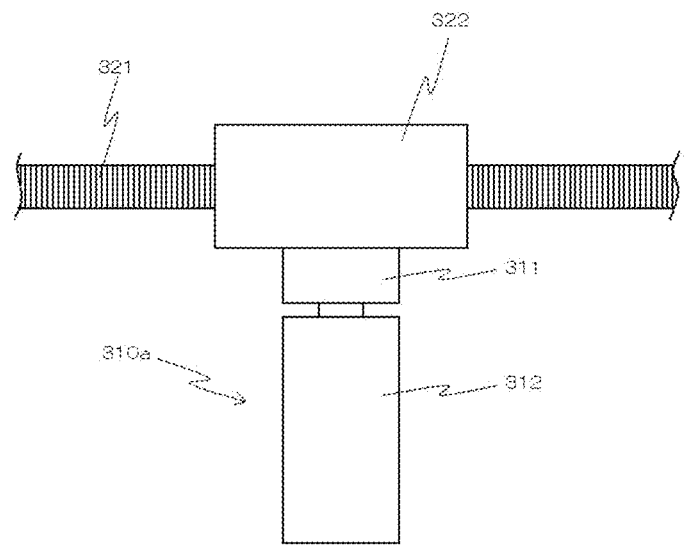
[Fig.39B]
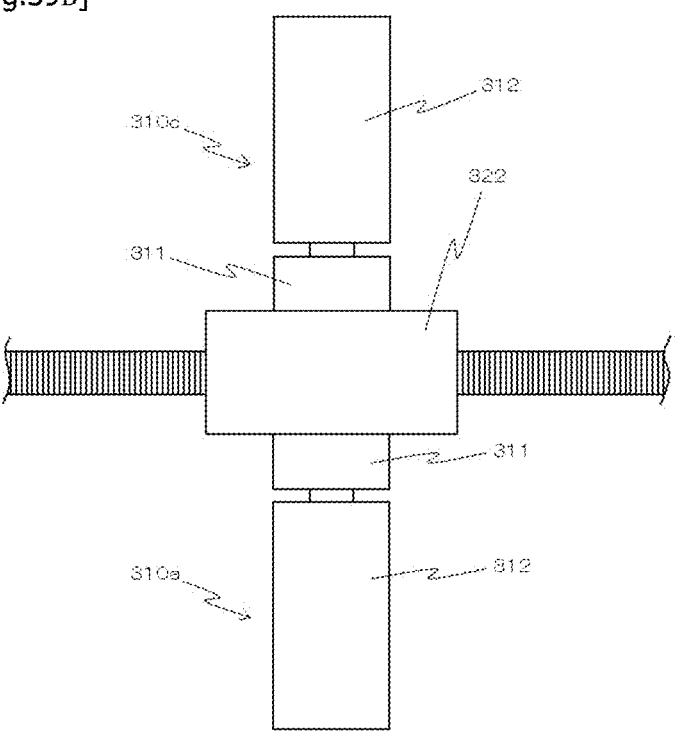

[Fig.40]
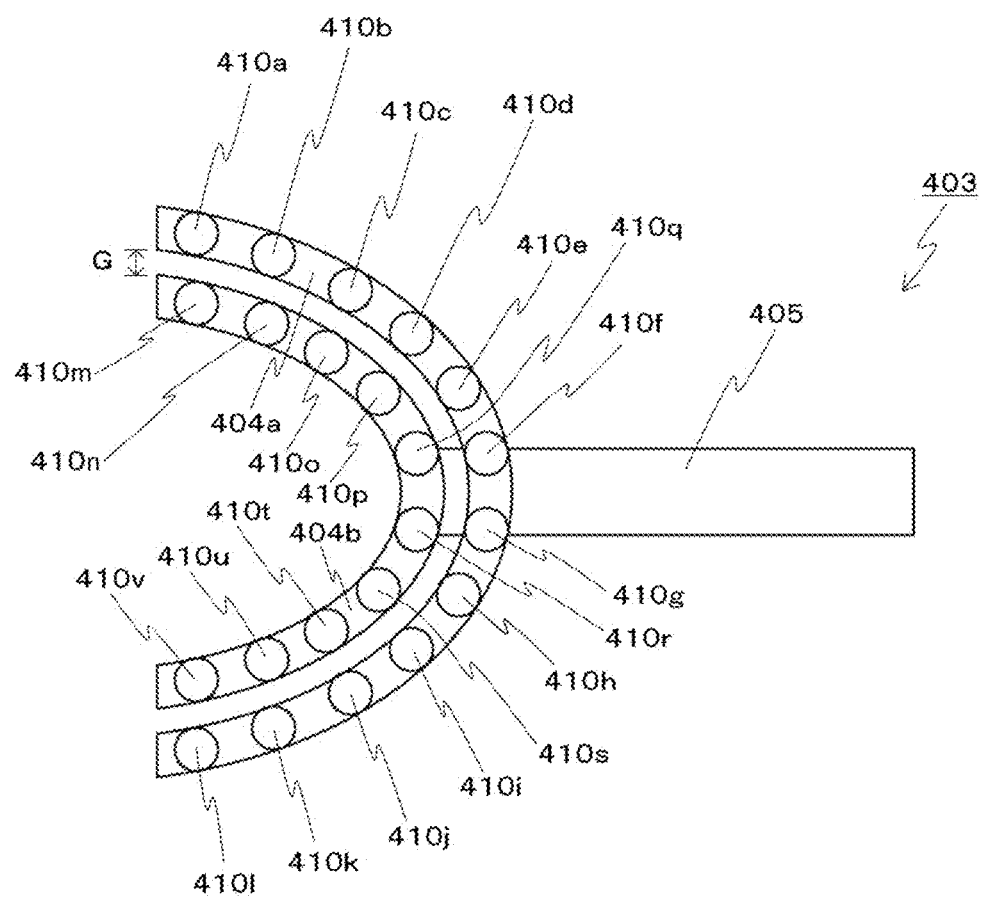

[Fig.41]
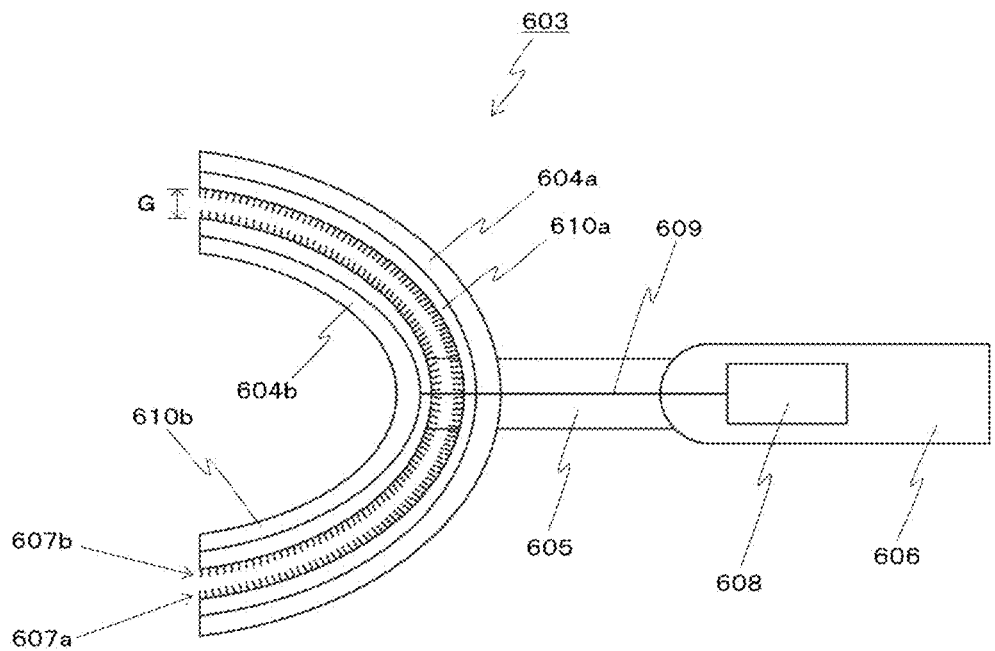
[Fig.42]
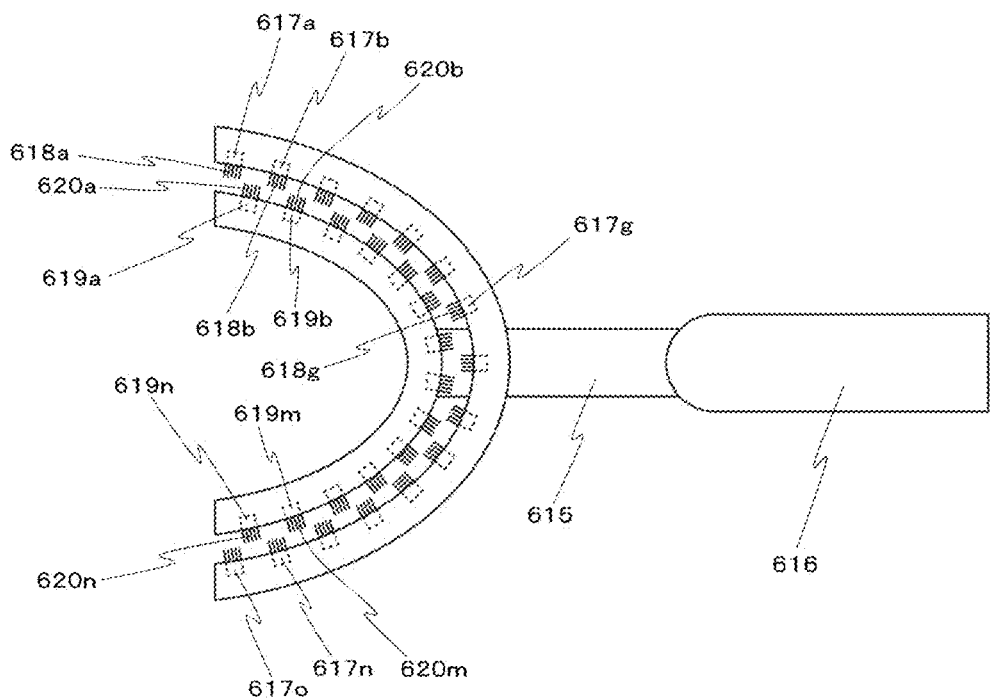

[Fig.43A]
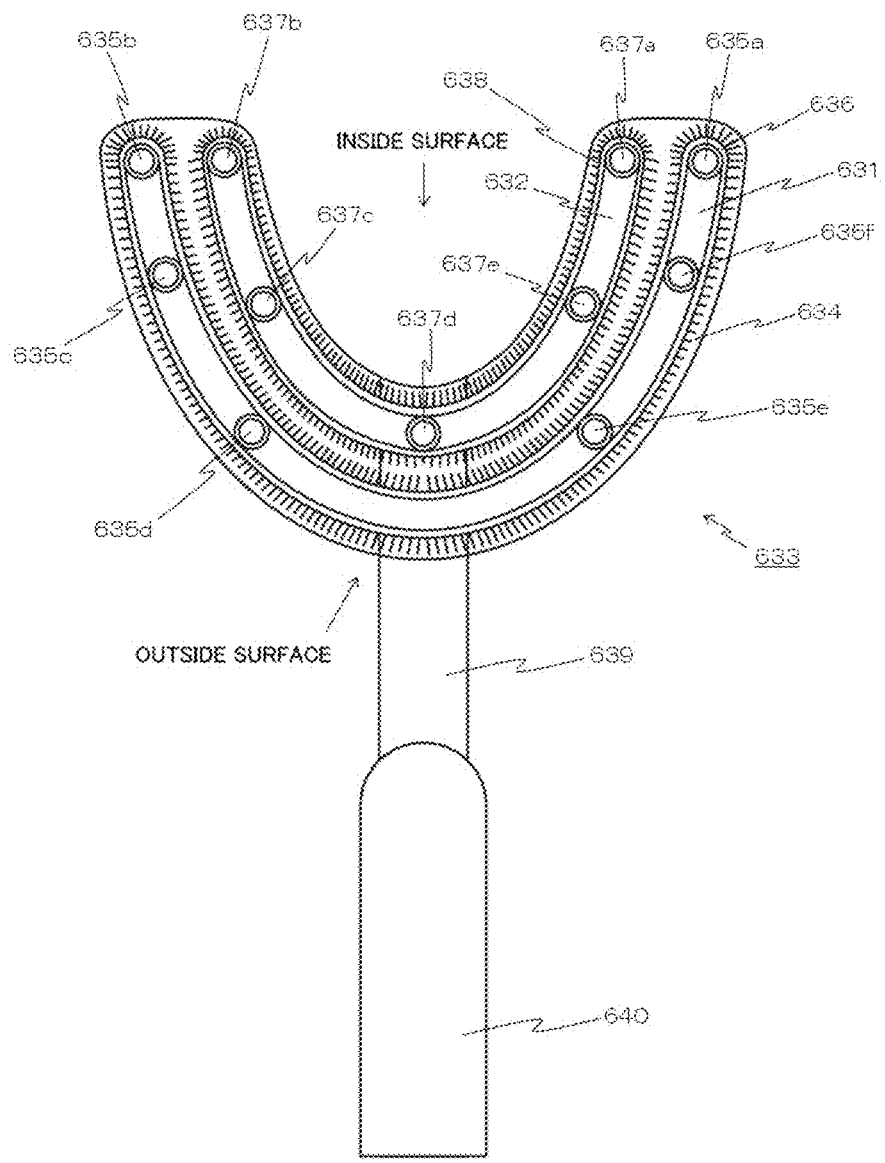
[Fig.43B]
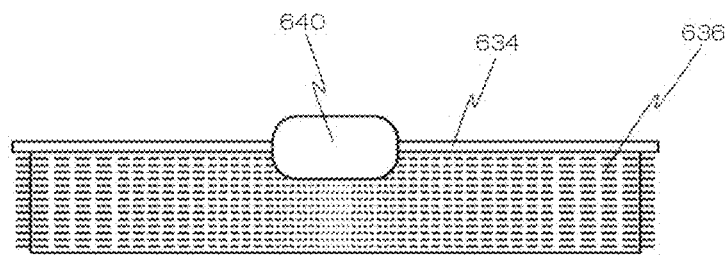

[Fig.44]
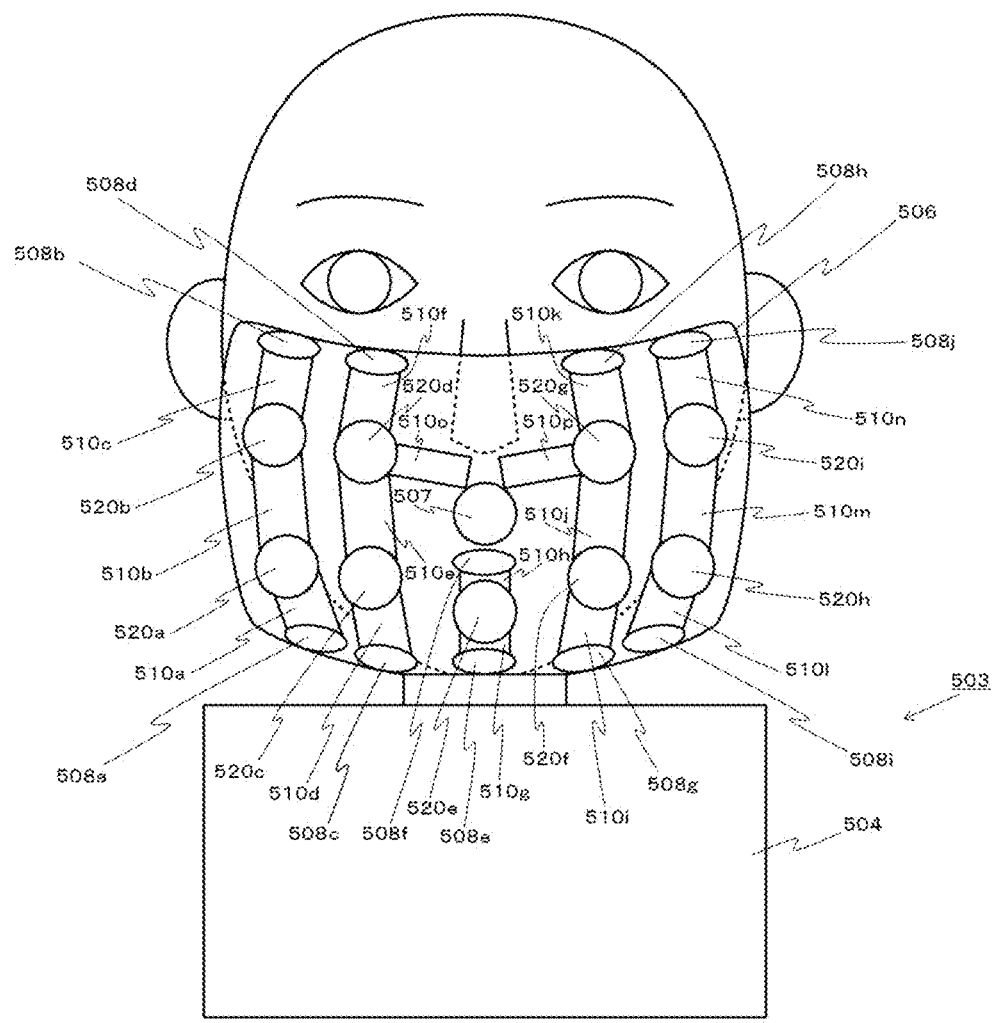

[Fig.45]
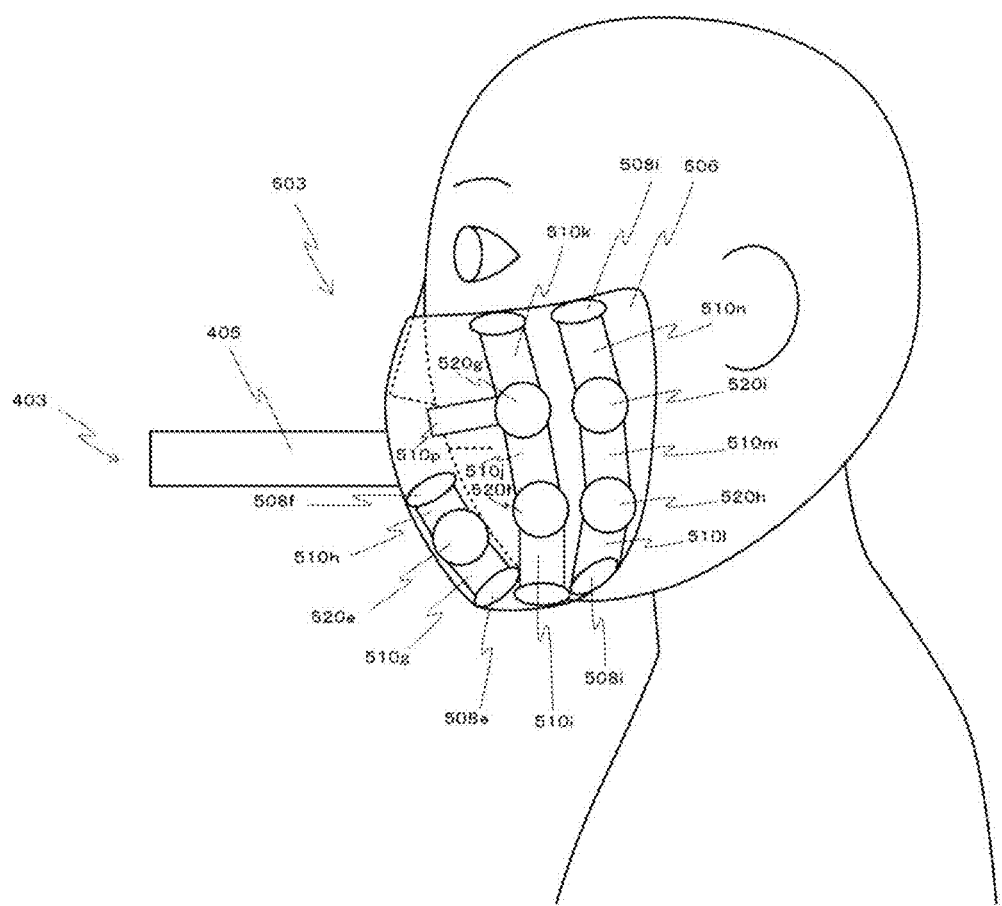

[Fig.46A]
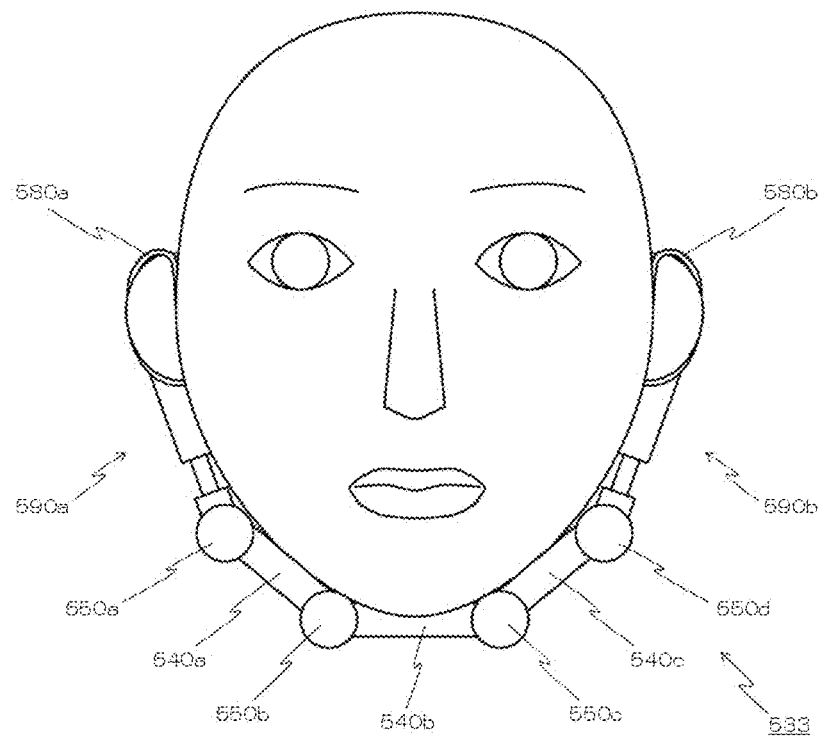
[Fig.46B]
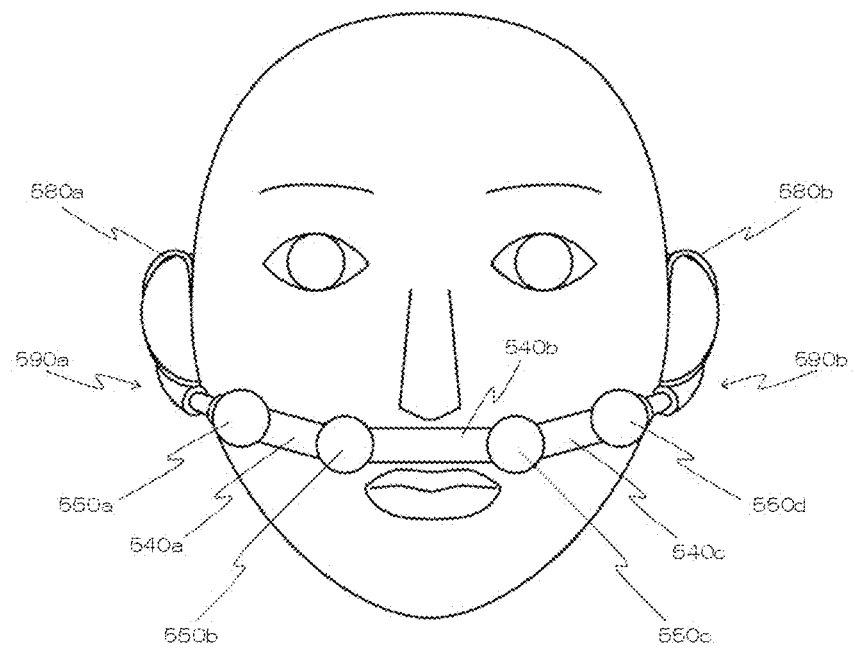

[Fig.47A]
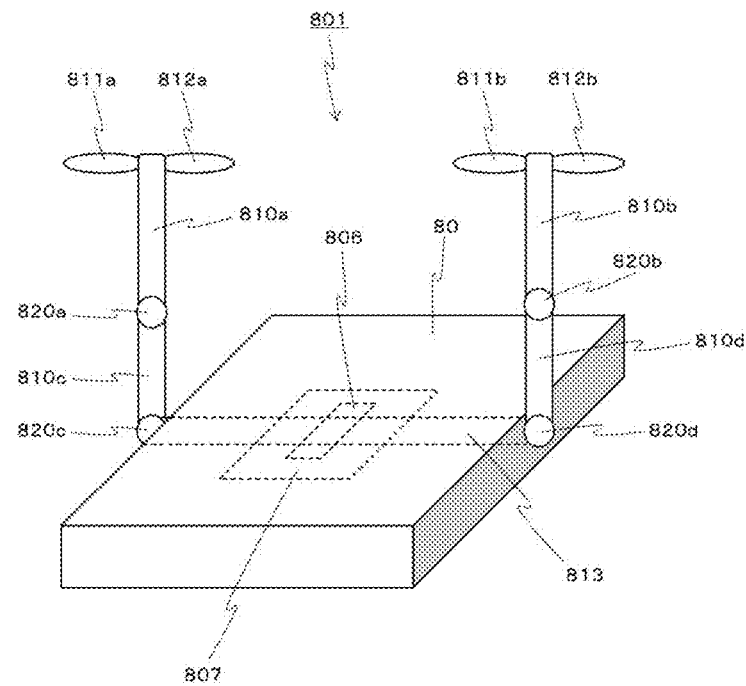
[Fig.47B]
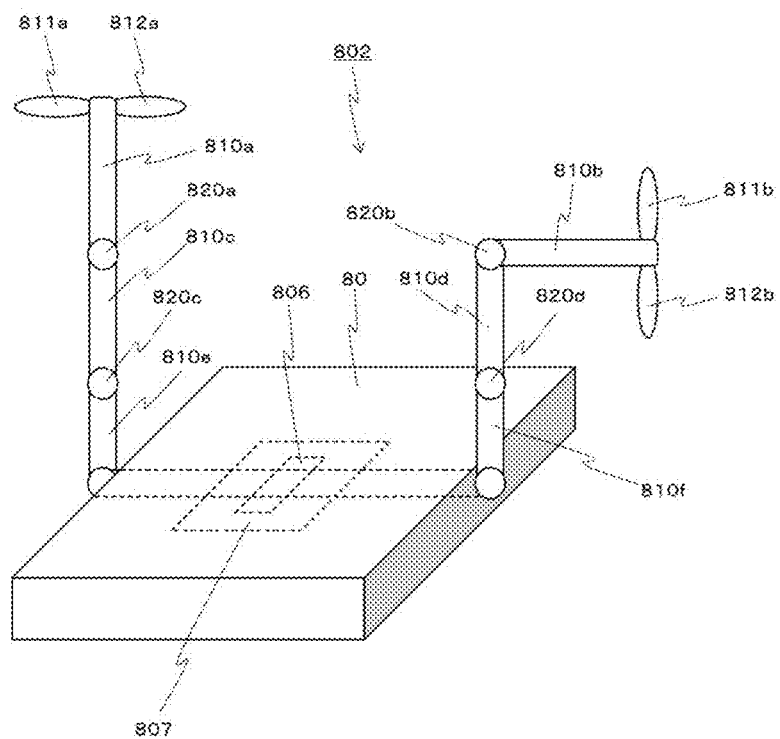

[Fig.48A]
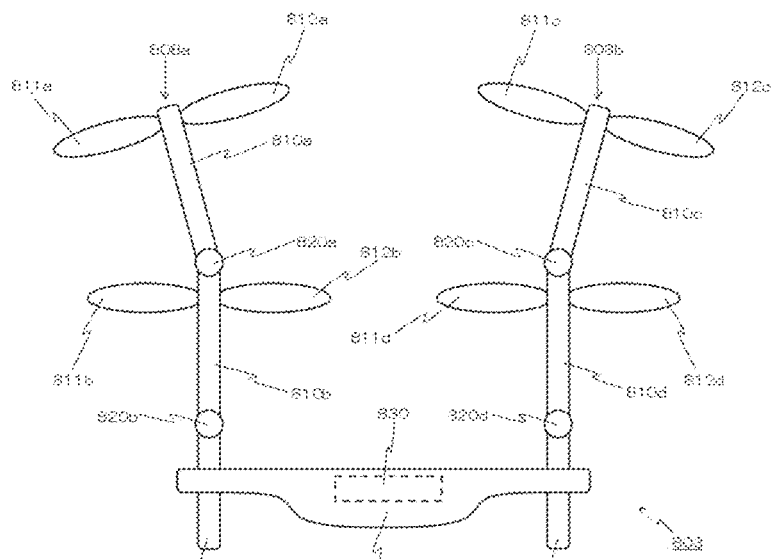
[Fig.48B]
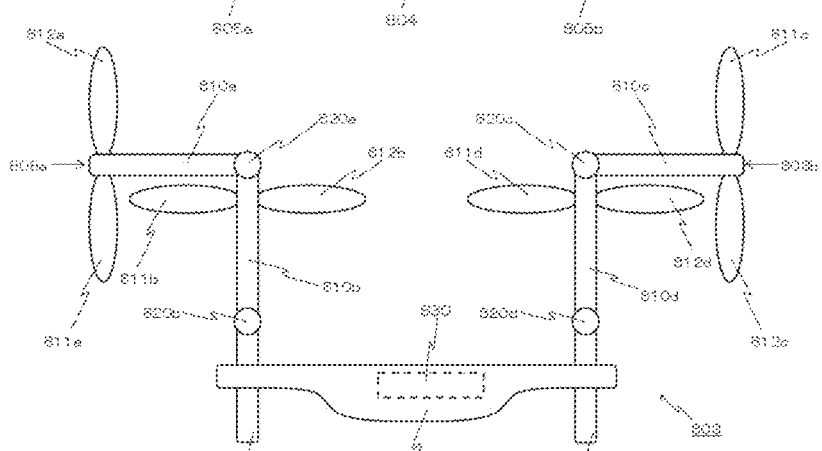
[Fig.48C]
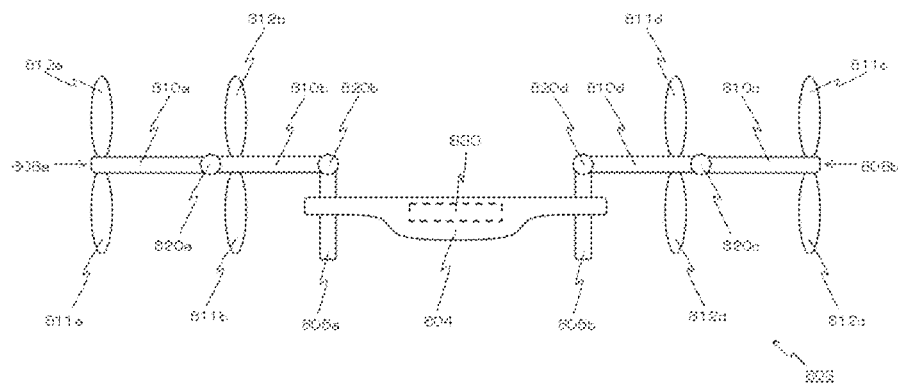

[Fig. 49]
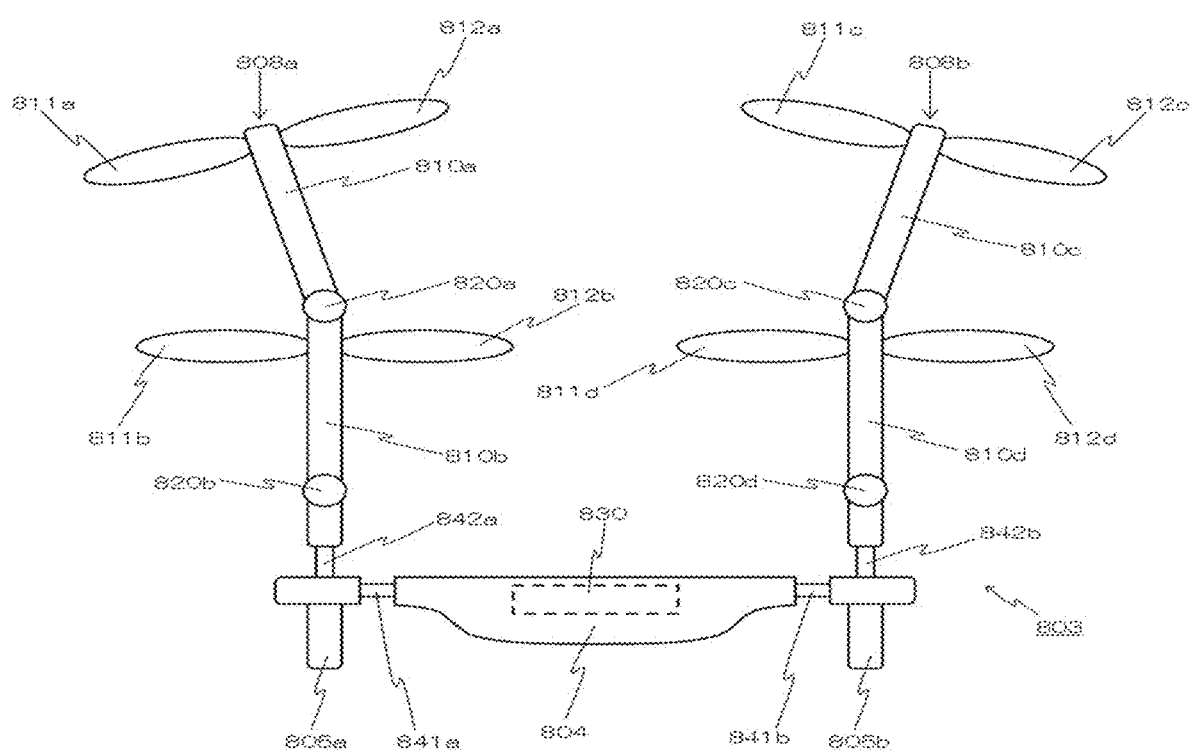

[Fig.50]
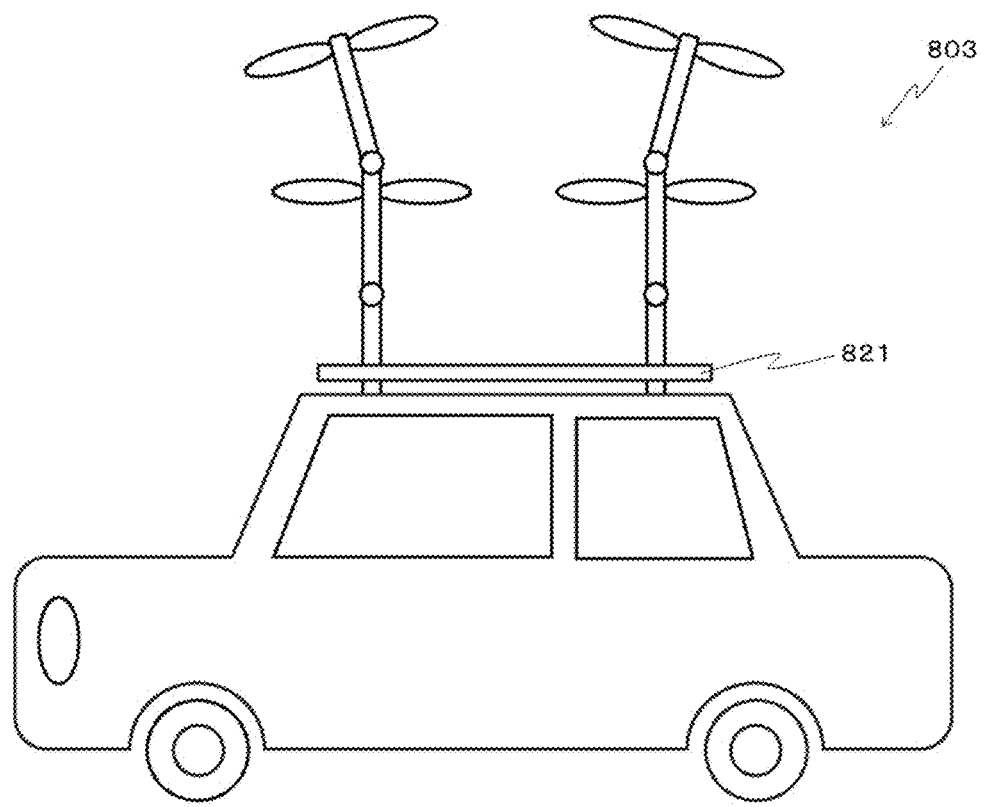

[Fig.51]
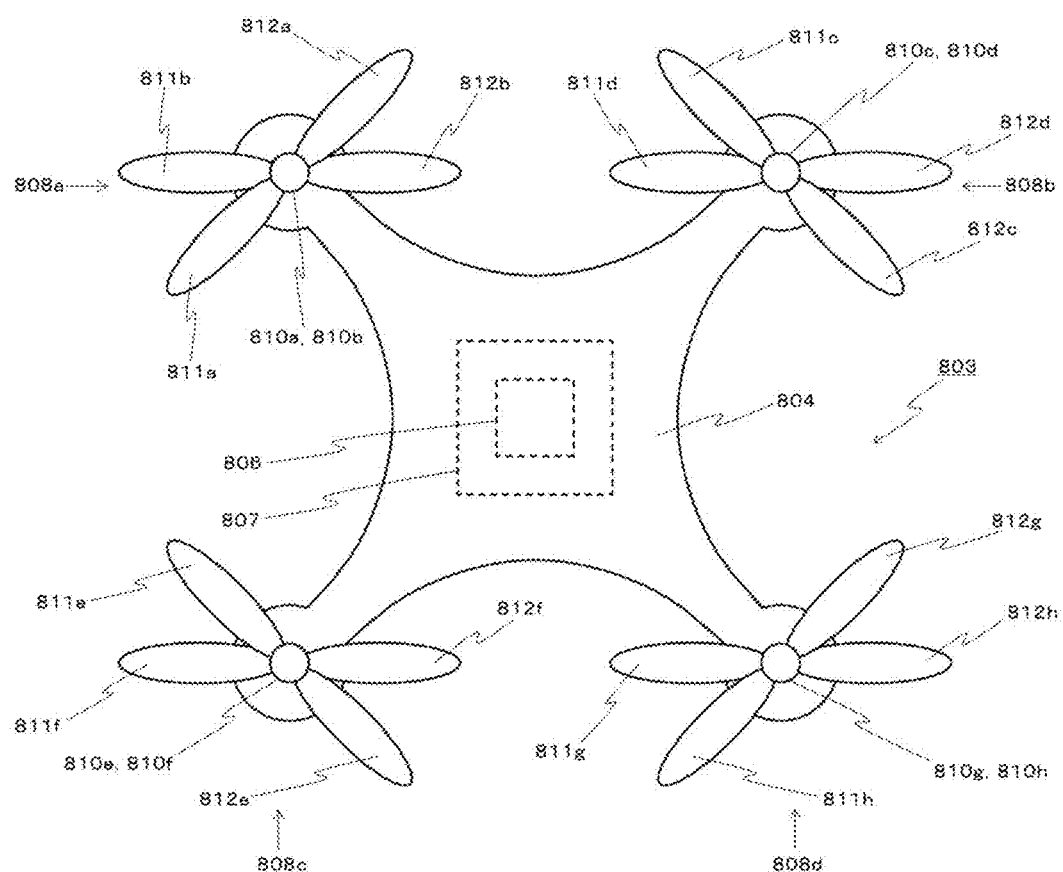

[Fig.52]
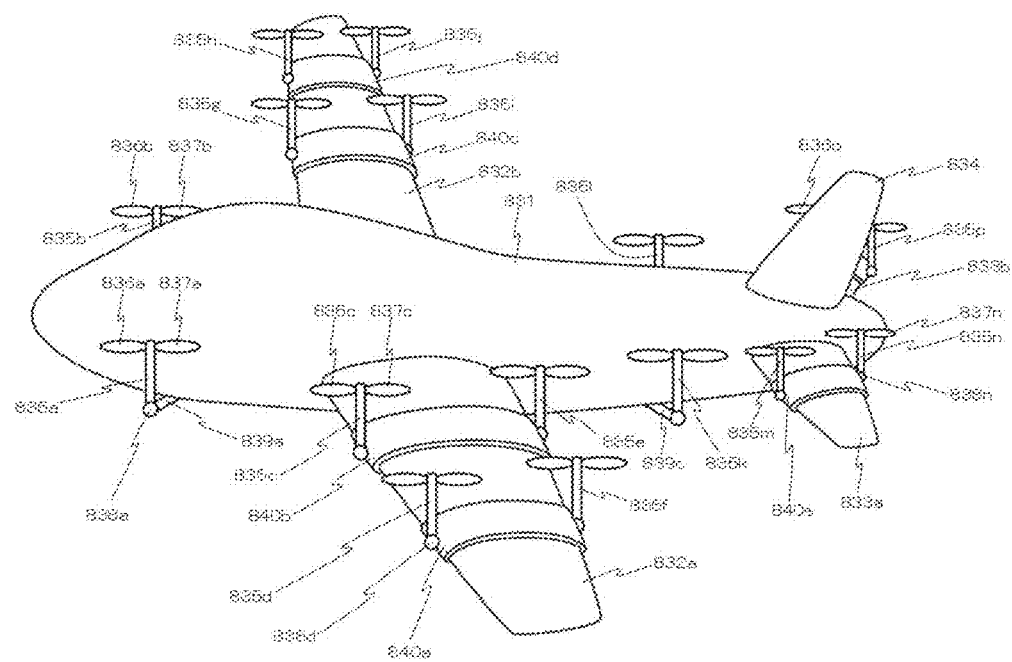

[Fig.53]
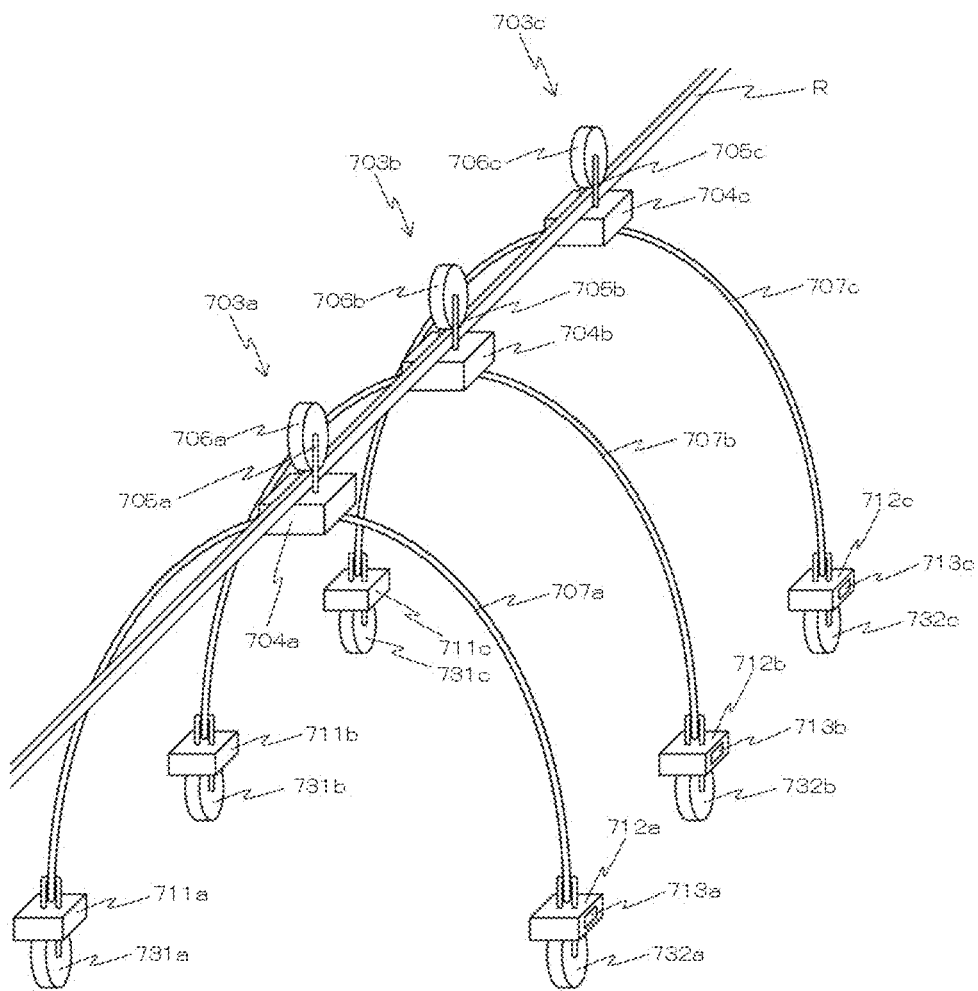

[Fig.54A] 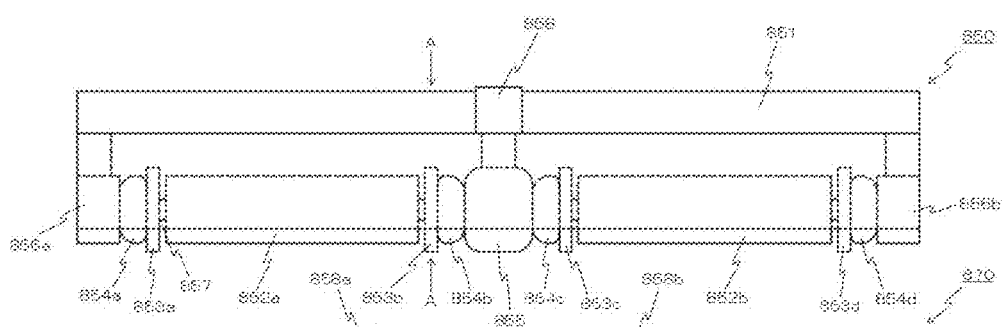
[Fig.54B] 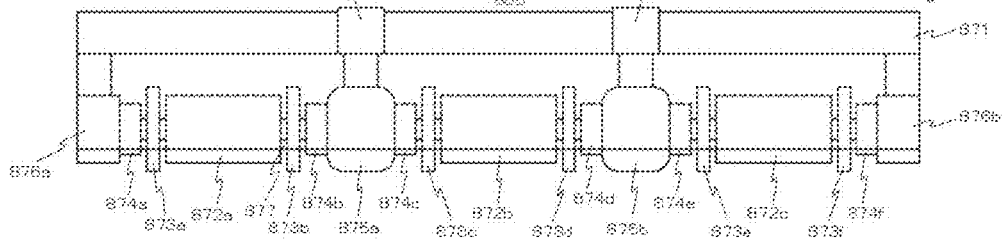
[Fig.54C] 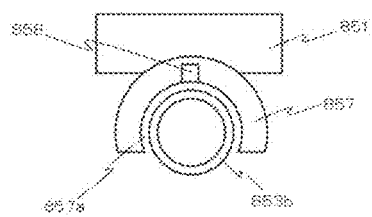

[Fig.55A]
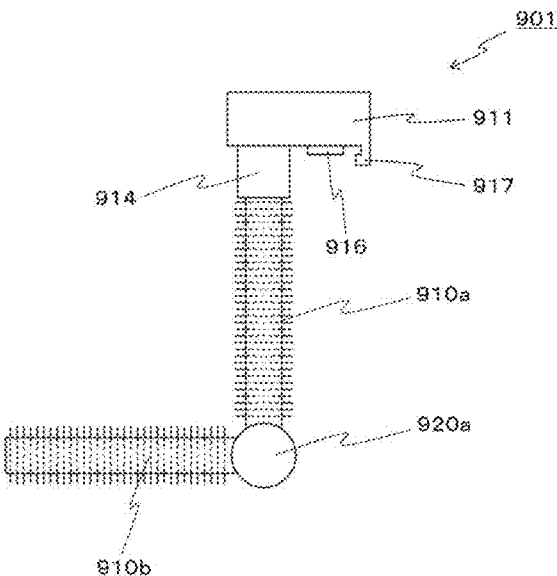
[Fig.55B]
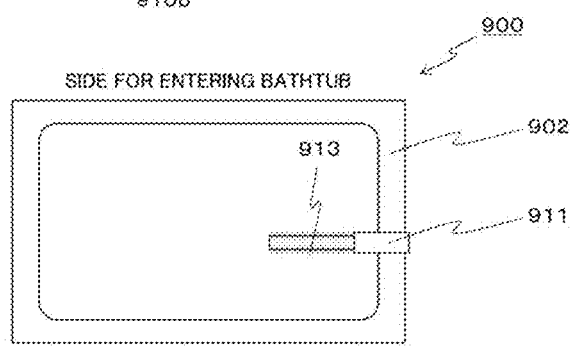
[Fig.55C]
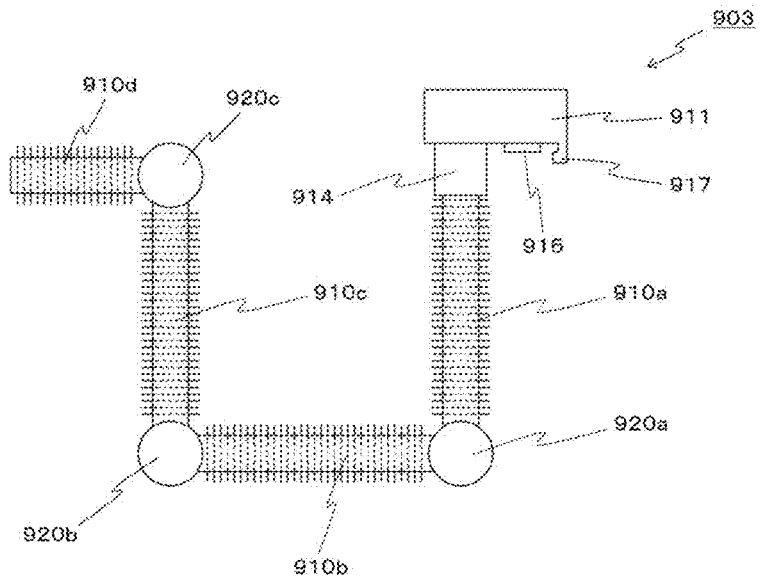

[Fig.56A]
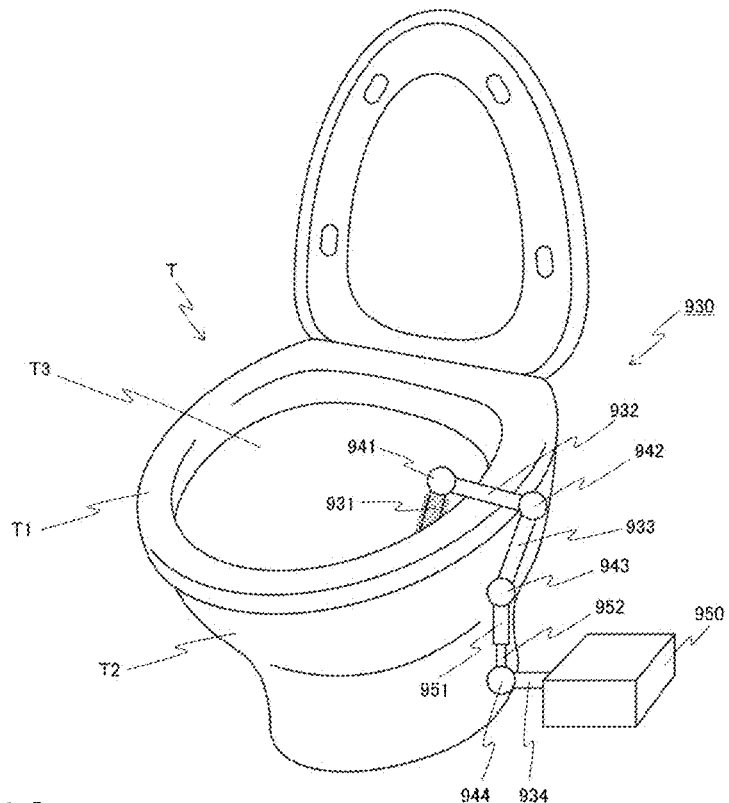
[Fig.56B]
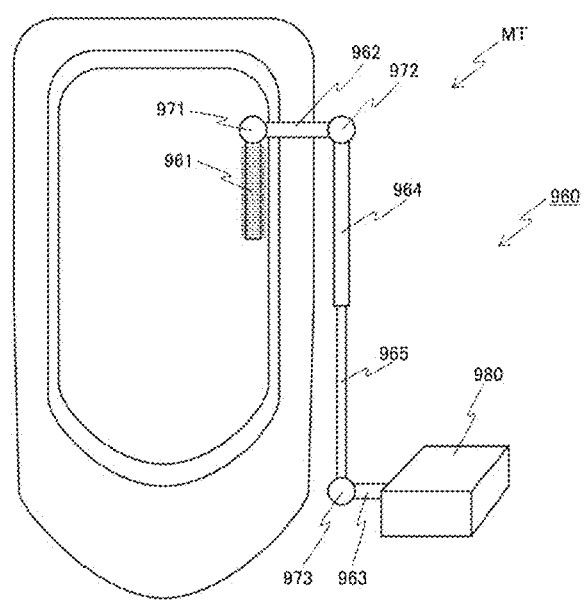

[Fig.57A]
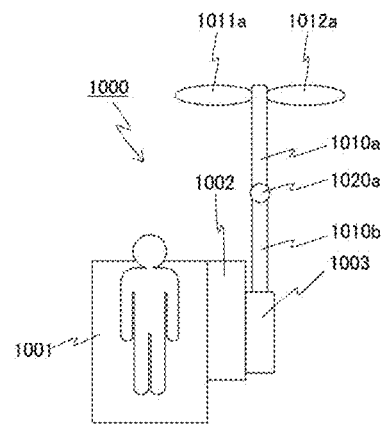
[Fig.57B]
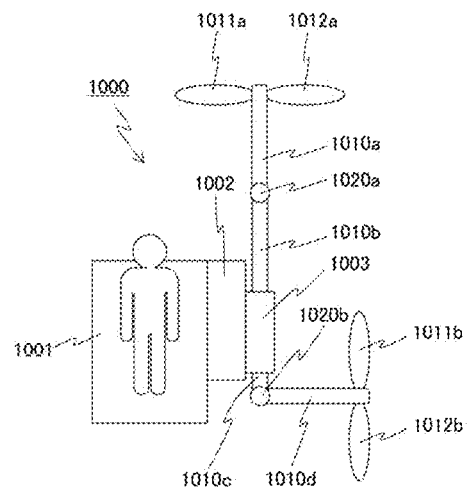
[Fig.57C]
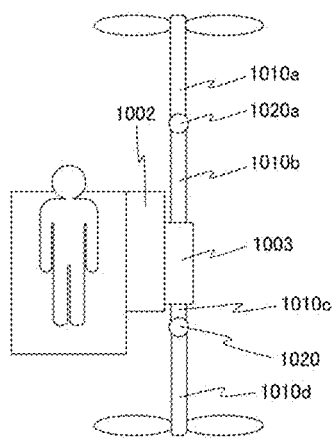
[Fig.57D]
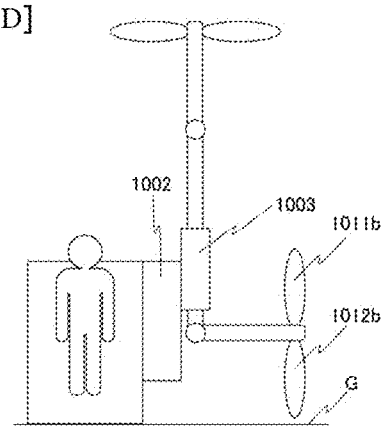

[Fig.58A]
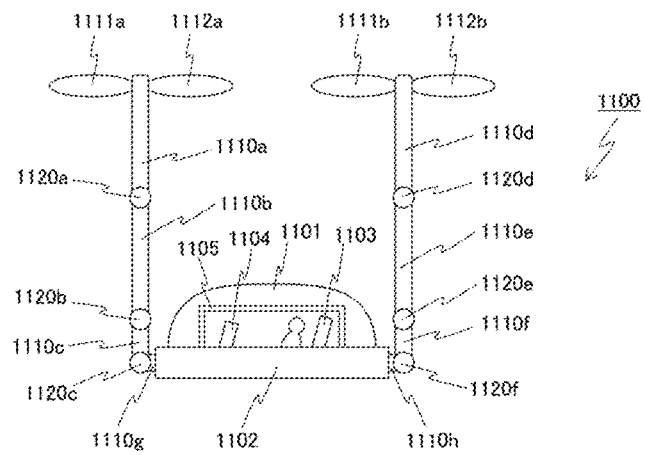
[Fig.58B]
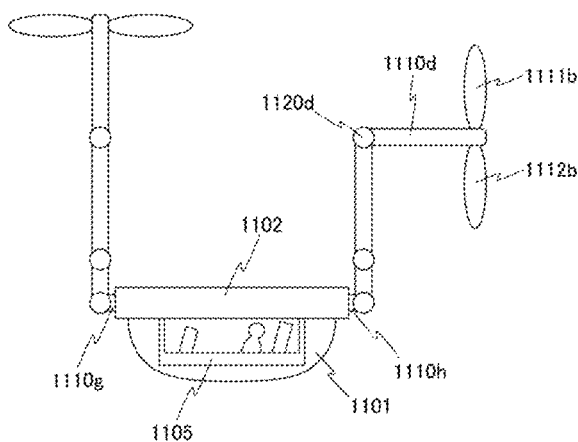
[Fig.58C]
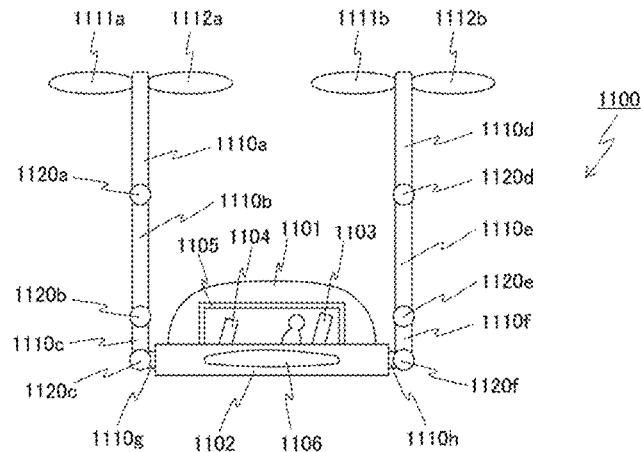

[Fig.59]
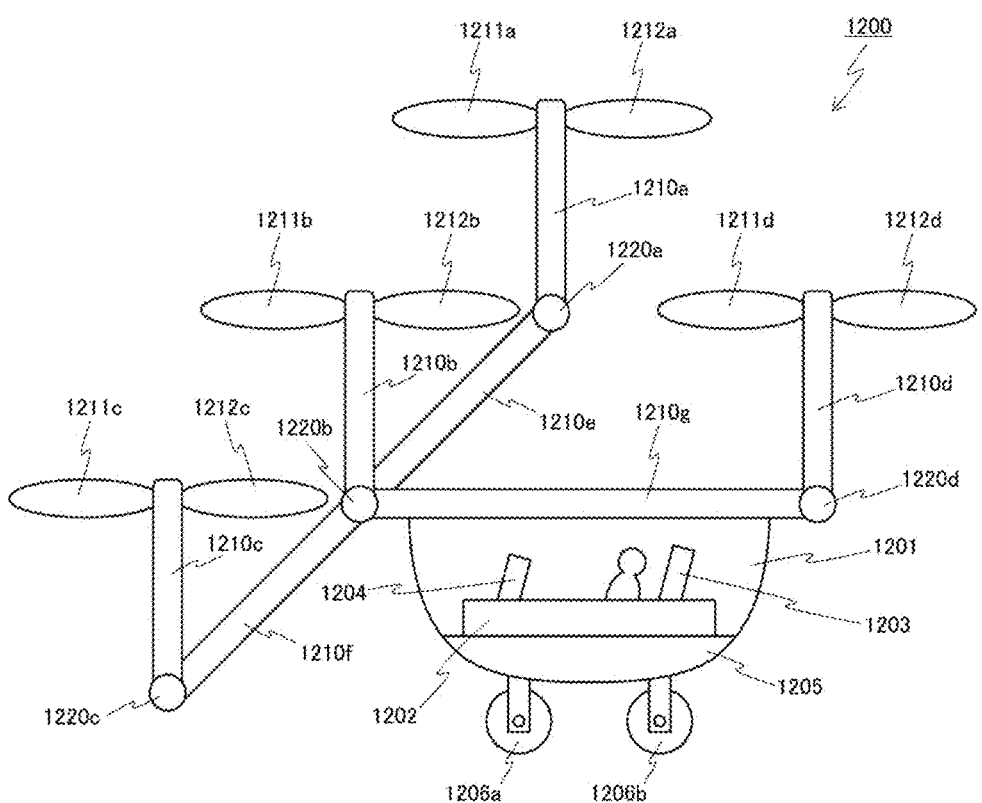

[Fig.60]
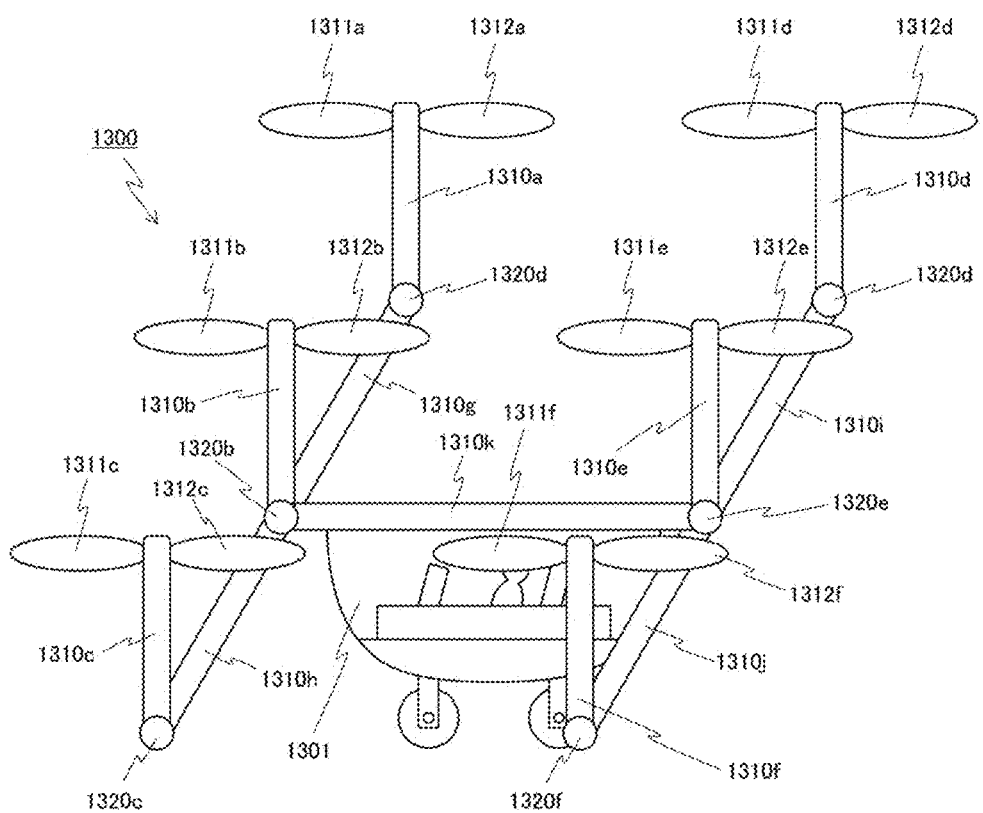

[Fig.61A]
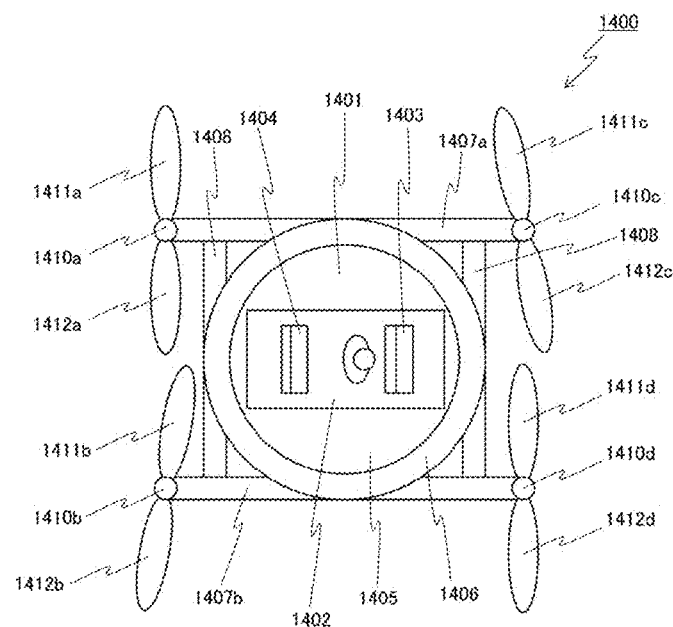
[Fig.61B]
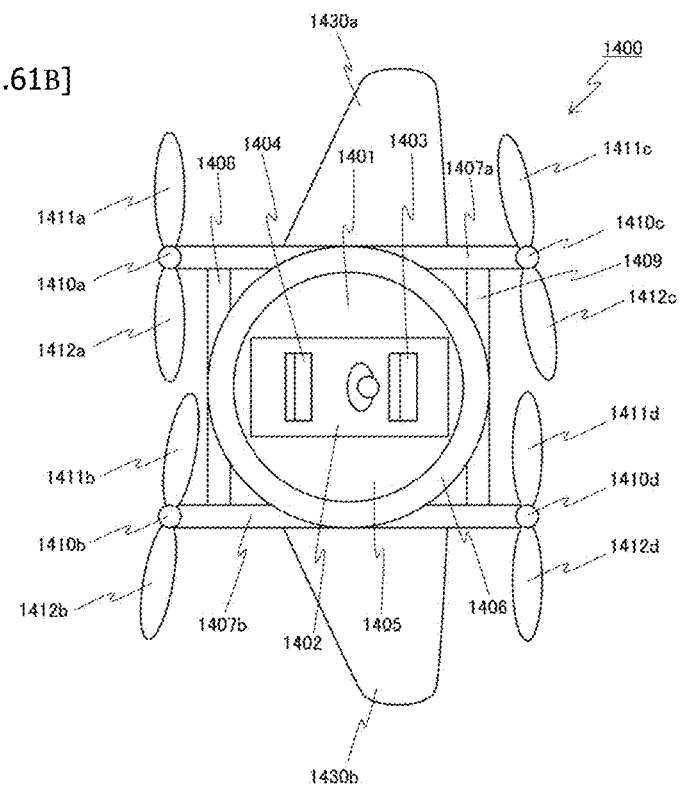

[Fig.62A]
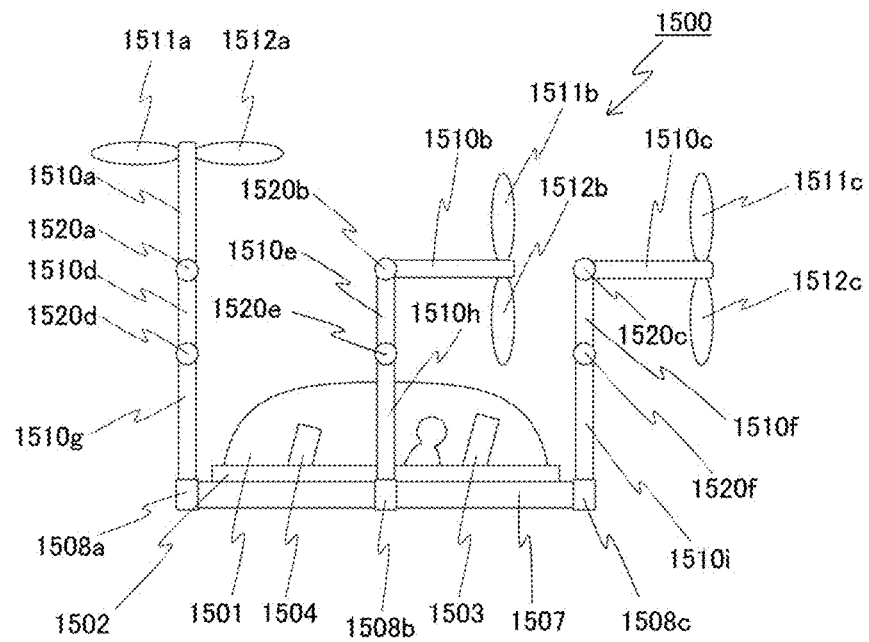
[Fig.62B]
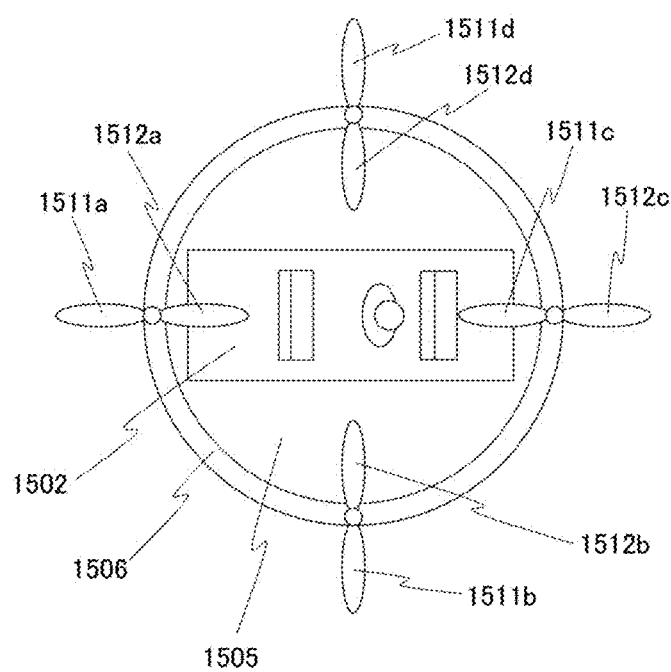

[Fig.63A]
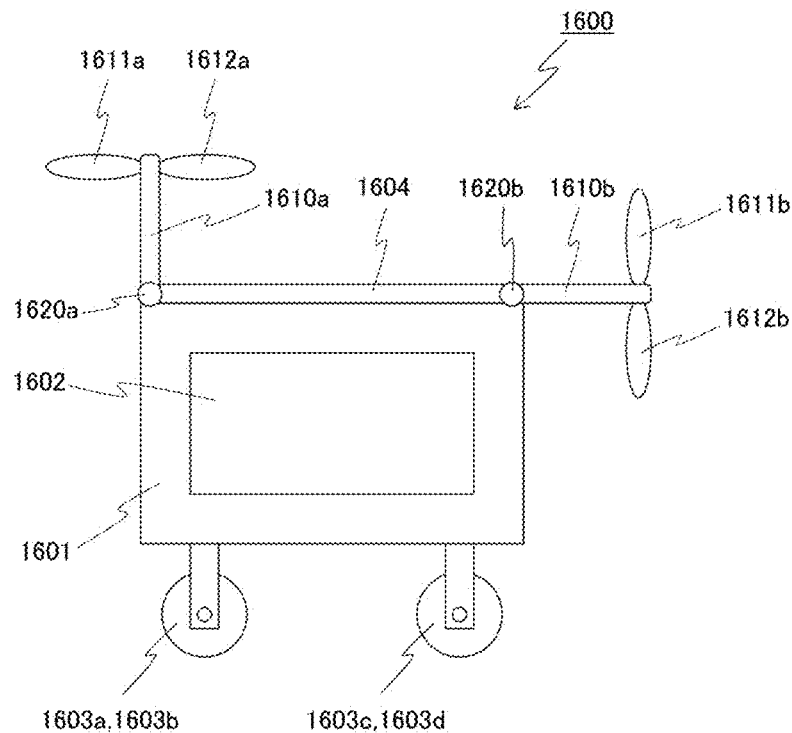
[Fig.63B]
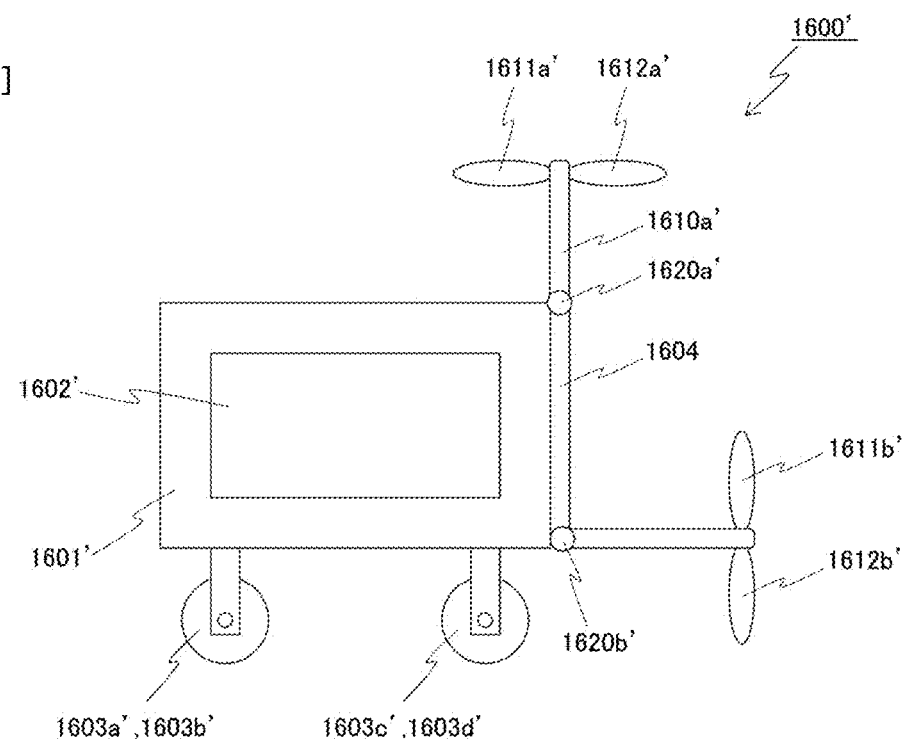

[Fig.64A]
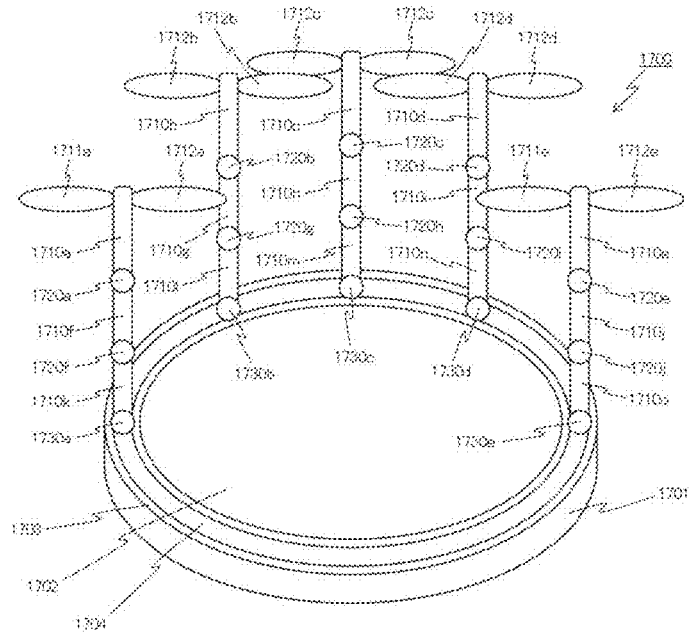
[Fig.64B]
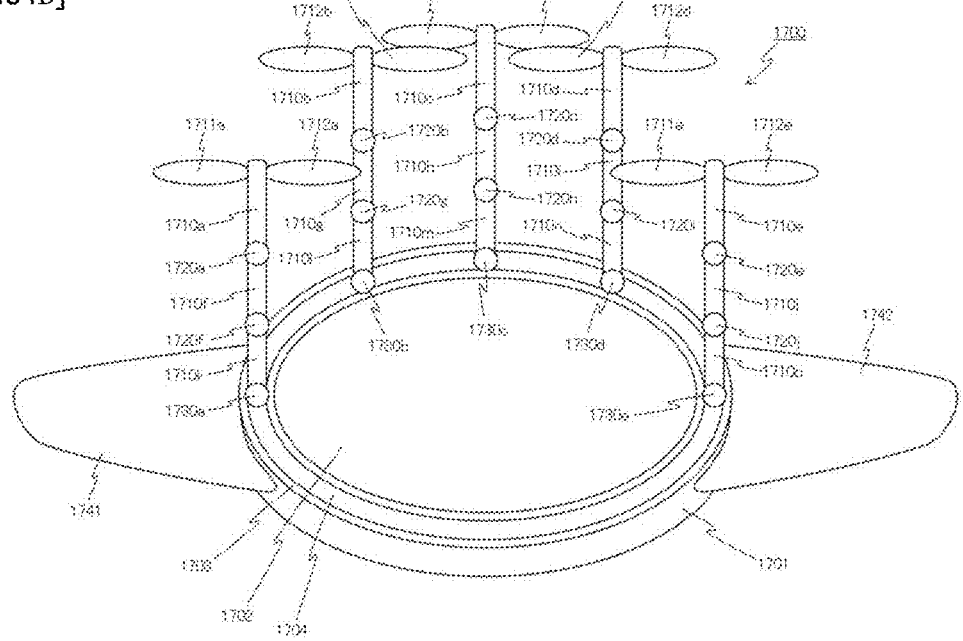

[Fig.65]
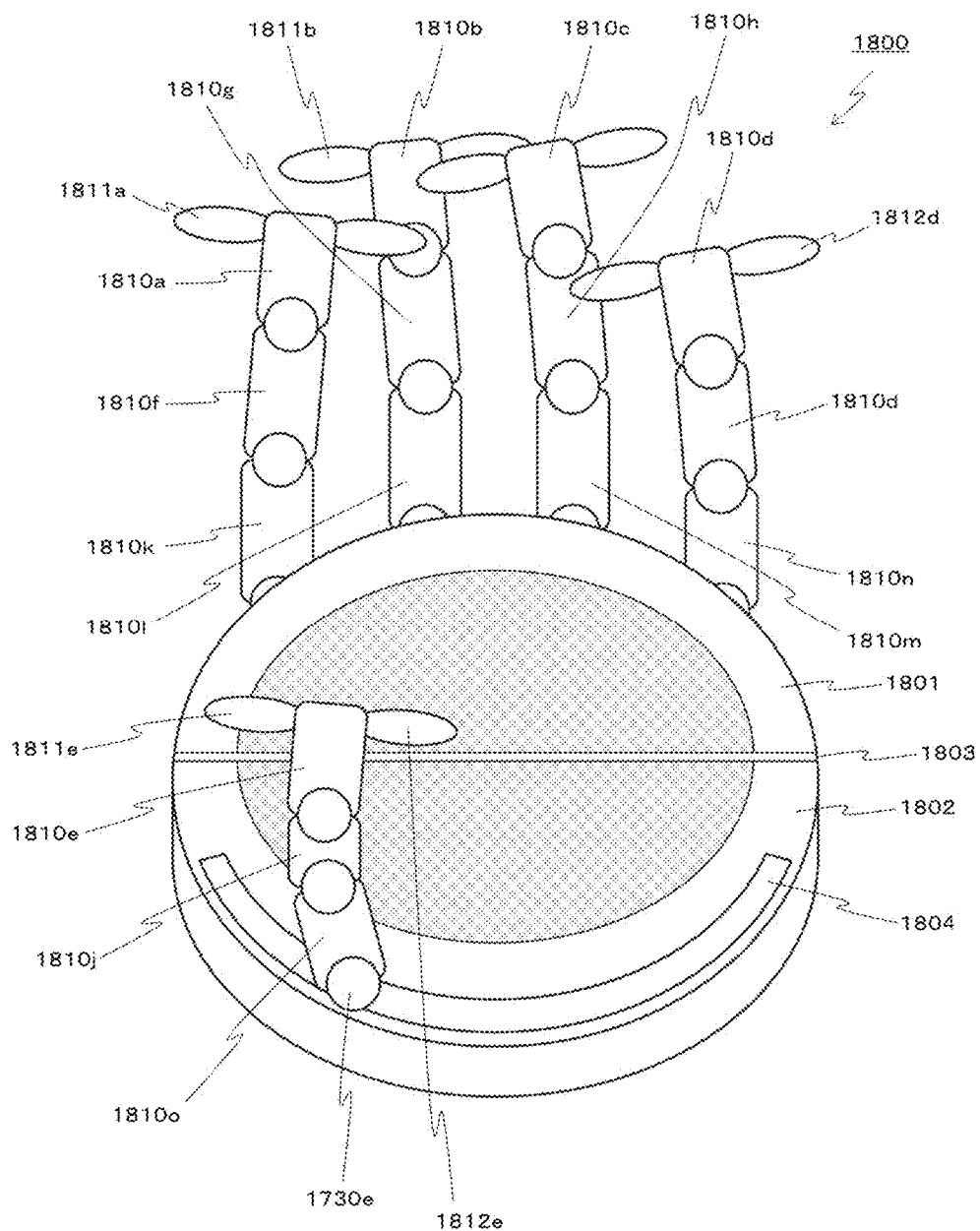

[Fig.66A]
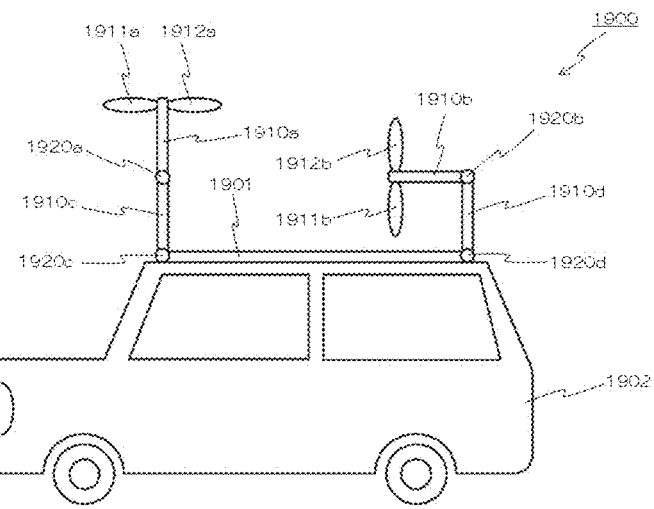
[Fig.66B]
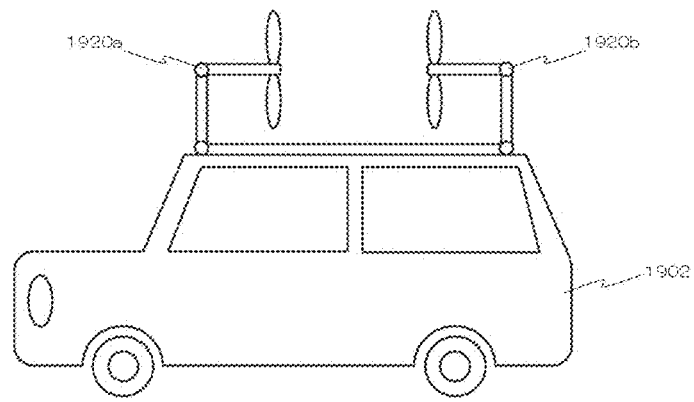
[Fig.66C]
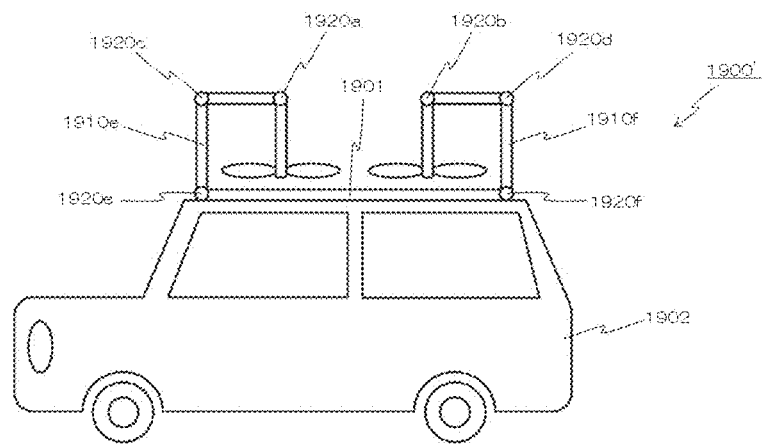

[Fig.67A]
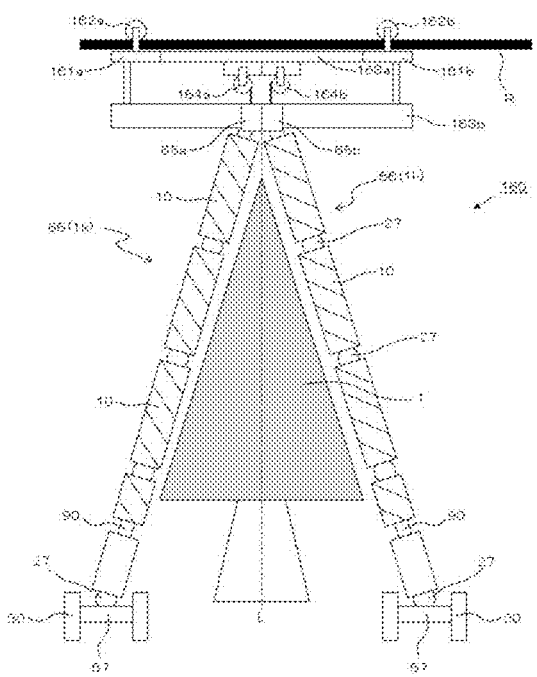
[Fig.67B]
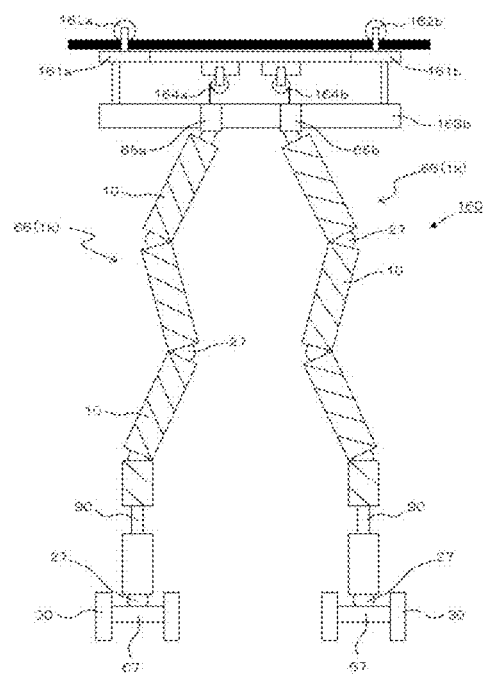
[Fig.68]
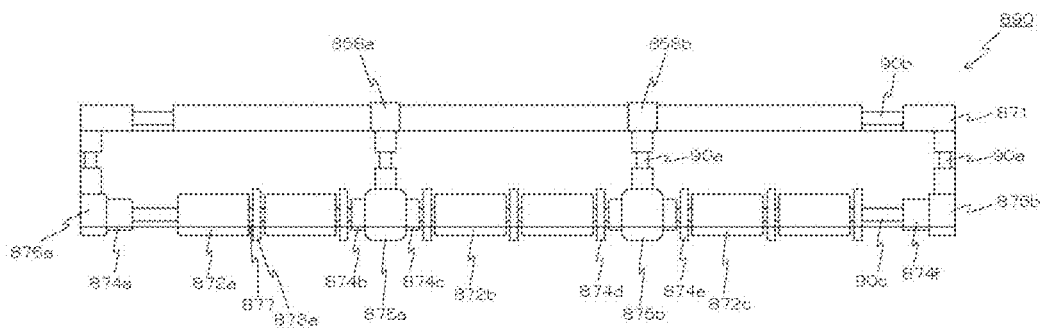

[Fig.69]
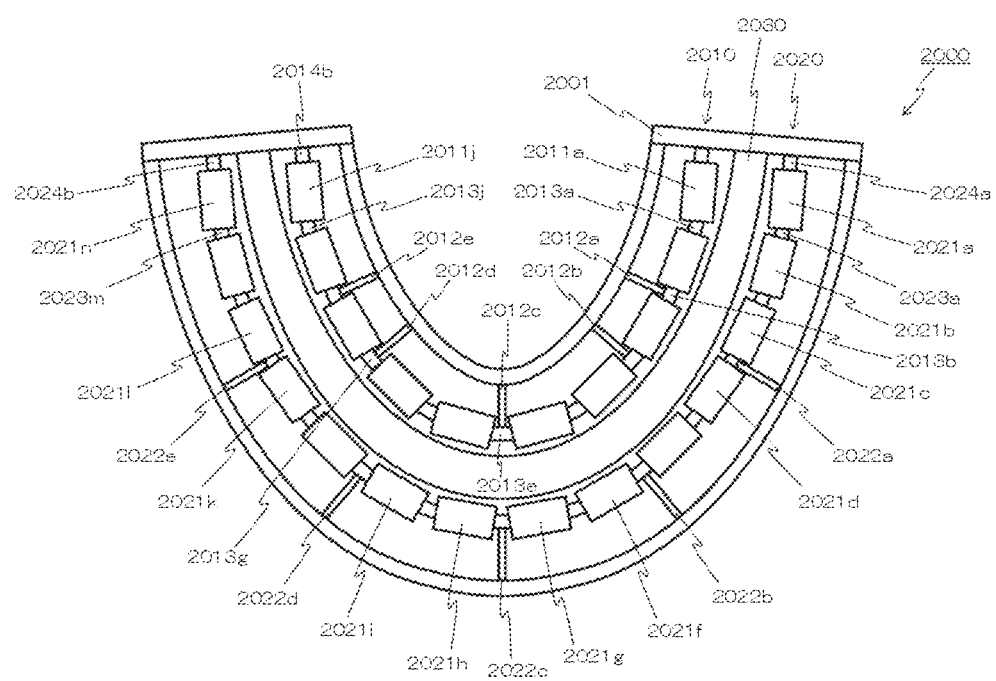

[Fig.70]
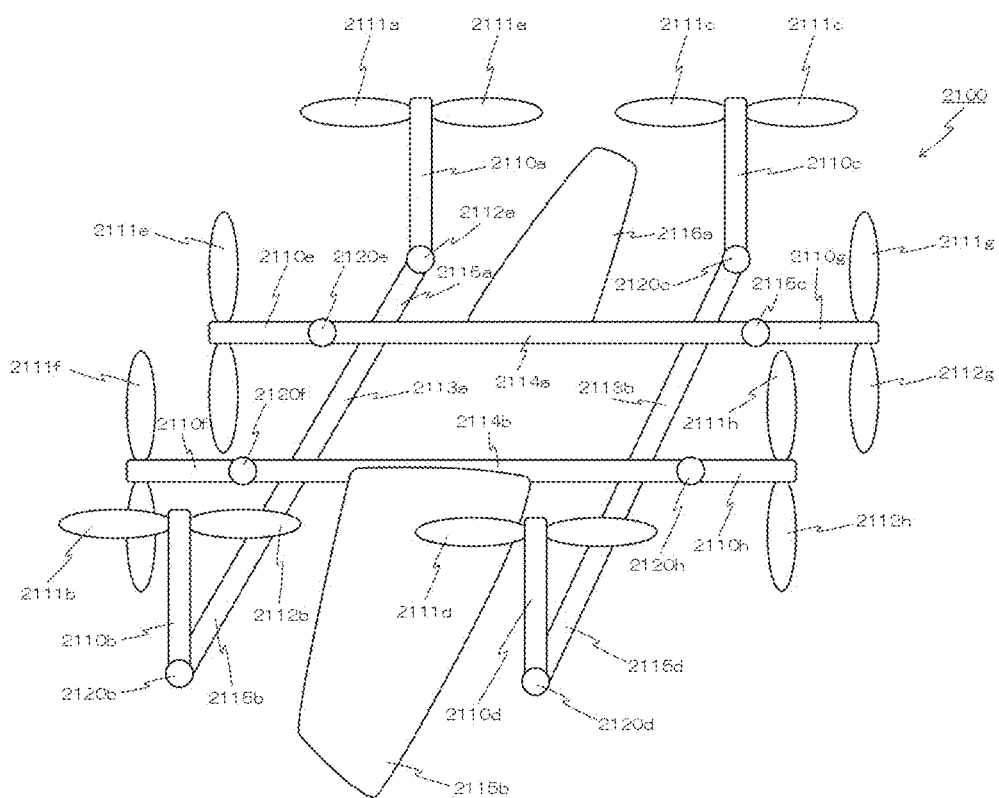

[Fig.71]
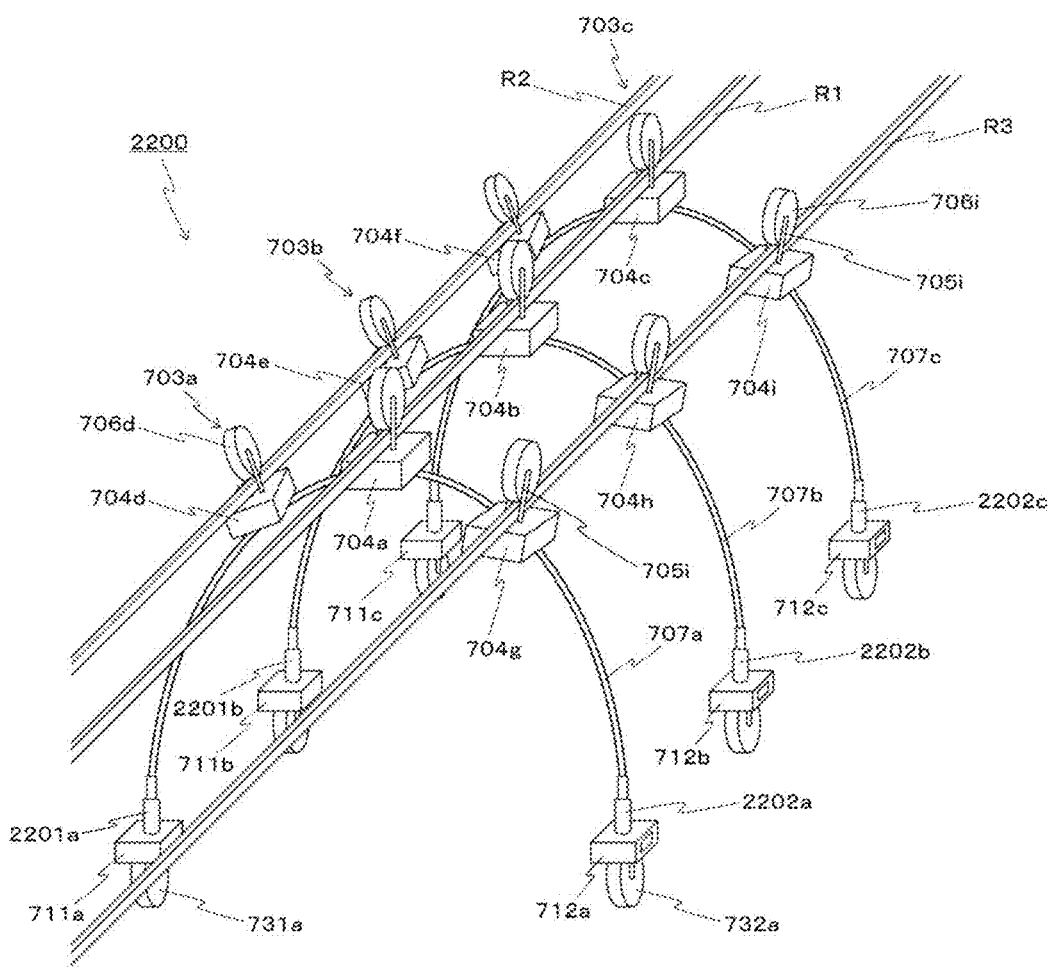

[Fig.72A]
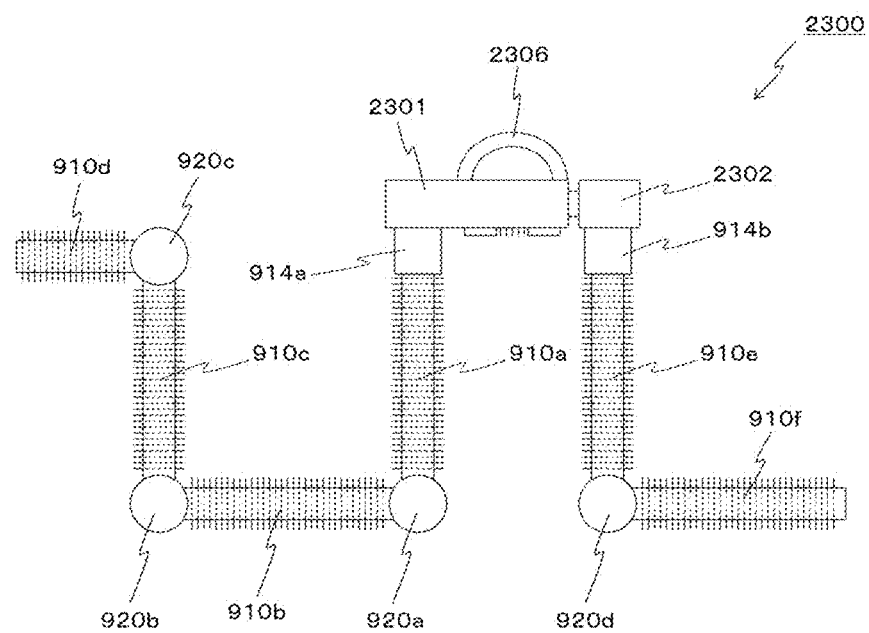
[Fig.72B]
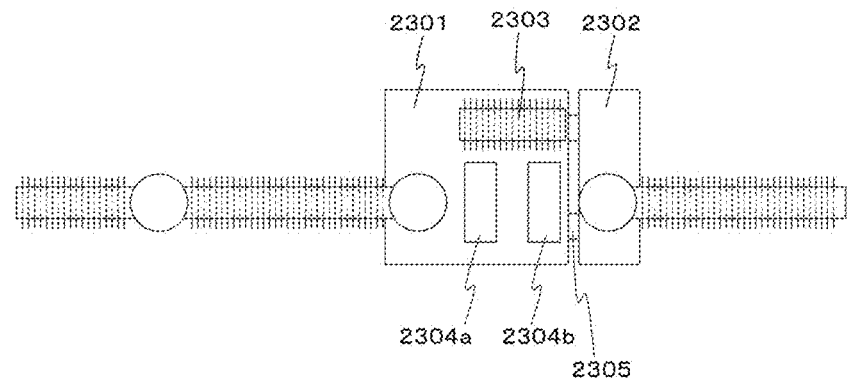

WORK DEVICE PROVIDED WITH A CYLINDRICAL ROTATING BODY

RELATED APPLICATIONS

The present application is a National Phase of International Application No. PCT/JP2020/013611 filed Mar. 26, 2020, and claims priority based on Japanese Patent Application No. 2019-063167 filed Mar. 28, 2019.

TECHNICAL FIELD

The present invention relates to a working apparatus including a cylindrical rotating body (for example, an agricultural vehicle, a toy car, a carriage, and a flying body having cylindrical rotating bodies).

BACKGROUND ART

Conventionally, a combined traveling body having a plurality of rotating bodies coupled together has been known (for example, see Patent Literature 1).

Furthermore, a shaping mechanism having many knives 20 for pruning a tree has been known (for example, see Patent Literature 2).

CITATION LIST

Patent Literatures

[Patent Literature 1] Japanese Patent Laid-Open Publication No. 2015-95987
[Patent Literature 2] US Patent Publication No. 4383401

SUMMARY

Technical Problem

In conventional technique, there has been no apparatus including a cylindrical rotating body having a surface section that functions as a driving wheel or a working member.

The shaping mechanism disclosed in Patent Literature 2 allows for pruning a tree of identical shape. However, it has been difficult to trim trees different in height and shape above a certain level into a desired shape.

An object of the present invention is to provide an apparatus including a cylindrical rotating body that can solve the above-described problem.

Solution to Problem

A working apparatus according to the present invention includes
 a main body,
 a plurality of cylindrical rotating bodies disposed below the main body, and
 a control unit configured to control driving of the cylindrical rotating bodies, wherein
 the cylindrical rotating bodies include a motor and an exterior body configured to be rotated by the motor,
 wheels that function as a driving wheel, and
 a wheel motor configured to drive the wheels, and
 the plurality of cylindrical rotating bodies includes at least one first cylindrical rotating body including a blade, a claw, or a brush that is provided on a surface of the exterior body and is in contact with a ground.

In the working apparatus, the plurality of cylindrical rotating bodies may include a plurality of cylindrical rotating bodies connected serially with each other via a flexible coupling member.

In the working apparatus, the cylindrical rotating bodies may include four or more cylindrical rotating bodies, and
 the cylindrical rotating bodies may be arranged at regular intervals in a matrix or a zigzag pattern.

The working apparatus may include a plurality of extendable cylindrical bodies directly or indirectly coupled to the cylindrical rotating bodies, wherein
 the extendable cylindrical bodies may allow for adjusting a distance between the plurality of cylindrical rotating bodies and the main body.

In the working apparatus, the first cylindrical rotating body may have the blade or the claw on the surface of the exterior body, and the cylindrical rotating body may allow for mowing, pruning, logging, tilling, or snow removal.

In the working apparatus, the plurality of cylindrical rotating bodies may include at least one second cylindrical rotating body arranged in parallel with the first cylindrical rotating body, the second cylindrical rotating body including a storage chamber that stores seeds and an openable discharge port for sowing the seeds.

In the working apparatus, the plurality of cylindrical rotating bodies may include at least one third cylindrical rotating body arranged in parallel with the first cylindrical rotating body, the third cylindrical rotating body including a discharge port for spraying water, disinfectant, herbicide, fertilizer, or agrochemicals.

In the working apparatus, the first cylindrical rotating body may have the brush on the surface of the exterior body to be a cylindrical rotating body with the brush capable of cleaning, and
 the working apparatus may include a cover member that covers the exterior body and has a suction port that sucks debris, wherein the cylindrical rotation with the brush and a cylindrical rotation with the suction port may be arranged in parallel with each other In the working apparatus, the cylindrical rotating bodies may include three or more cylindrical rotating bodies, at least two of which may function as a driving wheel.

The working apparatus may be sized to be usable as a toy.

A working apparatus according to a second aspect of the present invention includes
 a first ground-contact working mechanism including a plurality of cylindrical rotating bodies arranged in a same straight line,
 a second ground-contact working mechanism including a plurality of cylindrical rotating bodies arranged in a same straight line,
 a frame on which the first ground-contact working mechanism and the second ground-contact working mechanism are arranged in parallel with each other, and
 a control unit configured to control driving of the cylindrical rotating bodies, wherein
 the cylindrical rotating bodies each include a motor and an exterior body configured to be rotated by the motor,
 the frame includes a front-back direction extendable mechanism that allows for adjusting a distance between the first ground-contact working mechanism and the second ground-contact working mechanism, and
 the exterior body has a surface provided with a blade or a claw so that the first and second ground-contact working mechanisms allow for mowing, pruning, logging, tilling, or snow removal.

In the working apparatus, the first ground-contact working mechanism may include a 1A-th rotation mechanism and a 1B-th rotation mechanism arranged in a same straight line,
  the second ground-contact working mechanism may include a 2A-th rotation mechanism and a 2B-th rotation mechanism arranged in a same straight line, and
  the frame may include a first width direction extendable mechanism allowing for adjusting a distance between the 1A-th rotation mechanism and the 1B-th rotation mechanism, and a second width direction extendable mechanism allowing for adjusting a distance between the 2A-th rotation mechanism and the 2B-th rotation mechanism.

In the working apparatus, the 1A-th rotation mechanism, the 1B-th rotation mechanism, the 2A-th rotation mechanism, and the 2B-th rotation mechanism may each include a plurality of cylindrical rotating bodies coupled together at an angle via a flexible coupling member.

The working apparatus may further include a cylindrical rotating body for shaping a ridge obliquely sticking from the first ground-contact working mechanism and/or the second ground-contact working mechanism, wherein
  the cylindrical rotating body for shaping a ridge may include a motor and an exterior body configured to be rotated by the motor.

The working apparatus may include a rack section on which a load is placed, and
  a plurality of rack section extendable cylindrical bodies directly or indirectly coupled to the rack section, wherein
  the rack section extendable cylindrical bodies may allow for adjusting a distance between the rack section and the wheels.

A working apparatus according to a third aspect of the present invention includes
  a rack section on which a load is placed,
  a cylindrical rotating body disposed below the rack section,
  wheels that function as a driving wheel,
  a wheel motor configured to drive the wheels,
  a plurality of wheel extendable mechanisms directly or indirectly coupled to the rack section, and
  a cylindrical rotating body extendable mechanism directly or indirectly coupled to the rack section, wherein
  the wheel extendable mechanisms allow for adjusting a distance between the rack section and the wheels, and
  the cylindrical rotating body extendable mechanism allows for adjusting a distance between the cylindrical rotating body and the rack section.

The working apparatus may include a plurality of wheel extendable cylindrical bodies directly or indirectly coupled to the wheels, wherein
  the wheel extendable cylindrical bodies may allow for adjusting a distance between the wheels in a width direction.

A working apparatus according to a fourth aspect of the present invention includes
  a main body section movable along an elongated member R stretched above,
  an opening adjustment unit disposed below the main body section,
  two rotating body aggregates each coupled to the opening adjustment unit at an adjustable opening-closing angle, and
  wheels individually disposed below the two rotating body aggregates, wherein
  the rotating body aggregates each have a plurality of cylindrical rotating bodies connected serially with each other,
  the cylindrical rotating bodies include a motor, an exterior body configured to be rotated by the motor, and a pruning blade provided on an outer periphery of the exterior body, and
  the main body section and the opening adjustment unit are coupled together via a rotary board to constitute a pruning mechanism configured to trim a tree by rotating the opening adjustment unit with the rotary board to swing the two rotation aggregates such that the wheels leave a circular track.

In the working apparatus, the rotary board and the opening adjustment unit may be coupled together via a height adjustment unit, and the height adjustment unit may allow for adjusting a height of the opening adjustment unit.

The working apparatus may include an extendable mechanism configured to adjust a vertical distance between the wheels and the rotating body aggregates.

In the working apparatus, the cylindrical rotating bodies constituting each of the rotating body aggregates may be coupled together via a coupling member configured to couple the cylindrical rotating bodies together at an adjustable angle.

In the working apparatus, the main body section may include a left movable section and a right movable section that are separable, and a sliding mechanism that slidably supports the left movable section and the right movable section,
  the opening adjustment unit may include a left opening adjustment section and a right opening adjustment section that are separable and support the sliding mechanism, and
  when the left movable section and the right movable section are separated, the left opening adjustment section and the right opening adjustment section as well as the two rotating body aggregates coupled to the opening adjustment unit may be separated.

A working apparatus according to a fifth aspect of the present invention includes
  a cylindrical rotating body, and
  a base section coupled to the cylindrical rotating body, wherein
  the cylindrical rotating body includes
  a motor and
  an exterior body configured to be rotated by the motor, and
  the base section has a hole to be wearable on a fingertip.

In the working apparatus, the exterior body may have a surface provided with a brush, and rotation of the cylindrical rotating body may allow for brushing in an oral cavity.

In the working apparatus, the cylindrical rotating body may be one of three or more cylindrical rotating bodies, and
  the working apparatus may further include coupling members each coupling two of the cylindrical rotating bodies together at an angle smaller than 180°.

A working apparatus according to a sixth aspect of the present invention includes
  a main body extending in a first direction,
  a first cylindrical rotating body extending in a second direction crossing the first direction,
  a second cylindrical rotating body extending in a third direction crossing the first direction,
  a first coupling member coupling the main body to the first cylindrical rotating body at an adjustable angle, and a second coupling member coupling the main body to the second cylindrical rotating body at an adjustable angle, wherein the first and second cylindrical rotating bodies each include a driving section and an exterior body configured to be rotated by the driving section, the exterior body having a surface provided with a brush, and rotation of the first and second cylindrical rotating bodies allows for brushing in an oral cavity.

In the working apparatus, the main body may be constituted by a third cylindrical rotating body including a driving section and an exterior body configured to be rotated by the driving section, the exterior body having a surface provided with a brush, and the first to third cylindrical rotating bodies may be arranged in a U shape to be able to surround a tooth for brushing.

The working apparatus may include a fourth cylindrical rotating body facing to the first cylindrical rotating body and a fifth cylindrical rotating body facing to the second cylindrical rotating body, wherein angles of the fourth and fifth cylindrical rotating bodies with respect to the main body may be adjustable, the fourth and fifth cylindrical rotating bodies may include a driving section and an exterior body configured to be rotated by the driving section, the exterior body having a surface provided with a brush, and rotation of the fourth and fifth cylindrical rotating bodies may allow for brushing in an oral cavity.

In the working apparatus, the main body, the first cylindrical rotating body, and/or the second cylindrical rotating body may have a through-hole through which a vacuum hose, a needle nozzle, a catheter, or a fiber camera is inserted, and the working apparatus may include the vacuum hose, the needle nozzle, the catheter, or the fiber camera inserted through the through-hole.

In the working apparatus, the main body, the first cylindrical rotating body, a tip member of the first cylindrical rotating body, the second cylindrical rotating body, and/or a tip member of the second cylindrical rotating body may include an ultrasonic transducer.

The working apparatus may include a balloon that is positioned at a throat side of the main body when installed, wherein the balloon may be able to be inflated by supplying air to the balloon and be deflated by exhausting the air in the balloon.

A working apparatus according to a seventh aspect of the present invention includes a main body that is mouthguard-shaped,
a first cylindrical rotating body (310a) sticking upright from the main body,
a second cylindrical rotating body (310b) sticking upright from the main body,
an inside-movement mechanism (320) configured to move the first cylindrical rotating body along an inner peripheral line of the main body, and
an outside-movement mechanism (330) configured to move the second cylindrical rotating body along an outer peripheral line of the main body, wherein
the first and second cylindrical rotating bodies each include a driving section and an exterior body configured to be rotated by the driving section, the exterior body having a surface provided with a brush, and rotation of the first and second cylindrical rotating bodies with movement caused by the inside-movement mechanism and the outside-movement mechanism allows for brushing in an oral cavity.

A working apparatus according to an eighth aspect of the present invention includes a first main body that is mouthguard-shaped,
a second main body that is mouthguard-shaped and is disposed at an inner periphery side of the first main body, and
cylindrical rotating bodies sticking from the first and second main bodies, wherein
the cylindrical rotating bodies include a driving section and an exterior body configured to be rotated by the driving section, the exterior body having a surface provided with a brush, and
the cylindrical rotating bodies are arranged along an inner peripheral line or an outer peripheral line of the first and second main bodies, and rotation of the cylindrical rotating bodies allows for brushing in an oral cavity.

In the working apparatus, the cylindrical rotating bodies (410) may stick substantially upward or downward from the first and second main bodies.

In the working apparatus, the cylindrical rotating bodies (617, 619) may stick substantially horizontally from the first and second main bodies and have an end surface provided with a brush.

A working apparatus according to a ninth aspect of the present invention includes a first main body that is mouthguard-shaped,
a second main body that is mouthguard-shaped and is disposed at an inner periphery side of the first main body,
a handle member coupling the first main body to the second main body, and
a vibrating unit configured to vibrate the first main body and the second main body, wherein
an inner peripheral surface of the first main body and an outer peripheral surface of the second main body make a gap G of which width is substantially even, and
the inner peripheral surface of the first main body and the outer peripheral surface of the second main body each have a brush to allow for brushing in an oral cavity.

In the working apparatus, vibrations from the vibrating unit may be transferred to the first main body and the second main body through a vibrating plate that is embedded in the inner peripheral surface of the first main body, the second main body, and the handle member.

A working apparatus according to a tenth aspect of the present invention includes a first main body that is mouthguard-shaped, a first annular elastic body that has a surface provided with a brush and constitutes a side surface of the first main body,
a first rotating body aggregate that has a driving section configured to rotate the first annular elastic body and is provided to the first main body,
a second main body that is mouthguard-shaped and is disposed at an inner periphery side of the first main body,
a second annular elastic body that has a surface provided with a brush and constitutes a side surface of the second main body, and
a second rotating body aggregate that has a driving section configured to rotate the second annular elastic body and is provided to the second main body, wherein
rotation of the first and second rotating body aggregates allows for brushing in an oral cavity.

A working apparatus according to an eleventh aspect of the present invention includes
a main body that is mouthguard-shaped,
a tooth inside-washing rotation mechanism that is U-shaped and includes three or more cylindrical rotating bodies connected serially with each other via a flexible coupling member,
a tooth outside-washing rotation mechanism that is U-shaped and includes three or more cylindrical rotating bodies connected serially with each other via a flexible coupling member,
a first pressing member configured to press the tooth inside-washing rotation mechanism toward the tooth outside-washing rotation mechanism, and
a second pressing member configured to press the tooth outside-washing rotation mechanism toward the tooth inside-washing rotation mechanism, wherein
driving the tooth inside-washing rotation mechanism and the tooth outside-washing rotation mechanism allows for brushing in an oral cavity.

In the working apparatus, the main body may include a sensor, a storage unit that stores a measurement from the sensor, and a wireless communication unit configured to transmit the measurement from the sensor to outside.

The working apparatus may include an elastic member that has a thick disk shape or a substantial drop shape, is positioned at a throat side of the main body when installed, and is used for training of a jaw, a tongue, or a throat.

In the working apparatus, the elastic member may have a through-hole, and
the working apparatus may include a vacuum hose, a needle nozzle, a catheter, an endoscope, a cotton swab, or a fiber camera inserted through the through-hole.

The working apparatus may include a balloon that is positioned at a throat side of the main body when installed, wherein the balloon may be able to be inflated by supplying air to the balloon and be deflated by exhausting the air in the balloon.

In the working apparatus, the balloon may have a through-hole, and
the working apparatus may include a vacuum hose, a needle nozzle, a catheter, an endoscope, a cotton swab, or a fiber camera inserted through the through-hole of the balloon.

A working apparatus according to a twelfth aspect of the present invention includes
a mask member, and
a plurality of rotating body aggregates disposed inside the mask member, wherein
the rotating body aggregates each include cylindrical rotating bodies including a driving section and an exterior body configured to be rotated by the driving section, the exterior body having a surface provided with a blade, and a coupling member movably coupling the cylindrical rotating bodies together, and rotation of the cylindrical rotating bodies allows for shaving a face or a head.

A working apparatus according to a thirteenth aspect of the present invention includes
a tooth brushing unit and a face or head shaving unit, wherein
the tooth brushing unit is the working apparatus including the brush,
the face or head shaving unit is the working apparatus capable of shaving a face or a head, and
the tooth brushing unit is disposed in the mask member to allow for brushing teeth and shaving a face or a head simultaneously.

A working apparatus according to a fourteenth aspect of the present invention includes
two or more cylindrical rotating bodies,
a coupling member coupling the two or more cylindrical rotating bodies together at an adjustable angle, and
extendable cylindrical bodies that have an ear hook member and are coupled to the cylindrical rotating bodies, wherein
the cylindrical rotating bodies include
a motor and
an exterior body configured to be rotated by the motor, the exterior body having a surface provided with a blade, and
rotation of the cylindrical rotating bodies allows for shaving a face or a head.

A working apparatus according to a fifteenth aspect of the present invention includes a main body,
a first cylindrical rotating body that includes a propeller and is directly or indirectly connected to the main body,
a second cylindrical rotating body that includes a propeller and is directly or indirectly connected to the main body,
a first coupling member allowing for adjusting an angle of the first cylindrical rotating body with respect to the main body,
a second coupling member allowing for adjusting an angle of the second cylindrical rotating body with respect to the main body,
a power source section, and
a controller including an acceleration sensor, wherein rotation of the first and second cylindrical rotating bodies allows the working apparatus to fly,
the first and second cylindrical rotating bodies include a motor and an exterior body configured to be rotated by the motor, and
the controller is configured to adjust the angles of the first and second cylindrical rotating bodies with respect to the main body using the first and second coupling members as well as rotation speeds of the propellers of the first and second cylindrical rotating bodies based on a signal from the acceleration sensor.

The working apparatus may include a third cylindrical rotating body connecting the first coupling member with the main body,
a fourth cylindrical rotating body connecting the second coupling member with the main body,
a third coupling member allowing for adjusting an angle of the third cylindrical rotating body with respect to the main body, and
a fourth coupling member allowing for adjusting an angle of the fourth cylindrical rotating body with respect to the main body, wherein
the controller may be configured to adjust the angles of the third and fourth cylindrical rotating bodies with respect to the main body using the third and fourth coupling members based on a signal from the acceleration sensor.

The working apparatus may include a base (1102) that supports the main body, wherein
the base may have a front part provided with a front coupling member allowing for adjusting an angle of the base with respect to the third cylindrical rotating body, the base may have a rear part provided with a rear coupling member allowing for adjusting an angle of the base with respect to the fourth cylindrical rotating body, and the base may be able to be disposed at an arbitrary angle with respect to the first to fourth cylindrical rotating bodies.

In the working apparatus, the base may include a pair of wings.

The working apparatus may include a third cylindrical rotating body that includes a propeller and is directly or indirectly connected to the main body, a fourth cylindrical rotating body that includes a propeller and is directly or indirectly connected to the main body, a third coupling member allowing for adjusting an angle of the third cylindrical rotating body with respect to the main body, a fourth coupling member allowing for adjusting an angle of the fourth cylindrical rotating body with respect to the main body, a first coupling pole member on which the first to third cylindrical rotating bodies are arranged in a same straight line with the second cylindrical rotating body positioned between the first cylindrical rotating body and the third cylindrical rotating body, and a second coupling pole member (1210g) that is disposed perpendicular to the third coupling member and couples the second cylindrical rotating body to the fourth cylindrical rotating body, wherein the controller may be configured to adjust the angles of the third and fourth cylindrical rotating bodies with respect to the main body using the third and fourth coupling members based on a signal from the acceleration sensor.

The working apparatus may include third to sixth cylindrical rotating bodies each of which includes a propeller and is directly or indirectly connected to the main body, third to sixth coupling members allowing for adjusting angles of the third to sixth cylindrical rotating bodies with respect to the main body, respectively, a first coupling pole member (1310g, 1310h) on which the first to third cylindrical rotating bodies are arranged in a same straight line with the second cylindrical rotating body positioned between the first cylindrical rotating body and the third cylindrical rotating body, a second coupling pole member (1310i, 1310j) on which the fourth to sixth cylindrical rotating bodies are arranged in a same straight line with the fifth cylindrical rotating body positioned between the fourth cylindrical rotating body and the sixth cylindrical rotating body, and a third coupling pole member (1310k) coupling the second cylindrical rotating body to the fifth cylindrical rotating body, wherein may be disposed on the fourth coupling member, and the controller may be configured to adjust the angles of the third to fourth cylindrical rotating bodies with respect to the main body using the third to sixth coupling members based on a signal from the acceleration sensor.

The working apparatus may include a third cylindrical rotating body that includes a propeller and is directly or indirectly connected to the main body, a fourth cylindrical rotating body that includes a propeller and is directly or indirectly connected to the main body, a third coupling member allowing for adjusting an angle of the third cylindrical rotating body with respect to the main body, a fourth coupling member allowing for adjusting an angle of the fourth cylindrical rotating body with respect to the main body, a frame on which the first to fourth cylindrical rotating bodies are arranged at corners of a rectangle or a square, and the main body provided on the frame, wherein the controller may be configured to adjust the angles of the third and fourth cylindrical rotating bodies with respect to the main body using the third and fourth coupling members based on a signal from the acceleration sensor.

In the working apparatus, the frame may include a pair of wings.

In the working apparatus, the main body may include width direction extendable mechanisms as many as the propellers of the first to fourth cylindrical rotating bodies, the width direction extendable mechanisms each allowing for adjusting a horizontal distance between the propellers.

In the working apparatus, the main body may include vertically extendable mechanisms as many as the propellers of the first to fourth cylindrical rotating bodies, the vertically extendable mechanisms each allowing for adjusting a vertical distance between the propellers, and the controller may be configured to automatically adjust extension and contraction of the vertically extendable mechanisms based on a signal from the acceleration sensor.

In the working apparatus, the controller may be configured to separately control the angles of the first to fourth cylindrical rotating bodies using the first to fourth coupling members and separately control rotation directions of the propellers to achieve switching between an ascension mode and a horizontal movement mode.

The working apparatus may include a base section coupling member allowing for inclining the propellers of the first to fourth cylindrical rotating bodies outward from a base section.

The working apparatus may include an attachment to be coupled to an external automobile, an external airplane, or an external ship, wherein horizontal thrust may be able to be generated by inclining the propellers using the first to fourth coupling members.

The working apparatus may be able to be utilized as a submarine boat.

A working apparatus according to a sixteenth aspect of the present invention includes a trunk section, main wings, cylindrical rotating bodies for main wing that each have a propeller and are provided to the main wings, coupling members for main wing allowing for separately adjusting angles of the cylindrical rotating bodies for main wing with respect to the main wings, a tail, and a controller including an acceleration sensor, wherein rotation of the cylindrical rotating bodies for main wing allows the working apparatus to fly, the cylindrical rotating bodies for main wing include a motor and an exterior body configured to be rotated by the motor, and the controller is configured to adjust the angles of the cylindrical rotating bodies for main wing with respect to the main body using the coupling members for main wing as well as rotation speeds of the propellers of the cylindrical rotating bodies for main wing based on a signal from the acceleration sensor.

The working apparatus may include cylindrical rotating bodies for tail that each have a propeller and are provided to the tail and
- coupling members for tail allowing for separately adjusting angles of the cylindrical rotating bodies for tail with respect to the tail, wherein
- the cylindrical rotating bodies for tail may include a motor and an exterior body configured to be rotated by the motor, and
- the controller may be configured to adjust the angles of the cylindrical rotating bodies for tail with respect to the main body using the coupling members for tail as well as rotation speeds of the propellers of the cylindrical rotating bodies for tail based on a signal from the acceleration sensor.

The working apparatus may include a main wing coupling member provided on a bottom surface of each of the main wings and
- a tail coupling member provided on a bottom surface of the tail, wherein
- the cylindrical rotating bodies for main wing and the coupling members for main wing may be disposed at a front side and a rear side of the main wing coupling member, and
- the cylindrical rotating bodies for tail and the coupling members for tail may be disposed at a front side and a rear side of the tail coupling member.

A working apparatus according to a seventeenth aspect of the present invention includes
- a main body,
- a cylindrical rotating body that includes a propeller and is directly or indirectly connected to the main body,
- a coupling member allowing for adjusting an angle of the cylindrical rotating body with respect to the main body,
- a power source section, and
- a controller including an acceleration sensor and a wireless communication unit, wherein
- the cylindrical rotating body includes a motor and an exterior body configured to be rotated by the motor,
- the propeller is constituted by a cylindrical rotating body having an exterior body provided with a blade member,
- rotation of the cylindrical rotating body allows the working apparatus to fly, and
- the controller is configured to adjust the angle of the cylindrical rotating body with respect to the main body using the coupling member as well as a rotation speed of the propeller of the cylindrical rotating body based on a signal from the acceleration sensor.

The working apparatus may include a movable section of which relative position with respect to the main body is variable, wherein
- the cylindrical rotating body may be directly or indirectly connected to an upper part of the movable section, and
- the working apparatus may further include a second cylindrical rotating body that includes a propeller and is directly or indirectly connected to a lower part of the movable section, and
- a second coupling member allowing for adjusting an angle of the second cylindrical rotating body with respect to the main body, wherein
- the controller may be configured to adjust the angle of the second cylindrical rotating body with respect to the main body using the second coupling member as well as a rotation speed of the propeller of the second cylindrical rotating body based on a signal from the acceleration sensor.

A working apparatus according to an eighteenth aspect of the present invention includes
- a main body having a placement section,
- first to third cylindrical rotating bodies each of which includes a propeller and is directly or indirectly connected to the main body,
- first to third coupling members allowing for adjusting angles of the first to third cylindrical rotating bodies with respect to the main body,
- first to third base section coupling members coupling first to third coupling pole members to the main body,
- the first to third coupling pole members coupling the first to third base section coupling members to the first to third coupling members,
- a power source section, and
- a controller including an acceleration sensor, wherein rotation of the first to third cylindrical rotating bodies allows the working apparatus to fly,
- the first to third cylindrical rotating bodies include a motor and an exterior body configured to be rotated by the motor,
- the controller is configured to be able to adjust the angles of the first to third cylindrical rotating bodies with respect to the main body using the first to third coupling members as well as rotation speeds of the propellers of the first to third cylindrical rotating bodies based on a signal from the acceleration sensor, and
- bending at the first to third coupling members and/or the first to third base section coupling members allows for holding an object placed on the placement section.

In the working apparatus, the main body may include a sliding mechanism allowing at least two of the first to third base section coupling members to slide.

In the working apparatus, the main body may include a pair of wings.

In the working apparatus, the main body may be constituted by a first main body member and a second main body member and be able to be folded on a line between the first main body member and the second main body member to form a valley part.

A working apparatus according to a nineteenth aspect of the present invention includes
- a first working apparatus and a second working apparatus, wherein
- the first and second working apparatuses each include
- a rotating member configured to rotate on an elongated member,
- a main body coupled to the rotating member,
- a frame that is arch-shaped, is positioned below the main body, and is detachably coupled to the main body,
- a plurality of wheels supporting the frame,
- a driving unit configured to rotate the wheels,
- a control unit configured to control the driving unit, and
- a wireless communication unit, wherein
- covering the frames of the first and second working apparatuses with a cover member can result in forming a dome, and
- transmitting a control signal to the control unit via the wireless communication unit allows for adjusting a distance between the first and second working apparatuses.

In the working apparatus, the main body may include a sensor and a storage unit that stores a measurement from the sensor, and be able to transmit the measurement from the sensor to outside via the wireless communication unit.

In the working apparatus, the cover member may include a plastic sheet, and the dome may form an agricultural tunnel.

In the working apparatus, the rotating member may be one of a plurality of rotating members coupled to the frame at regular intervals, and the wheels may be coupled to the frame via an extendable mechanism.

A working apparatus according to a twentieth aspect of the present invention is a working apparatus for cleaning a bathtub including a main body, a main body driving section configured to make the main body travel along a sidewall of a bathtub, a cylindrical rotating body, and a coupling member configured to variably fix an angle between the main body and the cylindrical rotating body, wherein the cylindrical rotating body includes a motor and an exterior body configured to be rotated by the motor, the exterior body having a surface provided with a brush.

In the working apparatus, the cylindrical rotating body may be one of a first cylindrical rotating body sticking in a first direction and a second cylindrical rotating body sticking in a second direction different from the first direction, and the working apparatus may further include a coupling member configured to variably fix an angle between the first cylindrical rotating body and the second cylindrical rotating body.

The working apparatus may include a third cylindrical rotating body including a motor and an exterior body configured to be rotated by the motor, the exterior body having a surface provided with a brush, and a second coupling member configured to variably fix an angle between the second cylindrical rotating body and the third cylindrical rotating body.

In the working apparatus, the main body may be coupled to a slave via an extendable mechanism, the slave may include an outside-surface cleaning cylindrical rotating body sticking in the first direction, and the outside-surface cleaning cylindrical rotating body may include a motor and an exterior body configured to be rotated by the motor, the exterior body having a surface provided with a brush.

A working apparatus according to a twenty-first aspect of the present invention is a working apparatus for cleaning a toilet including a self-traveling section capable of autonomously traveling on a floor surface, first and second cylindrical rotating bodies, an extendable mechanism indirectly connected to the self-traveling section, a first coupling member movably coupling the first and second cylindrical rotating bodies together, and a second coupling member movably coupling the second cylindrical rotating body to the extendable mechanism, wherein the first cylindrical rotating body includes a motor and an exterior body configured to be rotated by the motor, the exterior body having a surface provided with a brush, and the second cylindrical rotating body includes a motor and an exterior body configured to be rotated by the motor, the exterior body having a surface provided with a brush, a sponge, or a cleaning cloth.

Advantageous Effects of Invention

According to the present invention, it is possible to provide a working apparatus including a cylindrical rotating body that functions as a driving wheel or a working member.

BRIEF DESCRIPTION OF DRAWINGS

FIG. 1 is a perspective view of an example of a rotating body aggregate according to a first embodiment;

FIGS. 2A to 2C illustrate views for explaining coupling of cylindrical rotating bodies and a rotating motion, where FIG. 2A is a side view of the cylindrical rotating bodies before being coupled together, FIG. 2B is a side view of the cylindrical rotating bodies that rotate in a coupling state, and FIG. 2C is a side view of a variation of the cylindrical rotating bodies that rotate in a coupling state;

FIG. 3 is a block diagram showing a configuration of the cylindrical rotating body according to the present embodiment;

FIGS. 4A to 4C illustrate views of examples of a carriage including the cylindrical rotating bodies according to the first embodiment, where FIG. 4A is a side view of the carriage including the four cylindrical rotating bodies as wheels, FIG. 4B is a side view of the carriage including the four cylindrical rotating bodies as wheels, and FIG. 4C is a side view of the carriage including rotary boards each having a bottom surface to which the cylindrical rotating bodies are attached;

FIGS. 5A and 5B illustrate block diagrams showing a configuration of a cylindrical rotating body according to a second embodiment, where FIG. 5A shows a contracted state and FIG. 5B shows an extended state;

FIG. 6 is a block diagram showing a configuration of a cylindrical rotating body according to a third embodiment;

FIG. 7 is a perspective view of an example of a rotating body aggregate according to a fourth embodiment;

FIG. 8 is a perspective view of an example of a rotating body aggregate according to a fifth embodiment;

FIG. 9 is a perspective view of an example of the rotating body aggregate according to the fifth embodiment;

FIGS. 10A to 10C illustrate views of examples of a robot hand including a rotating body aggregate according to a sixth embodiment, where FIG. 10A is a plan view, FIG. 10B is a side view showing a holding state, and FIG. 10C is a side view of the rotating body aggregate having a blade;

FIG. 11 is a diagram showing a working apparatus including a rotating body aggregate according to a seventh embodiment;

FIG. 12 illustrates a variation of the working apparatus including the rotating body aggregate according to the seventh embodiment and is a side view of a mowing mechanism made up of two cylindrical rotating bodies;

FIGS. 13A to 13D illustrate views of a working apparatus including a rotating body aggregate according to an eighth embodiment, where FIG. 13A is a perspective view of a mowing apparatus including mowing mechanisms made up of three cylindrical rotating bodies, FIG. 13B is a side view, FIG. 13C is a plan view, and FIG. 13D is a side view of a variation;

FIG. 14A is a front view of a first variation of an agricultural vehicle (agricultural equipment) including the rotating body aggregate according to the eighth embodiment, FIG. 14B is a front view of a second variation, and FIG. 14C is a front view of a mowing mechanism;

FIG. 15 is a diagram showing an example of an agricultural vehicle (agricultural equipment) including a rotating body aggregate according to a ninth embodiment;

FIGS. 16A to 16C illustrates diagrams showing examples of a working apparatus (fingerstall) including a cylindrical rotating body or a rotating body aggregate according to a tenth embodiment, where FIG. 16A is a configuration example including the single cylindrical rotating body, FIG. 16B is a configuration example including the rotating body aggregate, and FIG. 16C is a configuration example including a bending section;

FIG. 17A is a plan view of a coupling member according to an eleventh embodiment, and FIG. 17B is a plan view showing a state where cylindrical rotating bodies are coupled to the coupling member;

FIG. 18A is a plan view of a working apparatus including a rotating body aggregate according to the eleventh embodiment, FIG. 18B is a perspective view, and FIG. 18C is a side view showing a state where an automobile is mounted;

FIG. 19 is a diagram showing a working apparatus including a rotating body aggregate according to a twelfth embodiment;

FIGS. 20A to 20C illustrate views for explaining a working apparatus including a cylindrical rotating body according to a thirteenth embodiment, where FIG. 20A is a front view of a first carriage including the cylindrical rotating body below a rack section, FIG. 20B is a front view of a second carriage including the cylindrical rotating body below the rack section, and FIG. 20C is a front view of a third carriage including cylindrical rotating bodies for driving a wheel;

FIG. 21 is a diagram for explaining a variation of the working apparatus according to the thirteenth embodiment;

FIG. 22A is a side view of a working apparatus including a cylindrical rotating body according to a fourteenth embodiment, and FIG. 22B is a plan view of a variation of the working apparatus in FIG. 20A;

FIG. 23A is a plan view of a working apparatus including cylindrical rotating bodies according to a fifteenth embodiment, and FIG. 23B is a plan view of a variation of the working apparatus in FIG. 23A;

FIG. 24A is a side view for explaining a working apparatus according to a variation of the fifth embodiment, FIG. 24B is a side view for explaining a first posture of a rotating body aggregate, and FIG. 24C is a side view for explaining a second posture of the rotating body aggregate;

FIG. 25A is a side view for explaining a working apparatus according to a first variation of the eighth embodiment, and FIG. 25B is a side view for explaining a working apparatus according to a second variation;

FIG. 26A is a bottom view of a working apparatus including a rotating body aggregate according to a variation of the fifth embodiment, and FIG. 26B is a side view;

FIG. 27 is a side view of an extendable cylindrical body to be connected to a rotating body aggregate according to the second embodiment;

FIG. 28 is a side view of a cylindrical rotating body connected to the extendable cylindrical body in FIG. 27;

FIG. 29 is a plan view of a lifting apparatus including a rotating body aggregate with the extendable cylindrical bodies connected to both ends;

FIG. 30 is a side view of a tilling mechanism formed by attaching tilling claws to a cylindrical rotating body;

FIG. 31 is a plan view showing a relevant part of the tilling mechanism in FIG. 30;

FIGS. 32A and 32B illustrate views showing a coupling mode of the cylindrical rotating bodies in FIG. 30, where FIG. 32A is a side view of the cylindrical rotating bodies coupled together, and FIG. 32B is a side view of a coupler;

FIG. 33 is a bottom view showing a configuration example where cylindrical rotating bodies are utilized as a road roller;

FIG. 34 is a diagram for explaining a working apparatus according to a variation of the sixth embodiment;

FIG. 35 is a side view of a working apparatus including cylindrical rotating bodies according to a sixteenth embodiment;

FIG. 36 is a partial cross-sectional side view of a first variation of the cylindrical rotating body according to the sixteenth embodiment;

FIG. 37 is a side view of a working apparatus showing a second variation of the sixteenth embodiment;

FIG. 38A is a side view of a working apparatus including cylindrical rotating bodies according to a seventeenth embodiment, and FIG. 38B is a cross-sectional view taken along line AA of FIG. 38A;

FIG. 39A is a side view of an inside-movement mechanism according to the seventeenth embodiment, and FIG. 39B is a side view of a variation of the inside-movement mechanism in FIG. 39A;

FIG. 40 is a bottom view of a working apparatus including cylindrical rotating bodies according to an eighteenth embodiment;

FIG. 41 is a plan view of a working apparatus according to a nineteenth embodiment;

FIG. 42 is a plan view of a variation of the working apparatus according to the nineteenth embodiment;

FIG. 43A is a bottom view of a working apparatus according to a twentieth embodiment, and FIG. 43B is a side view;

FIG. 44 is a side view of a working apparatus including cylindrical rotating bodies according to a twenty-first embodiment;

FIG. 45 is a side view for explaining a usage mode of the working apparatuses according to the eighteenth embodiment and the twenty-first embodiment;

FIG. 46A is a front view showing a first state of a working apparatus according to a twenty-second embodiment, and FIG. 46B is a front view showing a second state;

FIG. 47A is a perspective view of a working apparatus according to a twenty-third embodiment, and FIG. 47B is a perspective view according to a variation of the working apparatus according to the twenty-third embodiment;

FIG. 48A is a side view of a working apparatus (in an ascension mode) according to a twenty-fourth embodiment, FIG. 48B is a side view showing a horizontal movement mode, and FIG. 48C is a side view showing a loaded mode;

FIG. 49 is a side view of a variation of the working apparatus according to the twenty-fourth embodiment;

FIG. 50 is a side view of an example of an attachment for attaching the working apparatus according to the twenty-fourth embodiment to a roof part of an automobile;

FIG. 51 is a plan view of the working apparatus according to the twenty-fourth embodiment;

FIG. 52 is a perspective view of a working apparatus according to a twenty-fifth embodiment;

FIG. 53 is a perspective view of a working apparatus according to a twenty-sixth embodiment;

FIG. 54A is a side view of a working apparatus according to a twenty-seventh embodiment, FIG. 54B is a side view of a working apparatus 870, and FIG. 54C is a cross-sectional view taken along line AA of FIG. 54A;

FIG. 55A is a side view of a washing section of a working apparatus according to a twenty-eighth embodiment, FIG. 55B is a plan view of the working apparatus, and FIG. 55C is a side view according to a variation;

FIG. 56A is a perspective view of a working apparatus according to a twenty-ninth embodiment, and FIG. 56B is a perspective view according to a variation;

FIG. 57A is a side view of a working apparatus according to a thirtieth embodiment, FIG. 57B is a side view showing a first posture of a working apparatus according to a variation of the working apparatus in FIG. 57A, 57C is a side view showing a second posture, and FIG. 57D is a side view showing a third posture;

FIG. 58A is a side view showing a first posture of a working apparatus according to a thirty-first embodiment, FIG. 58B is a side view showing a second posture, and FIG. 58C is a side view according to a variation;

FIG. 59 is a perspective view of a working apparatus according to a thirty-second embodiment;

FIG. 60 is a perspective view of a working apparatus according to a thirty-third embodiment;

FIG. 61A is a plan view of a working apparatus according to a thirty-fourth embodiment, and FIG. 61B is a plan view of a variation of the working apparatus in FIG. 61A;

FIG. 62A is a side view of a working apparatus according to a thirty-fifth embodiment, and FIG. 62B is a plan view;

FIG. 63A is a side view of an inside-movement mechanism according to a thirty-sixth embodiment, and FIG. 63B is a side view of a variation of the inside-movement mechanism in FIG. 63A;

FIG. 64A is a perspective view of a working apparatus according to a thirty-seventh embodiment, and FIG. 64B is a perspective view of a variation of the working apparatus in FIG. 64A;

FIG. 65 is a perspective view of a working apparatus according to a thirty-eighth embodiment;

FIG. 66A is a side view for explaining a first posture of a working apparatus according to a thirty-ninth embodiment, FIG. 66B is a side view for explaining a second posture, and FIG. 66C is a side view of a working apparatus according to a variation of the thirty-ninth embodiment;

FIG. 67A is a side view for explaining a first posture of a working apparatus according to a variation of the twelfth embodiment, and FIG. 67B is a side view for explaining a second posture;

FIG. 68 is a side view of a working apparatus according to a fortieth embodiment;

FIG. 69 is a plan view of a working apparatus according to a forty-first embodiment;

FIG. 70 is a perspective view of a working apparatus according to a forty-second embodiment;

FIG. 71 is a perspective view of a working apparatus according to a forty-third embodiment; and FIG. 72A is a side view of a forty-fourth embodiment, and FIG. 72B is a bottom view.

DESCRIPTION OF EMBODIMENTS

Hereinafter, a cylindrical rotating body, a rotating body aggregate, and a working apparatus (also referred to as an agricultural vehicle, a toy car, a carriage, and a flying body) having the cylindrical rotating body according to the present invention will be described with reference to the drawings.

First Embodiment

FIG. 1 is a perspective view of a rotating body aggregate 1 according to a first embodiment. FIGS. 2A to 2C illustrate views for explaining coupling of cylindrical rotating bodies 10 and a rotating motion. FIG. 3 is a block diagram showing a configuration of the cylindrical rotating body 10 according to the first embodiment.

As shown in FIG. 1, the rotating body aggregate 1 according to the first embodiment is constituted by a plurality of the cylindrical rotating bodies 10 coupled together. Specifically, as shown in FIGS. 1 and 2, the rotating body aggregate 1 is formed by coupling a first coupling section 14 of the cylindrical rotating body 10 to a second coupling section 15 of the other cylindrical rotating body 10. In the present embodiment, an inner surface of the first coupling section 14 that is recessed and an outer surface of the second coupling section 15 that is protruded have spiral grooves (helicoids), which allows the first coupling section 14 of the cylindrical rotating body 10 to be screwed onto the second coupling section 15 of the other cylindrical rotating body 10 for coupling. The first coupling section 14 and the second coupling section 15 do not always have the spiral grooves (helicoids) and may have any structure that allows for mutual engagement of the first coupling section 14 and the second coupling section 15. For example, the first coupling section 14 and the second coupling section 15 may be male and female attachments (coupling joints).

As shown in FIGS. 2A to 2C, the rotating body aggregate 1 is sometimes used with one end (the coupling section 14 or coupling section 15) coupled to a coupling section 71 of a rotating body fixing member 70. The fixing member 70 is a portion of a working apparatus such as an agricultural vehicle, a toy car, or a carriage, for example.

As shown in FIG. 3, the cylindrical rotating body 10 includes a stator 11, a core 12, an exterior body 13, the first coupling section 14, and the second coupling section 15. In the present embodiment, the first coupling section 14 and the second coupling section 15 are formed integrally with the core 12, and the stator 11 is fixed inside the core 12.

The stator 11 constitutes a motor mechanism together with the exterior body (rotor, rotator) 13. The stator 11 has an electric current control unit and a plurality of stator coils, not shown, and magnetically rotates the exterior body 13 disposed at an outer side of the stator 11 with power supplied from inside or outside. As shown in FIG. 2B or 2C, the stator 11 is fixed inside the core 12, and the first coupling section 14 formed integrally with the core 12 is fixed to the rotating body fixing member 70 as described above. This configuration allows the stator 11 to be fixed and the exterior body 13 to be rotated. FIG. 2B shows a configuration where the exterior bodies 13, 13 of the coupled cylindrical rotating bodies 10, 10 rotate independently, and FIG. 2C shows a configuration where the exterior bodies 13, 13 of the coupled cylindrical rotating bodies 10, 10 rotate in an interlocking manner. In the variation in FIG. 2C, end surfaces 130, 130 each at a coupled side of the exterior bodies 13, 13 have zigzag faces and mesh with each other so that the exterior bodies 13, 13 are coupled together.

In the present embodiment, the first coupling section 14 and the second coupling section 15 have an electric contact point, not shown, which allows the stator 11 to be supplied with power from inside or outside via the first coupling section 14 and the core 12. The cylindrical rotating body 10 can be supplied with power from a coupled external apparatus (the rotating body fixing member 70) or the coupled cylindrical rotating body 10 at a power source side and can supply power to the coupled cylindrical rotating body 10 at a side opposite to the power source side. For example, in the examples shown in FIGS. 2B and 2C, power is supplied from the cylindrical rotating body 10 at the power source (rotating body fixing member 70) side (the left cylindrical rotating body 10 in FIGS. 2B and 2C) to the cylindrical rotating body 10 at the opposite side (the right cylindrical rotating body 10 in FIGS. 2B and 2C), which allows the two cylindrical rotating bodies to simultaneously rotate. In the present embodiment, an electric motor is illustrated as the motor mechanism. However, the motor mechanism does not always have this configuration and may take any configuration that allows the exterior body 13 to rotate, such as a hydraulic motor, a pneumatic motor, or a fuel-cell-type electric motor that uses hydrogen. As a driving source of the one cylindrical rotating body, a plurality of motors may be employed, or a hybrid driving source including an engine and a motor may be employed.

The exterior body 13 is formed to cover an outer periphery of the core 12 and to be rotatable. For example, the exterior body 13 has a magnet and functions as a rotator (rotor) relative to the stator 11.

The first coupling section 14 and the second coupling section 15 provided at the ends are members for being coupled to the second coupling section 15 and the first coupling section 14 of the other cylindrical rotating body 10 and have a structure for mutual engagement with the second coupling section 15 and the first coupling section 14 of the other cylindrical rotating body 10, respectively. For example, in the example shown in FIG. 1, the first coupling section 14 and the second coupling section 15 have spiral grooves (helicoids), which allows the first coupling section 14 to be screwed onto the second coupling section 15 of the other cylindrical rotating body 10. The first coupling section 14 and the second coupling section 15 are sometimes coupled to the coupling section 71 of the rotating body fixing member 70 as shown in FIGS. 2A and 2B or to an accessory described later, in addition to the case of being coupled to the second coupling section 15 and the first coupling section 14 of the other cylindrical rotating body 10.

Herein, FIGS. 4A to 4C illustrate views of a carriage 6a as an example of a working apparatus including the cylindrical rotating bodies 10 according to the first embodiment. The carriage 6a shown in FIG. 4A includes a rack section (main body) 80 on which a load is placed and, on a bottom surface of the rack section 80, four cylindrical rotating bodies 10 arranged at vertices of a square or a rectangle and a control unit (not shown). The control unit can separately drive the four cylindrical rotating bodies 10 used as wheels of the carriage 6a and can control driving and stopping of each of the cylindrical rotating bodies 10 for veering. The number of the cylindrical rotating bodies 10 disposed on the bottom surface of the rack section 81 is not limited to four, and may be three, five, six, eight, or ten, for example.

As shown in FIG. 4B, a rotating body aggregate 1 having two cylindrical rotating bodies 10 coupled together via a coupling member 2 may be used as each of the wheels of a carriage 6b, resulting in provision of the rotating body aggregates 1 having sufficient driving force. The coupling member 2 is flexible and thus deforms when passing through an area of irregular ground, which can enhance stability during traveling. The carriage 6b shown in FIG. 4B includes sliding mechanisms 81a to 81c allowing leg sections 82 to move in a horizontal direction and extendable mechanisms (for example, extendable cylindrical bodies 90 shown in FIG. 27) each provided between the leg section 82 and the cylindrical rotating body 10. These mechanisms allow for adjusting a relative position of the rotating body aggregate 1 with respect to the rack section 80.

Furthermore, as shown in FIG. 4C, a plurality of rotary boards (turntables) 83 may be provided on the bottom surface of the rack section 80 of a carriage 6c, and the cylindrical rotating body 10 or the rotating body aggregate 1 may be attached to each of the rotary boards 83. This configuration allows the carriage 6c to move in not only a front-back direction but any direction including a right-left direction and the like. In the carriage 6a shown in FIG. 4A, the leg section 82 has a coupling section for being coupled to the cylindrical rotating body 10 and functions as a rotating body fixing member (reference sign 70 in FIG. 1) that fixes the cylindrical rotating body 10. A horizontal position of the leg section 82 is freely adjustable. As shown in FIG. 4B, the leg section 82 can be coupled to the rotating body aggregate 1 made up of two or more cylindrical rotating bodies 10.

As described above, the cylindrical rotating body 10 according to the first embodiment has the motor (11, 13) therein and includes the first coupling section 14 and the second coupling section 15 capable of being directly coupled to another cylindrical rotating body to be able to rotate integrally with the other cylindrical rotating body 10. This configuration can realize, for example, as shown in FIG. 4B, the working apparatus that uses the rotating body aggregate 1 having a plurality of the cylindrical rotating bodies 10 coupled together as one of the wheels.

In the first embodiment, the configuration has been illustrated where the cylindrical rotating bodies 10 are utilized as wheels like the carriage shown in FIGS. 4A to 4C, but the present invention is not limited to this configuration. For example, the exterior bodies 13 of the cylindrical rotating bodies 10 may be coupled to wheels so that rotation of these wheels causes the rotating body aggregate 1 to rotate and travel.

Second Embodiment

Next, a cylindrical rotating body 10a according to a second embodiment will be described. FIGS. 5A and 5B illustrate block diagrams showing a configuration of the cylindrical rotating body 10a according to the second embodiment. The cylindrical rotating body 10a according to the second embodiment is configured similarly to the cylindrical rotating body 10 according to the first embodiment except for being extendable and contractable (that is, having an extendable mechanism) in a longitudinal direction.

In the second embodiment, a core 12a is constituted by a first core 121 and a second core 122 that are disposed in a nested manner Mutual contact faces of the first core 121 and the second core 122 have spiral grooves (helicoids), and rotation of the second core 122 with respect to the first core 121 allows the core 12a to extend and contract in the longitudinal direction.

As shown in FIGS. 5A and 5B, an exterior body 13a is constituted by a first exterior body 131 and a second exterior body 132 that are disposed in a nested manner Like the core 12a, mutual contact faces of the first exterior body 131 and the second exterior body 132 of the exterior body 13a have spiral grooves (helicoids), and rotation of the second exterior body 132 with respect to the first exterior body 131 allows the exterior body 13a to extend and contract in the longitudinal direction.

In the second embodiment, the first core 121 and the second core 122, and the first exterior body 131 and the second exterior body 132 have helicoid grooves to constitute the extendable mechanism that allows the core 12a and the exterior body 13a to extend and contract in the longitudinal direction. This configuration allows the cylindrical rotating body 10a to extend and contract in the longitudinal direction, but the extendable mechanism is not limited to this configuration. Furthermore, in the present embodiment, manual actions of extending and contracting the cylindrical rotating body 10a have been illustrated. However, the extendable mechanism is not limited to this configuration and can be constituted by an actuator (for example, a motor or a hydraulic cylinder) for extension and contraction of the cylindrical rotating body 10a to automatically extend and contract the cylindrical rotating body 10a.

FIG. 27 is a side view of an extendable cylindrical body 90 to be connected to a rotating body aggregate according to the second embodiment. As shown in the figure, an extension-contraction control unit 92, an accumulator 93, and a cylinder tube 96a of a hydraulic cylinder 96 are arranged in a cylindrical main body 91 downward from above. The cylindrical main body 91 also has a changeover switch (not shown) therein.

The hydraulic cylinder 96 includes the cylinder tube 96a and a piston rod 96b that is reciprocably inserted into the cylinder tube 96a and protrudes from the cylindrical main body 91 to be nested. A space in the cylinder tube 96a is separated with a piston 96c of the piston rod 96b into a first oil chamber 96e for retraction of the piston rod 96b and a second oil chamber 96f for extension of the piston rod 96b.

The accumulator 93 is connected to the oil chambers 96e, 96f by respective pipes, in each of which a valve is interposed (the pipes and valves are not shown).

When a control signal is input from the extension-contraction control unit 92 to the changeover switch, the changeover switch controls opening and closing of the valves. Supply and discharge of hydraulic oil (oil pressure) between the oil chambers 96e, 96f and the accumulator 93 can thus be controlled to adjust an extension amount of the piston rod 96b.

The cylindrical main body 91 has an upper end provided with a screw section 94, and the piston rod 96b has a lower end provided with a screw section 95. The screw section 94 and the screw section 95 have a diameter the same as that of the second coupling section 15 of the cylindrical rotating body 10 and can be screwed into the first coupling section 14 of the cylindrical rotating body 10 for coupling as shown in FIG. 28. Thus, a cylindrical rotating body 10 to which the extendable cylindrical body 90 is coupled is also included in the cylindrical rotating bodies having an extendable mechanism described in the specification. Unlike the configuration illustrated in the figure, one or both of the screw section 94 and the screw section 95 may be formed into a recessed coupling section having an inner surface provided with a spiral groove (helicoid) as in the first coupling section 14 of the cylindrical rotating body 10 to be able to be screwed onto the second coupling section 15 of the cylindrical rotating body 10.

As described above, the cylindrical rotating body 10a according to the second embodiment is extendable and contractable in the longitudinal direction. Accordingly, the cylindrical rotating body 10a can be used with a length thereof adjusted to user requirements.

Third Embodiment

Next, a cylindrical rotating body 10b according to a third embodiment will be described. FIG. 6 is a block diagram showing a configuration of the cylindrical rotating body 10b according to the third embodiment. As shown in FIG. 6, the cylindrical rotating body 10b according to the third embodiment is configured and operates similarly to the cylindrical rotating body 10 according to the first embodiment except for having a battery 16, a control unit 17, and a communication unit 18 therein.

The battery 16 is electrically connected to a stator 11, the control unit 17, and the communication unit 18 and supplies power to these members. A secondary battery can be used as the battery 16. In this case, the battery 16 may be directly connected to a commercial power source or a power generator to be supplied with power or may be charged via radio waves by a publicly known method. Furthermore, the battery 16 may be supplied with power from a photovoltaic generation apparatus or may be supplied with power from an automobile battery.

The control unit 17 is constituted by a microcomputer having a CPU, a ROM, and a RAM, not shown, and controls traveling of the cylindrical rotating body 10 based on a traveling program stored in the ROM in advance. The control unit 17 can obtain a traveling program input by a user from external equipment (not shown) via the communication unit 18 to store it in the RAM. The control unit 17 can also control the traveling according to the user's traveling program stored in the RAM.

The communication unit 18 is, for example, a wireless communication module capable of communication by Bluetooth (registered trademark) that is one of the radio communication standards, wireless Local Area Network (LAN) communication, or wireless Wide Area Network (WAN) communication. The communication unit 18 receives signals of the traveling program input by the user from the external equipment (not shown) or the like and transmits them to the control unit 17. This configuration also allows for remote control of motions of the cylindrical rotating body 10b.

As described above, the cylindrical rotating body 10b according to the third embodiment includes the battery 16. This configuration allows the cylindrical rotating body 10b to independently rotate even when no power is supplied from outside such as the fixing member. Furthermore, the cylindrical rotating body 10 according to the present embodiment has the control unit 17 to be able to perform rotation control based on the traveling program that is input by the user and is received from the communication unit 18. This configuration allows for utilizing the cylindrical rotating body 10b and a rotating body aggregate 1 constituted by the cylindrical rotating bodies 10b for a toy car as an intellectual toy for programming learning.

Fourth Embodiment

Next, a rotating body aggregate 1a according to a fourth embodiment will be described. FIG. 7 is a perspective view showing a configuration of the rotating body aggregate 1a according to the fourth embodiment. In the rotating body aggregate 1a according to the fourth embodiment, cylindrical rotating bodies 10 are not directly coupled to each other, but are coupled together via a coupling member 20.

The coupling member 20 is a cylindrical member for coupling two or more cylindrical rotating bodies 10 together. In the present embodiment, as shown in FIG. 7, the coupling member 20 includes a protruded coupling section 20a and a recessed coupling section 20b on both ends of a trunk section 21 to be coupled to the first coupling section 14 and the second coupling section 15 of the cylindrical rotating body 10, respectively.

The cylindrical rotating bodies 10 can be coupled together via the coupling member 20 to rotate in a coupling state. The coupling member 20 is smaller and longitudinally shorter than the cylindrical rotating body 10. In other words, a diameter of the trunk section 21 is preferably equal to or smaller than a diameter of the cylindrical rotating body 10.

The coupling member 20 has electric contact points on the protruded coupling section 20a and the recessed coupling section 20b and can supply power supplied from the coupled cylindrical rotating body 10 at a power source side to the coupled cylindrical rotating body 10 at the other side via the electric contact points. The coupling member 20 in a preferred mode communicably connects the cylindrical rotating bodies 10, 10 coupled together via the coupling member 20. The coupling member 20 may be provided with a motor that assists rotation of a motor of the cylindrical rotating body 10. From another point of view, the coupling member 20 may be constituted by a short cylindrical rotating body 10 having a motor mechanism therein.

Accordingly, in the rotating body aggregate 1a according to the fourth embodiment, a plurality of the cylindrical rotating bodies 10 coupled together via the coupling member 20 can integrally rotate.

Fifth Embodiment

Next, a lifting apparatus 100 as a working apparatus including a rotating body aggregate 1b according to a fifth embodiment will be described. FIG. 8 is a view showing a mode of the rotating body aggregate 1b according to the fifth embodiment before cylindrical rotating bodies 10 are coupled together, and FIG. 9 is a view showing a mode of the rotating body aggregate 1b according to the fifth embodiment after the cylindrical rotating bodies 10 are coupled together. The rotating body aggregate 1b according to the fifth embodiment is configured and operates similarly to the rotating body aggregate 1a according to the fourth embodiment except that a coupling member 22 has a shaft 23 and can turn around the shaft 23 as shown in FIGS. 8 and 9.

As shown in FIG. 8, the coupling member 22 has the shaft 23 in a middle part between trunk sections 21a, 21b. The shaft 23 can turn around one axis or a plurality of axes. Coupling sections 22a, 22b on both ends of the coupling member 22 can be coupled to the coupling sections 14, 15 of the cylindrical rotating body 10 as in the fourth embodiment. Furthermore, in the fifth embodiment, the coupling member 22 has an actuator (not shown) for turning around the shaft 23, and the shaft 23 can be turned based on control from outside. Control signals for this turning are electrically transferred from outside to the coupling member 22 via, for example, the rotating body fixing member 70 and the cylindrical rotating body 10 described in FIG. 1.

As shown in FIG. 9, turning of the shaft 23 of the coupling member 22 can make an angle θ between the two cylindrical rotating bodies 10 (that is, the trunk sections 21a, 21b) less than 180°. For example, as shown in FIGS. 24A and 24B, the rotating body aggregate 1b can thus form into a hook shape (U-shape or O-shape (with a locking mechanism)) to constitute a working apparatus 52 that moves with a motion of holding an object like a human finger.

Herein, the working apparatus 52 may include an imaging unit (camera), a processing unit, and a communication unit to be utilized as an inspection apparatus for electric wires and the like that inspects an electric wire W or a rail for damaged parts, a rail for obstacles thereon, and the like. The working apparatus 52 is coupled to the rotating body aggregate 1b by a coupler 43 that may have a fixed length or may be extendable and contractable. In this case, it is possible, on a portion of the electric wire W other than a joint portion, to cause the rotating body aggregate 1b to tightly hold the electric wire W as shown in FIG. 24B and, on the joint portion of the electric wire W to which various members are attached, to cause the rotating body aggregate 1b to make a gap between the electric wire W and the rotating body aggregate 1b for avoiding the members as shown in FIG. 24C. When one of the rotating body aggregates 1b arranged in an advancing direction as shown in FIG. 24A comes immediately before the joint portion of the electric wire W, it is also possible to cause that rotating body aggregate 1b to separate from the electric wire W. Although not shown in FIGS. 24B and 24C, a mode where an outer periphery of the electric wire W is wholly wrapped is obviously possible.

FIGS. 24A to 24C illustrate a mode where the electric wire W is held, but the electric wire W may be replaced with a wire, a rebar, a pole, or the like. For example, the working apparatus 52 in FIG. 24A in a mode where the wire is held can be utilized with a tool such as a harness attached for a zip-line allowing for even reverse traveling. A laser inspection unit may be mounted on the working apparatus 52 instead of or together with the imaging unit (camera) to inspect a road, an electric wire, a rail, a structure, and the like. Captured images may be able to be checked on a smartphone.

FIG. 29 is a plan view of the lifting apparatus 100 including cylindrical rotating bodies 10 having ends both connected to extendable cylindrical bodies 90. Although simply drawn in FIG. 29, the extendable cylindrical bodies 90 are configured similarly to the extendable cylindrical body 90 in FIG. 27. The extendable cylindrical bodies 90 each have one end coupled to the cylindrical rotating body 10 and the other end connected to a coupling member 27 to make a triangular space in which a columnar member P such as a pole is held. The coupling member 27 functions as a movable shaft that makes an angle between the two connected extendable cylindrical bodies 90 variable. Varying lengths of the six extendable cylindrical bodies 90 and changing a size of the triangular space allows the lifting apparatus 100 including the coupling members 27 and the extendable cylindrical bodies 90 to perform lifting and lowering motions while maintaining contact with the columnar member P such as a pole even when a diameter of the columnar member P such as a pole is not uniform. This configuration allows for the lifting and lowering motions even when the diameter of the columnar member P such as a pole changes in a longitudinal direction like a natural tree or a power pole, for example.

As described above, in the rotating body aggregate 1b according to the fifth embodiment, the angle between the two cylindrical rotating bodies 10 can be made smaller than 180°, which allows the rotating body aggregate 1b to hold a string-like member or an elongated member W such as a rope or a wire and to rotate and travel on the rope or the wire as shown in FIGS. 24A to 24C, for example. Additionally, attaching a basket, a handle, a hook, or the like to such a rotating body aggregate 1b allows for usage as a lift that transports a load, a person, a robot, an agricultural machine, a construction engineering machine, or the like along the string-like member.

In the fifth embodiment, as shown in FIG. 9, the configuration has been illustrated where the coupling member 22 has the actuator that turns the shaft 23 and is turned under control of an external control unit. However, the present invention is not limited to this configuration and, for example, the coupling member 22 may be manually turned. In the above-described embodiment, the configuration has been illustrated where the power source (battery) for rotating the motor, the control unit, and the communication unit are included in an outside member such as the rotating body fixing member 70 or in the cylindrical rotating body 10. However, the coupling member 20 may have a battery 16, a control unit 17, and a communication unit 18.

Sixth Embodiment

Next, in a sixth embodiment, a robot hand 101 and a rotating body aggregate 101 that constitutes a finger of the robot hand and has a tip to which a blade 103 is attached will be described. In the robot hand 101 according to the sixth embodiment shown in FIG. 10A, finger parts (110a to 110e) each are configured similarly to the rotating body aggregate 1b according to the fifth embodiment and are coupled to five coupling sections provided to a back-of-hand section 102 by coupling members $120a_3$ to $120e_2$ disposed at lower ends of the finger parts. The coupling members $120a_3$ to $120e_2$ are configured similarly to the coupling member 27 and each function as a movable shaft that makes an angle between the two connected finger parts 110 variable.

In FIG. 10A, only the back-of-hand section 102 is indicated as a main body of a robot, but the back-of-hand section 102 may be coupled to a working multi-axis robot arm or to a robot arm of a humanoid robot.

The rotating body aggregate 1b may be attachable to and detachable from the back-of-hand section of the robot hand of a humanoid robot and may be attached to the robot as necessary. The number of the finger parts (110a to 110e) may be arbitrarily set to be more than one, and a configuration without the thumb (110e) is also possible. Power and control signals for operating the rotating body aggregates 110a to 110e as the finger parts of the robot hand are supplied from a back-of-hand section 102 side, which allows for independent free rotation of cylindrical rotating bodies $110a_1$ to $120e_2$ constituting the respective fingers of the robot hand.

The coupling members $120a_3$ to $120e_2$ each have an actuator that turns a movable shaft for adjusting an angle of the finger part 110, and turning of the coupling members $120a_3$ to $120e_2$ based on the power and the control signals supplied from the back-of-hand section 102 side allows for free motions such as gripping a string-like member R such as a rope as shown in FIG. 10B. It is possible to cause the rotating body aggregate 1b of the robot hand 101 to hold the string-like member R such as a rope for the robot having this robot hand 101 to float from the ground and move over the string-like member R such as a rope. The angles of the coupling members 120a3 to $120e_2$ may be adjusted for the robot hand 101 to grip weeds (for example, pinch the weeds between the cylindrical rotating bodies 110 corresponding to the fingers of the robot hand or between portions corresponding to the finger and a palm of the robot hand) so that rotation of the cylindrical rotating bodies 110 allows for a motion of pulling out the gripped weeds from the ground.

FIG. 10C is a side view of the rotating body aggregate 110 to which the blade 103 is attached according to the sixth embodiment. The rotating body aggregate 110 shown in FIG. 10C can be used as the finger section of the robot hand 101 or can be singly used. The rotating body aggregate 110 according to the sixth embodiment is constituted by the rotating body aggregate 1b according to the fifth embodiment having one end to which the blade 103 is attached and the other end to which a base section 102 is attached. The coupling members 120d1 to 120d3 each are configured similarly to the coupling member 27 and each function as a movable shaft that makes an angle between the cylindrical rotating bodies 110 variable.

Attaching to the tip portion a tool such as a blade, a sickle, a claw, scissors, a cutter, a trimmer, a mixer blade, a driver, pliers, flippers, a soldering iron, a welding torch, a drill, or a hooker for rebar also allows for a motion such as digging dirt (boring), softening dirt, or mixing dirt, or work such as engineering. In the sixth embodiment, the blade 103 is attached to the tip portion (the tip of the cylindrical rotating bodies $110d_1$ to $110d_3$) so that rotation of the cylindrical rotating body 110 together with the blade 103 allows the blade 103 to cut off a stem end of a fruit and a root of a vegetable for harvest. Attaching to the tip portion, instead of the blade 103 in the illustration, a tool such as a sickle, a claw, scissors, a cutter, a trimmer, a mixer blade, a driver, pliers, flippers, a soldering iron, a welding torch, a drill, or a hooker for rebar also allows for a motion such as digging dirt (boring), softening dirt, or mixing dirt, or work such as engineering. Alternatively, attaching a brush to the tip portion instead of the blade 103 in the illustration also allows for cleaning work. In addition, a brush may be provided on the exterior body of the cylindrical rotating body 110.

Furthermore, it is also possible to attach to the tip portion a device used for agitating powder, liquid, medical agents (including Chinese medicine), or the like, or a device used for kneading cray for ceramic art, noodle dough, bread dough, or the like. In this case, irregularities or an agitating blade may be provided on a surface of the cylindrical rotating body 110.

Note that angles of the coupling members 120d1 to 120d3 can be adjusted according to instructions from a controller installed at a base section 102 side, for example. Furthermore, rotation of the cylindrical rotating body 110 also allows such a rotation aggregation 101 to perform a motion of petting an animal and a plant and a motion of rubbing for processing a workpiece (for example, deburring, grinding/chamfering).

Seventh Embodiment

Next, a working apparatus according to a seventh embodiment will be described. Herein, FIG. 11 is a diagram showing an example of a working apparatus 4 according to the seventh embodiment. The working apparatus 4 is a traveling body including two long coupling members 25a, 25b that are elongated and attachable to a bottom surface of a main body (not shown), and three cylindrical rotating bodies 10. As shown in FIG. 11, the cylindrical rotating bodies 10 are arranged in a lateral width direction of the cylindrical rotating body 10 at regular intervals and are coupled together by the long coupling members 25a, 25b. For example, in the example shown in FIG. 11, the long coupling members 25a, 25b have protruded coupling sections 26a, 26b, respectively, as many as the cylindrical rotating bodies 10 coupled together. Each of the cylindrical rotating bodies 10 is coupled to the respective protruded coupling sections 26a, 26b so that the three cylindrical rotating bodies 10 function as driving wheels. The long coupling members 25a, 25b are connected to a power source (not shown) for supplying power to the cylindrical rotating bodies 10, and a control unit (not shown) for transferring control signals to the cylindrical rotating bodies 10, the power source and the control unit being installed on the main body. The protruded coupling sections 26a, 26b have electric contact points via which power can be supplied to the respective cylindrical rotating bodies 10.

As described above, in the working apparatus 4 according to the seventh embodiment, the cylindrical rotating bodies 10 are arranged in the lateral width direction of the cylindrical rotating body 10 and are coupled together to allow for traveling.

FIG. 12 is a view of a working apparatus 4' according to a variation of the seventh embodiment. The working apparatus 4' has two cylindrical rotating bodies 10d connected serially with each other via a coupling member 2. The cylindrical rotating body 10d is similar to the above-described cylindrical rotating body 10 but is different in that rotation of an exterior body having an outer peripheral surface to which blades 19 are attached results in a mowing mechanism 41. The coupling member 2 is flexible and deforms depending on ground irregularities, which enhances ground-holding ability of the cylindrical rotating bodies 10d.

The cylindrical rotating body 10d has an end that is not coupled to the coupling member 2 and is coupled to the long coupling member 25a, 25b. The long coupling members 25a, 25b are coupled to a rack section 80 including a power source (not shown) and a control unit (not shown) for transferring control signals. The protruded coupling sections 26a, 26b shown by dotted lines electrically connect the mowing mechanism 41 to the power source (not shown) and the control unit (not shown). The long coupling members 25a, 25b have outside surfaces on which six wheels 30 are attached at positions corresponding to the protruded coupling sections 26a, 26b. The wheels 30 are coupled to a driving unit and can be rotated for traveling. The wheel 30 preferably includes, for example, an in-wheel motor. The working apparatus 4' can carry an automobile on the rack section 80. The working apparatus 4' that is robust over a rough road can also be utilized as a vehicle transporting apparatus in times of disaster when automobiles become incapable of traveling on the rough road that is severely irregular and muddy.

The working apparatus 4 can be used as an apparatus for another purpose by modifying the main body. For example, a kneading apparatus can be provided in which noodle dough, bread dough, or the like is passed between the rotating cylindrical rotating bodies 10 in a rotating body aggregate 1c to be kneaded. Similarly, another kneading apparatus can be provided in which cray used for ceramic art or the like is passed between the rotating cylindrical rotating bodies 10 to be kneaded. Furthermore, in the rotating body aggregate 1c, one of the two long coupling members 25a, 25b may be detached. Providing irregularities on surfaces of the cylindrical rotating bodies 10 allows for usage as an agitating apparatus for powder, liquid, or the like, as a cleaning vehicle that cleans a surface of glass or wood floor, as a washing apparatus that washes dishes or foodstuffs, as a washing machine that washes vegetables or the like, as a working apparatus for scaling a fish, or as a massage device (apparatus) for a human body. Rotating motions may automatically start in response to an infrared sensor for usage as security equipment (apparatus) for crime prevention or a device (apparatus) for repelling harmful animals.

Eighth Embodiment

Next, a mowing mechanism 41 and a mowing apparatus 40 constituted by a rotating body aggregate according to an eighth embodiment will be described. FIGS. 13A to 13D illustrate views of examples of a mowing apparatus 40 as a working apparatus including the rotating body aggregate according to the eighth embodiment. In the examples, a cylindrical rotating body 10d according to the eighth embodiment has an exterior body 13 having an outer peripheral surface to which blades 19 are attached and constitutes the mowing mechanism as in FIG. 12.

FIG. 13A is a perspective view of the mowing apparatus 40 including the mowing mechanisms made up of the three cylindrical rotating bodies 10d, FIG. 13B is a side view, FIG. 13C is a plan view, and FIG. 13D is a side view of a variation. As shown in FIG. 13, coupling the cylindrical rotating bodies 10d having the blades 19 together allows a rotating body aggregate 1d to be utilized as the mowing mechanism, for example. As shown in FIG. 13D, each mowing mechanism may be constituted by a plurality of the cylindrical rotating bodies 10d. Attaching wheels 30 to both ends of each of the rotating body aggregates 1d and providing a wheel motor (not shown) that drives the wheels 30 results in the mowing apparatus 40 as a self-traveling working apparatus. Changing sizes of the cylindrical rotating bodies 10d and the blades 19 provided on the cylindrical rotating bodies 10d allows the mowing apparatus 40 to be utilized as a tilling machine, a pruning machine, or a logging machine (especially, a logging machine for a shrub or a small shrub).

FIG. 30 is a side view of a tilling mechanism 48 formed by attaching tilling claws (34, 35) to a cylindrical rotating body 10h, and FIG. 31 is a plan view showing a relevant part of the tilling mechanism 48.

The tilling mechanism 48 includes a plurality of flanges 33 fixed to an exterior body 13 and a plurality of sets of the right and left tilling claws (34, 35). Each of the flanges 33 has through-holes 38 through which a bolt B is inserted and the plurality of sets of right and left tilling claws (34, 35) detachably fixed thereto by the bolts B and nuts N. The right and left tilling claws (34, 35) each include an attachment base 36 having bolt insertion holes 37, and the bolt B is inserted through the bolt insertion hole 37 and the through-hole 38 to be fastened by the nut N. The exterior body 13 may have the one or more flanges 33, and the number of the sets of right and left tilling claws (34, 35) attached to the flange 33 is also not limited to three as illustrated.

FIG. 32A is a side view of the cylindrical rotating bodies 10h coupled together, and FIG. 32B is a side view of a coupler 57. Note that the flange 33 provided on the exterior body 13 is not shown in FIGS. 32A and 32B.

The cylindrical rotating bodies 10h each have ends provided with end flanges 39, and the neighboring end flanges 39 are detachably fastened to each other by the coupler 57.

The coupler 57 is a ring-shaped member having a hinge 58 around which an upper piece 57a and a lower piece 57b can be opened and closed. The upper piece 57a and the lower piece 57b each have an inner periphery provided with a groove in which a pair of the end flanges 39, 39 is housed, and can be locked by a locking device, not shown, in a closed state.

The right and left tilling claws (34, 35) can be replaced for weeding work in fields. For the weeding work in a paddy field, a float may be coupled to the cylindrical rotating body 10h.

Furthermore, for example, as shown in FIG. 13A to 13C, props 24 and coupling bars 28a, 28b may be provided for the weeding work in the fields where cultivated plants such as seedlings and spikes are planted at regular intervals. In this case, setting heights of the coupling bars 28a, 28b higher than heights of the cultivated plants and making the cylindrical rotating bodies 10d having the blades 19 rotate and travel on paths among the cultivated plants allows the cylindrical rotating bodies 10d to remove weeds or the like grown among the cultivated plants. Thus, adjusting heights of the props 24 and setting the heights of the coupling bars 28a, 28b higher than the heights of the cultivated plants can prevent the coupling bars 28a, 28b from hitting the cultivated plants. In the example shown in FIG. 13B, the prop 24 extending in a height direction is a simple pole-shaped member, but a portion or whole of the prop 24 may be constituted by a cylindrical rotating body 10 or an extendable cylindrical body 90.

FIG. 13D illustrates the variation where the coupling member 28a has an extendable cylindrical body mechanism a that allows for automatically adjusting a distance between the wheels 30, 30 in a width direction. In the variation of FIG. 13D, an extendable mechanism 90b provided to the prop 24 can automatically extend and contract. Thus, extension and contraction of the extendable cylindrical body 90b allows for adjusting the height of the prop depending on ground irregularities. Herein, the extendable cylindrical bodies 90a, 90b each are configured similarly to the extendable cylindrical body shown in FIG. 27. Additionally, the coupling member 28b perpendicular to the cylindrical rotating body 10d may have an extendable mechanism (for example, the extendable cylindrical body 90 shown in FIG. 27) that extracts and contracts in a horizontal direction so that a control unit (not shown) can automatically adjust a distance between the wheels 30, 30 in a front-back direction (an advancing-retreating direction).

Furthermore, as shown in FIG. 14A, there can also be provided a mowing apparatus (agricultural vehicle) 40 having cylindrical rotating bodies 10d and 10e that fit ridges 45. In other words, the mowing apparatus 40 may include the cylindrical rotating bodies 10d that mow in ditches among the ridges 45 and the cylindrical rotating bodies 10e that mow on slopes of the ridges 45 or form the ridges. The cylindrical rotating bodies 10d each include the exterior body 13 provided with the blades 19 for mowing and are disposed below bases 49a to 49c. The bases 49a to 49c are coupled to props 42a to 42c, respectively. The bases 49a to 49c may have rotary boards (turntables) to be rotatable with respect to the props 42a to 42c. Such a configuration allows for traveling not only in a longitudinal direction but also in an oblique direction and a lateral direction.

The cylindrical rotating body 10e that comes in contact with the slope of the ridge 45 includes blades 19 similar to those of the cylindrical rotating body 10d and makes an angle that can be varied by a coupling member 27 with coupling bars 44a to 44c. For example, the cylindrical rotating body 10e located at a left side of a mowing mechanism 41c in FIGS. 14A to 14C is lifted by the coupling member 27 to avoid contact with a top of the ridge 45. The coupling member 27 is a ball joint, for example, and an actuator (not shown) such as a motor can vary an angle between the two connected cylindrical rotating bodies 10e based on control from a control unit (not shown) of the mowing apparatus 40 or outside. Since the position of the cylindrical rotating body 10e with respect to the ridge 45 can thus be varied, when crops are planted on the top of the ridge 45, for example, it is possible to perform weeding work with avoiding the crops.

Note that, when forming the ridge 45 on a slope of the ridge 45, the cylindrical rotating body 10e may have no blade 19. In the example shown in FIGS. 14A to 14C, the cylindrical rotating bodies 10e are disposed on both slopes of the ridge 45 to face them. However, the present invention is not limited to this configuration, and the cylindrical rotating body 10e may be disposed on only one slope of the ridge 45 to face it. FIGS. 14A to 14C illustrates a configuration where the three mowing mechanisms 41a to 41c are coupled together, but the number of the coupled mowing mechanisms is not limited to three as illustrated and may be two, four, or more. As shown in FIG. 13C, the mowing mechanisms 41 may be arranged in a matrix (n-by-m array).

The coupling bars 44a to 44c included in the mowing mechanisms 41a to 41c can go up and down along the props 42a to 42c to lift and lower the cylindrical rotating bodies 10e and to vary the angles thereof with respect to the ridges 45 in response to a button operation by an operator or under automated control. This configuration allows for avoiding crops even when the crops are planted on the ridges 45. An object detection sensor such as a photoelectric sensor may be attached to the mowing mechanisms 41a to 41c, the props 42a to 42c, or the like so that the cylindrical rotating bodies 10e are automatically lifted and lowered and the angles with respect to the ridges 45 are automatically varied. The cylindrical rotating bodies 10e may be coupled to both ends of the cylindrical rotating body 10d.

As shown in FIG. 14B, the coupling bar 44d may have extendable mechanisms (for example, the extendable cylindrical bodies 90 shown in FIG. 27) that extract and contract in a horizontal direction so that distances between the cylindrical rotating bodies 10d, 10d, 10d can be adjusted. The above-described object detection sensor may detect positions of the ridges 45 so that the control unit (not shown) can automatically adjust distances between the mowing mechanisms 41a to 41c.

FIG. 14C is a front view of a mowing mechanism 41' according to a variation. In the mowing mechanism 41' according to the variation, cylindrical rotating bodies 10d, 10d are coupled serially to each other by a flexible coupling member 2 to be in contact with the ground. The cylindrical rotating bodies 10d, 10d are pressed against the ground, and deformation of the coupling member 2 depending on ground irregularities enhances ground-holding ability. Furthermore, a base 49 is coupled to coupling members 27, 27 via extendable cylindrical bodies 90, 90 provided at both sides of the base 49. The extendable cylindrical bodies 90, 90 are extendable and contractable under control from a control unit of the mowing apparatus 40 (not shown) or outside, which allows for adjusting an angle between the cylindrical rotating bodies 10d, 10d. The mowing mechanism 41' according to the variation is suitable for a case where the recessed area between the ridges 45 has an almost triangular cross section, and extension and contraction of the extendable cylindrical bodies 90, 90 can always realize high ground-holding ability even when the recessed area varies in depth.

As described above, in the eighth embodiment, the cylindrical rotating bodies 10d have the blades 19, so that the rotating body aggregate can be used to constitute the agricultural equipment (agricultural vehicle).

Ninth Embodiment

Next, a rotating body aggregate 1g according to a ninth embodiment will be described. Herein, FIG. 15 is a diagram showing an example of an agricultural vehicle (agricultural equipment) 5 as a working apparatus including the rotating body aggregate 1g according to the ninth embodiment. The agricultural vehicle (agricultural equipment) 5 according to the ninth embodiment has three kinds of cylindrical rotating bodies 10d, 10g1, 10g2 that are coupled together via long coupling members 25a, 25b in a longitudinal direction and in a width direction of the rotating bodies. The cylindrical rotating bodies 10*d*, 10*g*1, 10*g*2 are coupled together, respectively, by three coupling members 2*a* to 2*c* that are flexible and deform depending on ground irregularities. The long coupling members 25*a*, 25*b* each have a side surface provided with two wheels 30 that allow for autonomous traveling with power supplied from a power source installed on a main body, not shown. The cylindrical coupling members 2*a* to 2*c* may have an extendable mechanism (for example, the extendable cylindrical body 90 shown in FIG. 27) that extracts and contracts in a horizontal direction so that a control unit (not shown) can automatically adjust a distance between the wheels 30, 30.

As in the eighth embodiment, the cylindrical rotating body 10*d* has a surface provided with blades 19 and functions as a mowing mechanism 41. The cylindrical rotating body 10*g*1 has a switching valve (openable and closable charge port) through which seeds are put into the cylindrical rotating body 10*g*1, a storage chamber for storing the seeds, and an openable and closable discharge port for sowing the seeds in the storage chamber, and functions as a sowing mechanism 46. The cylindrical rotating body 10*g*2 has a switching valve through which water is put into the cylindrical rotating body 10*g*2 and apertures (discharge ports) for spraying the water, and functions as a watering mechanism 47. The watering mechanism 47 can perform watering while being supplied with water from outside through a hose or the like coupled thereto. The agricultural vehicle (agricultural equipment) 5 including the rotating body aggregate 1*g* can thus perform tilling, sowing, and watering simultaneously while moving.

FIG. 15 illustrates the agricultural vehicle (agricultural equipment) that performs tilling, sowing, and watering simultaneously, but the present invention is not limited to this configuration. The cylindrical rotating bodies can have respective different functions to constitute an agricultural vehicle (agricultural equipment) that performs different motions simultaneously. For example, the watering mechanism 47 may spray disinfectant, fertilizer, herbicide, pollen (for pollination work, etc.), or the like instead of water.

Tenth Embodiment

Next, a tenth embodiment will be described. Herein, FIG. 16A is a diagram showing an example of a working apparatus 3 including a cylindrical rotating body 10, FIG. 16B is a diagram showing an example of a working apparatus 3*a* including a rotating body aggregate 1*e*, and FIG. 16C is a diagram showing an example of a working apparatus 3*b* including a rotating body aggregate 1*f* having bending sections. As shown in FIGS. 16A to 16C, the working apparatuses 3, 3*a*, 3*b* according to the tenth embodiment are each constituted by a base section (lower part of a fingerstall) 31 and the cylindrical rotating body 10 or the rotating body aggregate 1. The base section 31 having a truncated-cone-shaped inner space (hole) into which a human finger can be fitted functions as a fingerstall that can be designed depending on a size of each finger. A tip of the working apparatus 3 has the cylindrical rotating body 10 or the rotating body aggregate 1. The working apparatus 3*b* has the bending sections each including a movable coupling member 27.

The working apparatus 3 can be supplied with power from a battery that may be included in the base section 31 or directly from a commercial power source or the like via a power cable.

For example, the working apparatuses 3, 3*a*, 3*b* can be used as follows. For example, attaching a cloth for wiping off dirt to an outer periphery of an exterior body 13 of the cylindrical rotating body 10 allows for usage as a hygiene implement for wiping a human body, especially, an inside of an oral cavity. Attaching a brush for removing dirt to the outer periphery of the exterior body 13 of the cylindrical rotating body 10 also allows for usage as a toothbrush. Especially, according to the working apparatus 3*b*, the rotating body aggregate if can be used for brushing an outside and inside of teeth T simultaneously (also gums at once). Attaching a drill bit to an end of the exterior body 13 of the cylindrical rotating body 10 also allows for usage as a drill. Furthermore, attaching a spoon to a tip of the working apparatus 3 also allows for assisting a person who requires care to eat. The working apparatus 3 may include a publicly known suction mechanism for sucking sputum from a throat to be able to easily suck sputum in the person who requires care. A surface of the exterior body 13 of the cylindrical rotating body 10 may be covered with an elastic body such as rubber for the working apparatus 3 to be used for applying medicine.

As described above, the working apparatuses 3, 3*a*, 3*b* according to the tenth embodiment have the tip to which the cylindrical rotating body 10 or the rotating body aggregate 1 is attached and thereby can be utilized in situations of hygiene maintenance or caring. Note that the above-described examples have shown an exemplary configuration as the fingerstall used with a fingertip fitted thereinto, but the configuration is not limited to the fingerstall. For example, the cylindrical rotating body 10 or the rotating body aggregate 1 may be attached to a tip of a finger of a glove via the base section 31.

Eleventh Embodiment

Next, a rotating body aggregate 1*h* according to an eleventh embodiment will be described. FIG. 17A is a view of a coupling member 50 that constitutes the rotating body aggregate 1*h* according to the eleventh embodiment, and FIG. 17B is a view of the rotating body aggregate 1*h* according to the eleventh embodiment. The rotating body aggregate 1*h* according to the eleventh embodiment is configured and operates similarly to the rotating body aggregate 1 according to the first embodiment except for including the coupling member 50.

As shown in FIG. 17A, the coupling member 50 is cubic and has a plurality of protruded coupling sections 50*a* and a plurality of recessed coupling sections 50*b*. In the configuration example shown in FIGS. 17A and 17B, three of six faces of the cube have the protruded coupling sections 50*a* and the remaining three faces have the recessed coupling sections 50*b*. However, the present invention is not limited to this configuration and the number of the protruded coupling sections 50*a* and the number of the recessed coupling sections 50*b* can be appropriately changed. The coupling member 50 of the present embodiment is illustrated as being cubical in shape, but is not limited to this configuration, and may be cuboid in shape. Furthermore, the shape is not limited to the hexahedron and may be a pentahedron, a tetrahedron, or a polyhedron having seven faces or more. Furthermore, the shape may be a sphere or the like.

FIG. 17B illustrates a configuration where cylindrical rotating bodies 10 are coupled to the coupling member 50 shown in FIG. 17A. Up to six cylindrical rotating bodies 10 can be coupled to the coupling member 50 shown in FIG. 17A. In FIG. 17B, the recessed coupling section 50*b* of the coupling member 50 is coupled to the cylindrical rotating body 10 via a coupling member 20 but may be directly coupled to the cylindrical rotating body 10. In the present embodiment, the protruded coupling sections 50*a* and the recessed coupling sections 50*b* are fixedly coupled to the cylindrical rotating bodies 10 but may each be like a ball joint to make an attachment angle of the cylindrical rotating body 10 variable.

The cylindrical rotating bodies 10 can thus be coupled together via the coupling member 50 to realize various shapes. For example, as shown in FIG. 18A, there can be provided a rotating body aggregate 1*i* in which the cylindrical rotating bodies 10 are two-dimensionally arrayed and a rotating body aggregate 1*j* in which the cylindrical rotating bodies 10 are three-dimensionally arrayed. The rotating body aggregate 1*j* has a lower surface having four wheels 30. These wheels 30 can be replaced with road rollers or caterpillars. The wheels 30 may be eliminated, and cylindrical rotating bodies 10 may be used as the wheels for traveling. As shown in FIG. 18B, when the cylindrical rotating bodies 10 are three-dimensionally arrayed, extension and contraction of the cylindrical rotating bodies 10 that are extendable in a height direction allows for adjusting a height of the rotating body aggregate 1*j*.

As shown in FIG. 18B, the rotating body aggregate 1*j* in which the cylindrical rotating bodies 10 are three-dimensionally coupled together can also be utilized as a pallet (a load rack on which a load is placed for physical distribution). Furthermore, disposing a basket (box) within a frame formed by the plurality of cylindrical rotating bodies 10 also allows for usage as an apparatus in which the cylindrical rotating bodies 10 at an uppermost part are rotated for automated harvest work. Although not shown, attaching the rotating body aggregate 1*i* to a lower surface of a typical pallet can yield a pallet capable of autonomously traveling. In this case, a plurality of the cylindrical rotating bodies 10 can be stored in the pallet during standing still and can be deployed from the pallet only during traveling. The pallets using the plurality of cylindrical rotating bodies 10 are preferably designed to be stacked on top of one another.

As shown in FIG. 18C, an automobile can also be mounted on the rotating body aggregate 1*j*. In a case where the automobile is to be mounted, the rotating body aggregate 1*j* may have an upper surface having a plate, or the cylindrical rotating bodies 10 may be arranged at such a narrow pitch that tires of the automobile can be set thereon. A battery of the automobile that is mounted can be used as a power source to drive the rotating body aggregate 1*j*. The rotating body aggregate 1*j* may be waterproof so that the automobile can be moved without being submerged on the occurrence of inundation above floor level due to a flood or the like.

In this way, using the coupling members 50 having a plurality of faces each provided with a coupling section allows a user to freely assemble the rotating body aggregates 1*h* to 1*j* according to the eleventh embodiment to form a working apparatus as shown in FIGS. 18A and 18B. It would be also possible to play with this working apparatus that is downsized as a toy car formed by assembling the rotating body aggregates 1*h* to 1*j* like blocks. Furthermore, the cylindrical rotating bodies 10 can be assembled like blocks to form a rotating body aggregate for a user's purpose. The coupling member 50 is only an example, and it is possible to utilize coupling members with any shape that allow for putting the cylindrical rotating bodies 10 together like blocks.

Twelfth Embodiment

Next, a working apparatus 60 including rotating body aggregates 1*k* according to a twelfth embodiment will be described. FIG. 19 is a diagram showing an example of the rotating body aggregate 1*k* according to the twelfth embodiment. The example shown in FIG. 19 illustrates the working apparatus 60 in which the rotating body aggregates 1*k* can be utilized as a pruning machine for symmetrically trimming a tree in a European-style garden or the like.

As shown in FIG. 19, in the working apparatus 60 according to the twelfth embodiment, a plurality of cylindrical rotating bodies 10 linearly coupled together has an upper part stabilized by an elongated member R such as a rope or a rail and a turntable (rotary board) 63 to constitute a triangular arch. A main body section 61 including a plurality of pulleys 62 is movable along the elongated member R. The main body section 61 and the rotating body aggregate 1*k* are coupled together via the turntable 63, a height adjustment unit 64, and an opening adjustment unit 65. The height adjustment unit 64 can adjust a winding amount of a wire to adjust a height of the opening adjustment unit 65. In the example shown in the figure, the height adjustment unit 64 is constituted by two winches, but the number of the winches may be one, three, or more. The height adjustment unit 64 may be constituted by a device other than the winch (for example, the extendable cylindrical body shown in FIG. 27). The opening adjustment unit 65 includes a driving unit allowing for adjusting an opening-closing angle between right and left sides of a pruning mechanism 66 made up of the two rotating body aggregates 1*k*. Each side of the pruning mechanism 66 is constituted by the rotating body aggregate 1*k*. The number of the cylindrical rotating bodies 10 constituting the rotating body aggregate 1*k* is not limited to four as illustrated and may be one or more. The rotating body aggregate 1*k* has a lower end coupled via a movable coupling member 27 to a caster base 67 having wheels 30 to be in contact with the ground. The wheel 30 may be an auxiliary wheel with no driving source coupled thereto, or may be a wheel capable of autonomously traveling with a driving source connected thereto. Turning the turntable 61 also allows for swinging the rotating body aggregates 1*k*. The caster base 67 of the working apparatus 60 according to the twelfth embodiment has an extendable mechanism 90 (for example, the same as the extendable cylindrical body 90 shown in FIG. 27) that extracts and contracts in a length direction, and a control unit (not shown) can automatically adjust a length of the extendable mechanism 90 depending on the opening degree of the opening adjustment unit 65.

Each of the cylindrical rotating bodies 10 constituting the rotating body aggregate 1*k* has an exterior body 13 to which blades 19 are attached. Swinging the rotating body aggregates 1*k* around a central line L such that the wheels 30 leave a circular track allows for removing extra branches of a tree surrounded by the rotating body aggregates 1*k* to trim the tree into a circular cone shape.

As described above, coupling the cylindrical rotating bodies 10 together such that the rotating body aggregates 1*k* according to the twelfth embodiment form a triangular arch can yield an apparatus for trimming a tree. In the example shown in FIG. 19, the rotating body aggregates 1*k* are formed into a triangular arch. However, the shape is not limited to this and may be, for example, a mountain-shaped arch, a U-shaped arch, a trapezoid, or a cuboid. In other words, the opening adjustment unit 65 may be longer, and a cylindrical rotating body or a rotating body aggregate to which blades 19 are attached may horizontally extend below the opening adjustment unit 65 to form a U-shaped pruning mechanism. The working apparatus including the U-shaped pruning mechanism allows for efficient pruning work on a hedge or a grapevine trellis of which cross-section is a cuboid.

Instead of the casters having the wheels 30 at the lower end, a turntable that turns the rotating body aggregates 1k may be included. Alternatively, the wheel 30 may be replaced with a cylindrical rotating body or a rotating body aggregate as a driving wheel.

FIG. 67A is a side view for explaining a first posture of a working apparatus 160 according to a variation of the twelfth embodiment, and FIG. 67B is a side view for explaining a second posture. Cylindrical rotating bodies 10 constituting a rotating body aggregate 1k of the working apparatus 160 are coupled together via movable coupling members 27. It is thus possible to couple the cylindrical rotating bodies 10 together at a variable angle via the coupling member 27. For example, the cylindrical rotating bodies 10 can be arranged in a zigzag pattern as shown in FIG. 67B.

In the working apparatus 160, main body sections 161a, 161b, pulleys 162a, 162b, height adjustment units 164a, 164b, and opening adjustment units 165a, 165b can be moved along rails for opening and closing 163a, 16b. For example, the main body sections 161a, 161b and the like can thus be moved in a separating direction from a closed position shown in FIG. 67A to an opened position shown in FIG. 67B.

Separating the main body sections 161a, 161b and the like and varying the angles between the cylindrical rotating bodies 10 allows the working apparatus 160 having such a configuration to trim a tree into various shapes. Note that the pulleys 162a, 162b may be replaced with cylindrical rotating bodies 10.

Thirteenth Embodiment

Next, carriages 80a and 80b each including a cylindrical rotating body 10 according to a thirteenth embodiment will be described.

FIG. 20A is a front view of the carriage 8a having a plurality of wheels 30 and a rack section 81 below which the cylindrical rotating body 10 is attached via extendable cylindrical bodies 90 and wheel fixtures 84. When the extendable cylindrical bodies 90 are extended, the wheels 30 and the cylindrical rotating body 10 are in contact with the ground. When the extendable cylindrical bodies 90 are contracted, only the wheels 30 are in contact with the ground. The carriage 8a may have a power source unit and may supply power to the cylindrical rotating body 10. In this case, the power source unit of the carriage 8a may include a battery that is rechargeable from a commercial power source, a solar panel, or the like, or is rechargeable via radio waves. FIG. 20A illustrates a case where one cylindrical rotating body 10 is included, but a plurality of cylindrical rotating bodies 10 may be attached. Attaching the cylindrical rotating body 10 below the carriage 8a in this manner allows for traveling assistance and overturning prevention for the carriage 8a. Additionally, providing protrusions at regular intervals on an exterior body 13 of the cylindrical rotating body 10 allows for further traveling assistance and overturning prevention for the carriage on dirt or the like with poor footing. Furthermore, attaching blades 19 (not shown) to the exterior body 13 of the cylindrical rotating body 10 also allows the carriage to weed while transporting a load. A leg section made up of the extendable cylindrical body 90 and the wheel fixture 84 is extendable and contractable so that a height of the cylindrical rotating body 10 is adjustable depending on a traveling environment of the carriage 8b.

The cylindrical rotating body 10 can also be utilized as a unit for putting a sheet made of a resin film (for example, a multi-seeder). For example, the cylindrical rotating body 10 can be used for automatically laying a weeding sheet, an agricultural sheet (a multi-sheet), or a sheet that covers a tennis court, a golf course, or the like.

FIG. 20B is a front view of the carriage 8b having extendable cylindrical bodies 90a coupled to wheel supporting poles 85, each coupling the wheel 30 to the rack section 80. In the carriage 8b, extension and contraction of the extendable cylindrical bodies 90a allows for freely varying a distance between the rack section 80 and the wheels 30 (a height of the carriage). Unlike the figure, a plurality of the extendable cylindrical bodies 90a may be coupled to the wheel supporting pole 85. In the configuration shown in FIG. 20B, as in the example shown in FIG. 20A, the cylindrical rotating body 10 is included below the rack section 80 of the carriage to assist traveling of the carriage 8b and prevent overturning thereof. A rotating body supporting pole 86 coupled to an extendable cylindrical body 90b is coupled via a coupling member 50 to the cylindrical rotating body 10 horizontally disposed below the carriage 8b. Thus, extension and contraction of the extendable cylindrical bodies 90b allows for varying a height position of the cylindrical rotating body 10 below the carriage 8b from the ground. Since the height position of the cylindrical rotating body 10 below the carriage 8b from the ground is variable, claws (the protrusions) or blades that may be attached to the cylindrical rotating body 10 below the carriage 8b can also be changed in length, size, and the like. Note that the claws or the blades attached to the cylindrical rotating body 10 below the carriage 8b may be replaced with a member such as a brush or a roller (for cleaning or painting). The wheels 30 may be replaced with road rollers or caterpillars.

As shown in FIG. 20C, a cylindrical rotating body 10 that drives the wheel 30 may be provided and coupled to the extendable cylindrical body 90a via a coupling member 59. A carriage 8c includes extendable cylindrical bodies 90c at both sides of the rack section 80 so that a distance in a width direction between the wheels 30 disposed opposite to each other is adjustable.

The carriage 8c can include two or more wheels 30. For example, as shown in FIG. 21, a three-wheel mechanism can be implemented where wheels 30a to 30c are disposed on shafts 29a to 29c extending radially from a coupling member 20. This configuration allows for taking a first position where the wheels 30a and 30b are in contact with the ground, a second position where the wheels 30c and 30a are in contact with the ground, and a third position where the wheels 30c and 30b are in contact with the ground, and thus also allows for climbing stairs. Disposing a basket between two three-wheel mechanisms disposed opposite to each other allows for usage as a cart. The wheels 30a to 30c preferably include in-wheel motors. The shafts 29a to 29c may have three cylindrical rotating bodies 10 individually instead of the wheels 30a to 30c. Such a configuration allows for usage for cleaning a stepped area, for example.

The shafts 29a to 29c may also have extendable mechanisms 90a to 90c (for example, the extendable cylindrical bodies 90 shown in FIG. 27). In this case, automated extension and contraction of the extendable mechanisms 90a to 90c allows for absorbing difference in level.

Fourteenth Embodiment

Next, a carrier apparatus 153 as a working apparatus including a cylindrical rotating body 10 according to a fourteenth embodiment will be described. FIG. 22A is a side view of the carrier apparatus 153 including the cylindrical rotating body 10 according to the fourteenth embodiment.

As shown in FIG. 22A, in the fourteenth embodiment, the cylindrical rotating body 10 has ends both to which pulleys 62a, 62b each having a groove corresponding to a diameter of a rope R are coupled. Two ropes R1, R2 are fitted into the grooves of the pulleys 62a, 62b so that the cylindrical rotating body 10 rotates and travels along the two ropes R1, R2. Attaching holding mechanisms to both the ends of the cylindrical rotating body 10 for holding the two ropes R1, R2 vertically or obliquely hanging also allows the cylindrical rotating body 10 to rotate and travel in a vertical or oblique direction. The present embodiment has disclosed the configuration where the one cylindrical rotating body 10 links the two ropes R1, R2 but, unlike this, as shown in FIG. 22B, a plurality of the cylindrical rotating bodies 10 coupled together via flexible coupling members 2 may link the two ropes R1, R2. The number of the cylindrical rotating bodies 10 coupled together via the flexible coupling members 2 is not limited to that as illustrated and may be two, four, or more. In the working apparatus 153 according to a variation shown in FIG. 22B, the flexible coupling member 2 deforms to absorb vibrations during traveling, which can enhance stability during traveling. Furthermore, the working apparatus 153 according to the variation shown in FIG. 22B includes extendable mechanisms 90a, 90b (for example, the extendable cylindrical bodies 90 shown in FIG. 27) between the cylindrical rotating body 10 and the pulleys 62a, 62b. Thus, even when a distance between the ropes R1, R2 varies, extension and contraction of the extendable mechanisms 90a, 90b can enhance the stability during traveling.

Fifteenth Embodiment

Next, a traveling apparatus 54 as a working apparatus including cylindrical rotating bodies 10 according to a fifteenth embodiment will be described. FIG. 23A is a plan view of the traveling apparatus 54 including the cylindrical rotating bodies 10 according to the fifteenth embodiment, and FIG. 23B is a plan view of a variation of the traveling apparatus in FIG. 23A.

As shown in FIG. 23A, the cylindrical rotating bodies 10 may be coupled to a main body section 55 like legs of a centipede to constitute the traveling apparatus 54. In this case, the main body section 55 may include a battery 16 and a control unit 17 to supply control signals and power to each of the cylindrical rotating bodies 10 via a movable coupling member 27. The main body section 55 has sites each coupled to the coupling member 27 so that the cylindrical rotating bodies 10 are attachable and detachable. Herein, as shown in FIG. 23B, a rotating body aggregate 1 made up of the cylindrical rotating bodies 10 connected serially with each other via the coupling member 27 may be coupled to the main body section 55 via the coupling member 27. The cylindrical rotating bodies 10 or the rotating body aggregates 1 may be attachable to and detachable from the main body section 55 without using the coupling members 27. The traveling apparatus 54 may be sized to be usable as a toy car.

Sixteenth Embodiment

As shown in FIG. 35, a working apparatus 203a according to a sixteenth embodiment includes a main body 204, a handle 205, cylindrical rotating bodies 210a to 210b, coupling members 220a to 220b, and tip members 221a to 221b.

The cylindrical rotating bodies 210a to 210b each have a surface on which many bristles 213 (not shown in FIG. 35) are planted, and rotation of the cylindrical rotating bodies 210a to 210b allows for brushing. The main body 204 coupling the coupling members 220a to 220b together is a pole-like member made of flexible material such as resin. The main body 204 may have a through-hole through which a suction tube or the like is inserted. This configuration allows for sucking saliva and sputum from a throat.

The main body 204 may be constituted by a cylindrical rotating body having a surface on which many bristles are planted. In this case, brushing is performed with a tooth T surrounded by the cylindrical rotating bodies 210a to 210b and the main body 204, and thus can be performed on an outside surface, an end surface, and an inside surface of the tooth T simultaneously.

The tip members 221a to 221b made of an elastic body such as rubber are attached to tips of the cylindrical rotating bodies 210a to 210b to prevent hurting gums during brushing. The cylindrical rotating bodies 210a to 210b or the tip members 221a to 221b may have ultrasonic transducers to be able to remove plaque with sonic vibrations.

Angles of the cylindrical rotating bodies 210a to 210b attached to the coupling members 220a to 220b with respect to the main body 204 (or the handle 205) are adjustable. This configuration allows for a bass method where tips of the bristles (brush) 213 are placed at a 45-degree angle toward a gumline and a scrub method where the tips of the bristles (brush) 213 are placed at a right angle to teeth.

A protection member 231 is coupled to the handle 205 via a connection member 230. The protection member 231 prevents the bristles (brush) 213 from touching an inside of a lip and hurting a skin and, for example, is made of flexible resin material. The protection member 231 may have a suction mechanism. This configuration allows for sucking saliva and sputum from a throat also through the protection member 231. The coupling member 220a has a protection member 232 similar to the protection member 231.

The working apparatus 203a can be supplied with power from a battery that may be included in the main body 204 or the handle 205, or directly from a commercial power source or the like via a power cable. In the configuration with the battery, it can be charged by a publicly known charging method (including a wireless charging method using radio waves). The handle 205 may be provided with a solar panel for power feeding. The handle 205 may be attachable to and detachable from the main body 204 so that the main body 204 can be replaced with an apparatus of a below-described embodiment. Alternatively, the handle 205 may have a function of the main body 204 which may be eliminated (one coupling member may be substituted for the coupling members 220a and 220b).

The cylindrical rotating bodies 210a to 210b can be configured similarly to the above-described cylindrical rotating body 10. Unlike this, as shown in FIG. 36, the cylindrical rotating body 210 may include a driving section 211 and a rotating section 212. The driving section 211 has a motor 240 therein that rotates a rotation shaft 241. The rotation shaft 241 sticks from a bearing 242 to outside and has an end coupled to a fixing member 251 included in the rotating section 212. The fixing member 251 is fixed to an exterior body 252, and rotation of the motor 240 causes rotation of the fixing member 251 together with the exterior body 252. The motor 240 may be a hollow motor. In this case, the rotating body 241 has a through-hole through which a suction tube, a fiber camera with a light, or the like can be inserted. The configuration where the suction tube is inserted through the through-hole allows for sucking saliva and sputum through suction ports that may be provided in the tip members 221a to 221b. The configuration where the fiber camera with a light is inserted through the through-hole also allows for capturing images in an oral cavity, and the captured images can be checked on a smartphone or the like.

As shown in FIG. 37, there may be provided a working apparatus 203b including cylindrical rotating bodies 210c to 210d sticking upward. The cylindrical rotating bodies 210a to 210b are movably attached to the coupling member 220a and the cylindrical rotating bodies 210c to 210d are movably attached to the coupling member 220b so that angles thereof with respect to the main body 204 (or the handle 205) are adjustable. The working apparatus 203b allows for brushing upper and lower teeth simultaneously. In the working apparatus 203b, the main body 204 can also be constituted by a cylindrical rotating body having a surface on which many bristles are planted. The working apparatus 203b also includes protection members 231 to 234 that are sticking upward and downward and are similar to the above-described protection member 231.

Furthermore, the coupling member 220a has a balloon 206 on a side opposite to the main body 204. The balloon 206 can be inflated and be deflated by supplying pressurized air and exhausting the air via the coupling member 220a. The balloon 206 may be an accordion balloon. The balloon 206 can assist with mouth opening-closing motions and can provide training of muscles that move a tongue and jaws. The balloon 206 is normally disposed above the tongue but is sometimes used under the tongue. The balloon 206 has a through-hole through which a tube member 207 is inserted. The tube member 207 may be a fiberscope that functions as a camera, a vacuum hose that functions as an extraoral suction unit, a needle nozzle for discharging water or applying medical agents, or a medical device of which tip can be remotely operated, such as a catheter, an endoscope, or a cotton swab for stimulating a pharynx. Herein, the balloon 206 may be replaced with an elastic member (a mouth opening mechanism made of rubber or the like) that has a thick disk shape or a substantial drop shape, is positioned at a throat side of the main body when installed, and is used for training of jaws, a tongue, and/or a throat. Additionally, the elastic member may have a through-hole for including the vacuum hose, the needle nozzle, the catheter, the endoscope, the cotton swab, or the fiber camera, which is inserted through the through-hole of the balloon.

Seventeenth Embodiment

A working apparatus 303a according to a seventeenth embodiment includes a main body 304, a handle 305, cylindrical rotating bodies 310a, 310b, an inside-movement mechanism 320, and an outside-movement mechanism 330. FIG. 38A is a side view of the working apparatus 303a, and FIG. 38B is a cross-sectional view taken along line AA of FIG. 38A.

The main body 304 is mouthguard-shaped in top view (see FIG. 38B), is constituted by an elastic resin member and a deformable metal wire frame, and can deform during use depending on a jaw size of an installation target. The cylindrical rotating bodies 310a, 310b are provided at a bottom surface side of the main body 304. The main body 304 has the inside-movement mechanism 320 and the outside-movement mechanism 330. The inside-movement mechanism 320 according to the present embodiment is configured as a rack-and-pinion mechanism in which a pinion section 322 having a pinion 322a can reciprocate along a rack 321 formed into a substantially C-shaped curve.

As shown in FIG. 39A, the cylindrical rotating body 310a is coupled to a lower side of the pinion section 322 of the inside-movement mechanism 320 and moves along the rack 321 together with the pinion section 322. As in the sixteenth embodiment, the cylindrical rotating body 310a includes a driving section 311 and a rotating section 312. The rotating section 312 has a surface on which many bristles (not shown) are planted, and rotation of the rotating section 312 allows for brushing.

The outside-movement mechanism 330 is configured as a rack-and-pinion mechanism in which a pinion section 332 having a pinion 332a can reciprocate along a rack 331 formed into a substantially C-shaped curve. The cylindrical rotating body 310b is coupled to a lower side of the pinion section 332 of the outside-movement mechanism 330 and moves along the rack 331 together with the pinion section 332. As in the cylindrical rotating body 310a, rotation of the rotating section 312 of the cylindrical rotating body 310b allows for brushing with the bristles on the surface.

The working apparatus 303a can be supplied with power from a battery that may be included in the handle 304 or directly from a commercial power source or the like via a power cable. The main body 304 may have an electronic thermometer, a storage unit, and a communication unit therein to be able to transmit stored intraoral temperature to an external computer.

Note that the inside-movement mechanism 320 and the outside-movement mechanism 330 are not limited to the rack-and-pinion mechanism in the illustration and may be configured as, for example, an electric slider with a ball screw mechanism.

The working apparatus 303a according to the seventeenth embodiment described above can automatically brush outside and inside surfaces of teeth from one side molar to the other side molar.

There may be provided a working apparatus 303b including cylindrical rotating bodies 310c to 310d sticking upward from the pinion sections 322, 332 (see FIG. 39B). That is, the cylindrical rotating body 310c may be provided opposite to the cylindrical rotating body 310a and the cylindrical rotating body 310b may be provided opposite to the cylindrical rotating body 310b. The working apparatus 303b can brush outside and inside surfaces of upper and lower teeth simultaneously. Note that the above-described balloon 206 and/or tube member 207 may be provided at a throat side (on an inside surface) of the main body 304.

Eighteenth Embodiment

A working apparatus 403 according to an eighteenth embodiment includes main bodies 404a, 404b, a handle 405, and cylindrical rotating bodies 410a to 410l. FIG. 40 is a bottom view of the working apparatus 403. As shown in FIG. 40, the main body 404 has a bottom surface on which the twelve cylindrical rotating bodies 410a to 410l are disposed substantially vertically upright. As in the sixteenth embodiment, the cylindrical rotating bodies 410a to 410v each include a driving section 411 and a rotating section 412 (not shown). The rotating section 412 has a surface on which many bristles are planted, and rotation of the rotating section 412 allows for brushing. The main body 404a is attached to the handle 405 such that a gap G is adjustable, and movement of the main body 404a allows for adjustment for fixing a size of the gap G.

The number of the cylindrical rotating bodies provided on the bottom surface of each of the main bodies 404a, 404b is not limited to that as illustrated and may be arbitrarily set to be more than one. Only some of the cylindrical rotating bodies 410, instead of all the cylindrical rotating bodies 410, may each have a driving section and the other cylindrical rotating bodies 410 may be rotated by driving force transferred through a gear or the like. The handle 405 may have a sonic vibration generator, and sonic vibrations may be able to be transferred to the teeth via the main bodies 404a, 404b and the cylindrical rotating bodies 410a to 410v. Herein, the sonic vibration generator includes, for example, a linear motor that vibrates 1200 to 40000 times per minute. The working apparatus 403 can be supplied with power from a battery that may be included in the handle 405 or directly from a commercial power source or the like via a power cable.

Nineteenth Embodiment

A working apparatus 603 according to a nineteenth embodiment includes main bodies 604a, 604b, a handle 605, and a grip section 606. FIG. 41 is a bottom view of the working apparatus 603. As shown in FIG. 41, the main body 604a has a side surface (inside surface) on which many bristles 607a are planted, the inside surface facing to the main body 604b, and the main body 604b has a side surface (outside surface) on which many bristles 607b are planted, the outside surface facing to the main body 604a. The grip section 606 has a vibrating unit 608 therein, and vibrating the main bodies 604a, 604b in a direction perpendicular to the handle 605 via the handle 605 allows for brushing. Vibrations from the vibrating unit 608 are efficiently transferred to ends of the main bodies 604a, 604b through a vibrating plate 609 embedded in the handle 605, a vibrating plate 610a embedded in the main body 604a, and a vibrating plate 610b embedded in the main body 604b. The vibrating plates 609, 610a, 610b can be made of a metal plate. The above-described balloon having a vibrating plate therein may be included.

Herein, the vibrating unit may be provided to the handle 605 instead of the grip section 606. The vibrating unit 608 may be constituted by, for example, a sonic vibration generator that vibrates 1200 to 40000 times per minute.

The main body 604a is attached to the handle 605 such that a gap G is adjustable, and movement of the main body 604a allows for adjustment for fixing a size of the gap G. The handle 605 may be detachably coupled to the grip section 606. This configuration makes it easy to insert the handle 605 through an insertion hole 507 of a working apparatus 503 according to a twenty-second embodiment to be used. The working apparatus 603 can be supplied with power from a battery that may be included in the grip section 606 or directly from a commercial power source or the like via a power cable.

A working apparatus 613 according to a variation of the nineteenth embodiment includes main bodies 614a, 614b, a handle 615, and a grip section 616. FIG. 42 is a bottom view of the working apparatus 613. As shown in FIG. 42, the main body 614a has a side surface (inside surface) in which cylindrical rotating bodies 617a to 617o are embedded, the inside surface facing to the main body 614b, and the main body 614b has a side surface (outside surface) in which cylindrical rotating bodies 619a to 619n are embedded, the outside surface facing to the main body 614a. The cylindrical rotating bodies 617a to 617o have ends on which bristles 618a to 617o are planted, and the cylindrical rotating bodies 619a to 619n have ends on which bristles 620a to 620n are planted. Rotation of the cylindrical rotating bodies 617a to 617o and the cylindrical rotating bodies 619a to 619n allows for brushing. The cylindrical rotating bodies 617a to 617o and the cylindrical rotating bodies 619a to 619n are configured similarly to the above-described cylindrical rotating body except for having a surface on which the bristles are planted at the end.

The working apparatus 613 may have a vibrating unit and vibrating plates similar to those in the nineteenth embodiment.

The main body 614a is attached to the handle 615 such that a gap between the main body 614a and the main body 614b is adjustable, and movement of the main body 614a allows for adjustment for fixing a size of the gap. The working apparatus 613 can be supplied with power from a battery that may be included in the grip section 616 or directly from a commercial power source or the like via a power cable.

Twentieth Embodiment

A working apparatus 633 according to a twentieth embodiment includes belt supporting members 631, 632, a main body 634, cylindrical rotating bodies 635a to 635f, 637a to 637e, belt members 636, 638, a handle 639, and a grip section 640. FIG. 43A is a bottom view of the working apparatus 633, and FIG. 43B is a side view as viewed from an outside surface side.

As shown in FIGS. 43A and 43B, the main body 634 has ends both at which cylindrical rotating bodies 635a, 635b, 637a, 637b are disposed. The cylindrical rotating bodies 635a to 635f are referred to as a first rotating body aggregate, and the cylindrical rotating bodies 637a to 637e are referred to as a second rotating body aggregate. The belt member 636 on which many bristles are planted is wound around the belt supporting member 631 and the first rotating body aggregate (the cylindrical rotating bodies 635a to 635f), and rotation of the first rotating body aggregate allows for brushing. Similarly, the belt member 638 on which many bristles are planted is wound around the belt supporting member 632 and the second rotating body aggregate (the cylindrical rotating bodies 637a to 637e), and rotation of the second rotating body aggregate allows for brushing. The main body 634 has protection members, not shown, at an outside surface side and an inside surface side to prevent the bristles from touching an inside of a lip and a tongue and hurting a skin. The protection member can be made of, for example, flexible resin material.

The working apparatus 613 can be supplied with power from a battery that may be included in the grip section 616 or directly from a commercial power source or the like via a power cable.

Twenty-First Embodiment

As shown in FIG. 44, a working apparatus 503 according to a twenty-first embodiment includes a base 504, a connector 505, a mask member 506, an insertion hole 507, end members 508a to 508j, cylindrical rotating bodies 510a to 510p, and coupling members 520a to 520i.

The cylindrical rotating bodies 510a to 510p each have a surface provided with many blades (not shown), and rotation of the cylindrical rotating bodies 510a to 510p allows for shaving. No shave is given in an area where the coupling members 520 are located, and thus the mask member 506 is moved to leave no unshaved area. The mask member 506 can be moved to a head to shave the head.

The cylindrical rotating bodies 510a to 510p or the coupling members 520a to 520i may have a sonic vibrator therein that generates sonic vibrations. A plurality of the cylindrical rotating bodies 510 coupled together has ends provided with the end members 508. The end members 508 are movably attached to the mask member 506, and movement of the end members 508 allows for reciprocating motions of the cylindrical rotating bodies 510 in a width direction of the mask member 506. Unlike the present embodiment, the end members 508 may be fixed to the mask member 506 to be unable to move. The mask member 506 is transparently shown in FIG. 44 but is opaque in reality.

The mask member 506 is detachably attached to the base 504 via the connector 505. The working apparatus 503 can be supplied with power from a battery that may be included in the base 504 or the mask member 506, or directly from a commercial power source or the like via a power cable. In any mode, the mask member 506 and the cylindrical rotating bodies 510a to 510p can be preferably detached from the base 504 during use. FIG. 45 is a diagram for explaining a usage state where the mask member 506 and the cylindrical rotating bodies 510a to 510p are detached from the base 504 and the handle 405 of the working apparatus 403 according to the eighteenth embodiment is inserted through the insertion hole 507 provided in the mask member 506. According to the usage mode of FIG. 45, it is possible to simultaneously shave a face and brush teeth, allowing for more efficient caring work in nursing homes and hospitals, for example.

Unlike the present embodiment, the cylindrical rotating bodies 510a to 510n may have a surface provided with a brush to constitute a working apparatus used for massage, removing makeup, applying medicine, or the like.

Twenty-Second Embodiment

FIG. 46A is a front view showing a first state of a working apparatus 533 according to a twenty-second embodiment, and FIG. 46B is a front view showing a second state. As shown in FIGS. 46A and 46B, the working apparatus 533 according to the twenty-second embodiment includes cylindrical rotating bodies 540a to 540c, coupling members 550a to 550d, ear hook members 580a, 580b, and extendable cylindrical bodies 590a, 590b.

The cylindrical rotating bodies 540a to 540c are configured similarly to the cylindrical rotating body 510 according to the twenty-first embodiment and have a surface provided with blades for shaving a face or the like.

The coupling members 550a to 550d are configured similarly to the coupling member 520 according to the twenty-first embodiment.

The extendable cylindrical body 590 is configured similarly to the above-described extendable cylindrical body 90 and has a cylindrical main body in which an extension-contraction control unit, an accumulator, and a hydraulic cylinder are arranged.

The ear hook members 580a, 580b are provided at upper ends of the extendable cylindrical bodies 590a, 590b. For example, the ear hook members 580a, 580b are annular and are made of an elastic body. The working apparatus 533 can be worn on a face by putting the ear hook members 580a, 580b on both ears. The ear hook members 580a, 580b may be combined with a neck-mountable U-shaped device to be fixed to a neck, instead of being put on the ears.

The working apparatus 533 has a control unit in the cylindrical rotating bodies 540 or the extendable cylindrical bodies 590 and can be operated by a wireless controller (not shown) from outside. The cylindrical rotating bodies 540a to 540c can be rotated by the wireless controller to travel across the face, which allows for automatically shaving the face or the like. In this case, the cylindrical rotating bodies 540a to 540c can be rotated with the extendable cylindrical bodies 590a, 590b being extended and contracted to leave no unshaved area where the coupling members 550a to 550d are located.

The working apparatus 533 can be supplied with power from a battery that may be included in the cylindrical rotating bodies 540 or the extendable cylindrical bodies 590, or directly from a commercial power source or the like via a power cable.

Unlike the present embodiment, the cylindrical rotating bodies 540a to 540c may have a surface provided with a brush, a powder puff, a cloth, a cotton, a paintbrush, or the like to constitute a working apparatus used for massage, removing makeup, applying medicine, or the like. Furthermore, the coupling members 550b and 550c may be linked by a linking section having a handle coupled thereto so that the cylindrical rotating bodies 540a to 540c can be vertically and laterally moved with the handle in hand. In the present embodiment, the cylindrical rotating bodies 540a to 540c coupled together constitute a single rotating body aggregate. However, the two rotating body aggregates may be arranged in parallel divergently from the ear hook members 580a, 580b. The cylindrical rotating bodies 540a to 540c may have a mechanism that emits mist or steam from surfaces thereof. Furthermore, the cylindrical rotating bodies 540a to 540c may have an ultrasonic vibration function, an air cleaning function, or an oxygen emitting function.

Twenty-Third Embodiment

As shown in FIG. 47A, a working apparatus 801 according to a twenty-third embodiment is a flying apparatus including a rack section 80, a controller 806, a power source section 807, cylindrical rotating bodies 810a to 810d, coupling members 820a to 820d, blade members 811a to 811b and 812a to 812b, and a coupling section frame 813.

As shown in FIG. 47B, a working apparatus 802 according to a variation of the twenty-third embodiment is a flying apparatus including the rack section 80, the controller 806, the power source section 807, cylindrical rotating bodies 810a to 810f, coupling members 820a to 820f, the blade members 811a to 811b and 812a to 812b, and the coupling section frame 813. The cylindrical rotating body 810 is configured similarly to the cylindrical rotating body 10 according to the first embodiment. The blade members 811a to 811b and 812a to 812b are provided on surfaces of the cylindrical rotating bodies 810a to 810b.

Rotation speeds and directions of the cylindrical rotating bodies 810 can be individually and separately controlled by the controller 806 provided to the rack section 80. The cylindrical rotating bodies 810 are coupled together via the movable coupling member 820 at which relative angle can be dynamically varied. For example, during ascension, a positional relationship of the cylindrical rotating bodies 810 is upright as shown in FIG. 47A. During advancement, some of the cylindrical rotating bodies 810 can be inclined with respect to the rack section 80 as shown in FIG. 47B.

The rack section 80 has the controller 806 and the power source section 807 therein. The controller 806 includes an acceleration sensor, a horizon sensor, a read only memory (ROM) that stores a program for controlling motions of the cylindrical rotating bodies 810, a central processing unit (CPU) that executes the program stored in this ROM, and a random-access memory (RAM) that functions as an accessible storage unit. The controller 806 has a GPS and a wireless communication unit, and can independently control the rotation speeds of the cylindrical rotating bodies 810 based on commands received via the wireless communication unit from outside to make the working apparatus 801 fly along a predetermined route.

The power source section 807 has a rechargeable secondary battery and supplies power for driving the cylindrical rotating bodies 810 and the like.

FIGS. 47A and 47B illustrate a configuration where the coupling section frame 813 passes through the rack section 80. However, the coupling section frame 813 may be coupled to an upper surface side or a lower surface side of the rack section 80.

In the working apparatus 801 according to the twenty-third embodiment, dynamically varying the relative angles of the cylindrical rotating bodies 810 at the coupling members 820 allows for maintaining the rack section 80 substantially horizontal during both ascension and advancement. That is, the controller 806 detects a posture of the working apparatus 801 with the horizon sensor and, when the posture changes, can also individually control the rotation speeds of the cylindrical rotating bodies 810 and the angles between the cylindrical rotating bodies 810 coupled together by the coupling members 820 to maintain the working apparatus 801 always horizontal. In a helicopter, a plane of rotation is required to be tilted during advancement. However, the working apparatus 801 advances always in a horizontal position, resulting in provision of a comfortable ride when a human appears. The rack section 80 is not limited to the illustrated shape, and can be modified in any way. For example, the rack section 80 may have an attachment to be attachable to a vehicle (an automobile, a truck, an agricultural vehicle, or the like), heavy machinery for construction, a working machine, a civil engineering machine, an agricultural machine (a chainsaw or the like), a construction machine, a container, a basket, an airplane, a ship, a humanoid robot, a working robot, or the like. The rack section 80 may have a side provided with a coupling mechanism so that the working apparatuses 801 can be coupled together. The rack section 80 may have a lower part provided with a wheel or a robot hand including a plurality of fingers constituted by serially connected cylindrical rotating bodies (for example, the robot hand of the sixth embodiment shown in FIGS. 10A to 10C).

Note that the working apparatus 801 may be downsized to be used as toy. In this case, the rack section 80 may have an attachment to be able to be combined with a toy such as a robot.

Twenty-Fourth Embodiment

As shown in FIGS. 48A to 51, a working apparatus 803 according to a twenty-fourth embodiment includes a main body 804, fixing members 805*a* to 805*d*, a controller 806, a power source section 807, cylindrical rotating bodies 810*a* to 810*h*, blade members 811*a* to 811*h* and 812*a* to 812*h*, coupling members 820*a* to 820*h*, and a detection mechanism 830. The working apparatus 803 is a flying apparatus that functions as both a drone and an autogiro.

The cylindrical rotating bodies 810*a* to 810*h* are configured similarly to the cylindrical rotating body 10 according to the first embodiment, and have surfaces provided with the blade members 811*a* to 811*h* and 812*a* to 812*h*. Rotation speeds and directions of the cylindrical rotating bodies 810 can be individually and separately controlled by the controller 806. It is also possible to operate only a specific one of the cylindrical rotating bodies 810*a* to 810*h*. The cylindrical rotating bodies 810*a* to 810*h* are coupled together via the movable coupling members 820*a* to 820*h* and can be fixed in a state where relative angles thereof at the coupling members 820*a* to 820*h* have been varied. For example, as shown in FIG. 48B, inclining the cylindrical rotating bodies 810*a*, 810*c*, 810*e*, 810*g* at 90 degrees at the coupling members 820*a*, 820*c*, 820*e*, 820*g* also allows the blade members 811*a*, 811*c*, 811*e*, 811*g* and 812*a*, 812*c*, 812*e*, 812*g* to generate horizontal thrust (horizontal movement mode). In this case, the cylindrical rotating body of which end is located at a traveling direction side rotates counter to the rotation direction of the cylindrical rotating body of which end is located at a side opposite to the traveling direction side. Note that, in the horizontal movement mode, the inclined angles of the cylindrical rotating bodies 810 at the coupling members 820 are not always required to be 90 degrees and, for example, can be adjusted within 60 to 120 degrees for moving obliquely upward or obliquely downward. In the example of FIG. 48A, the cylindrical rotating bodies 810*a* and 810*c* are inclined outward at the coupling members 820*a* and 820*c*, respectively, but may be inclined inward or may be vertically extended without being inclined. An arrangement where central lines of the vertically adjacent cylindrical rotating bodies 810*a* to 810*h* form a straight line is obviously possible.

FIG. 48C is a side view showing a loaded mode of the working apparatus 803. The four coupling members 820*b*, 820*d*, 820*f*, 820 provided near the main body 804 are also referred to as base section coupling members. Inclining the cylindrical rotating bodies 810*a* to 810*h* outward based on commands from the controller 806 can result in positioning the blade members 811*a* to 811*h* and 812*a* to 812*h* out of the way for loading onto an upper surface of the main body 804.

The coupling members 820*b*, 820*d*, 820*f*, and 820*h* are fixed to the main body 804 via the fixing members 805*a* to 805*d*. Herein, like a variation shown in FIG. 49, portions of the main body 804 to which the fixing members 805*a* to 805*d* are coupled may have laterally extendable mechanisms 841 (for example, the extendable cylindrical bodies shown in FIG. 27) that extract and contract in a horizontal direction so that distances between the fixing members 805*a* to 805*d* are mutually adjustable. Such a configuration allows for adjusting a space size of the upper surface of the main body 804 and allows for adjusting a center of gravity. In the variation shown in FIG. 49, there are provided vertically extendable mechanisms 842 (for example, the extendable cylindrical bodies shown in FIG. 27) that allow for adjusting distances between the main body 804 and the coupling members 820*a* to 820*h*. Such a configuration allows for positioning the blade members 811 and 812 to an upper level out of the way for loading onto the upper surface of the main body 804 and allows for adjusting the center of gravity.

The cylindrical rotating bodies 810*a* and 810*b* and the coupling members 820*a* and 820*b* constitute a first propeller 808*a*, the cylindrical rotating bodies 810*c* and 810*d* and the coupling members 820*c* and 820*d* constitute a second propeller 808*b*, the cylindrical rotating bodies 810*e* and 810*f* and the coupling members 820*e* and 820*f* constitute a second propeller 808*c*, and the cylindrical rotating bodies 810*g* and 810*j* and the coupling members 820*g* and 820*h* constitute a fourth propeller 808*d*. As shown in FIG. 51, the first propeller 808*a* and the fourth propeller 808*d* are point-symmetrically arranged, and the second propeller 808*b* and the third propeller 808*c* are point-symmetrically arranged.

From another point of view, the first propeller 808*a* and the second propeller 808*b* bear a line-symmetrical relationship to the third propeller 808*c* and the fourth propeller 808*d*.

The main body 804 has the controller 806 and the power source section 807 therein. The controller 806 includes an acceleration sensor (which may be included in the detection mechanism 830 described later), a read only memory (ROM) that stores a program for controlling motions of the cylindrical rotating bodies 810, a central processing unit (CPU) that executes the program stored in this ROM, and a random-access memory (RAM) that functions as an accessible storage unit. The controller 806 has a GPS (which may be included in the detection mechanism 830 described later) and a wireless communication unit, and can independently control rotation speeds of the cylindrical rotating bodies 810 based on commands received via the wireless communication unit from outside to make the working apparatus 803 fly along a predetermined route. Furthermore, the controller 806 detects a posture of the working apparatus 803 with the acceleration sensor and a gyroscope sensor and, when the posture of the working apparatus 803 changes due to wind or the like, can individually control the rotation speeds of the cylindrical rotating bodies 810 to stabilize the posture of the working apparatus 803. The working apparatus 803 may have a distance sensor, and the controller 806 may have a function of avoiding collisions based on detected values of the distance sensor.

The power source section 807 has a rechargeable secondary battery and supplies power for driving the cylindrical rotating bodies 810 and the like.

The detection mechanism 830 includes various sensors, a camera for capturing images around the flying body, and the like. The various sensors include, for example, sensors for detecting information regarding flight situations, such as the GPS, the acceleration sensor, a speed sensor, the gyroscope sensor, an altimeter, an air flow meter, and a radar for recognizing an obstacle and the like on a flight route.

The controller 806 can automatically control inclinations of the cylindrical rotating bodies 810 at the coupling members 820 depending on a change in acceleration or situations such as wind detected by the detection mechanism 830 to achieve the optimal thrust and the optimal center of gravity. Additionally, in the variation shown in FIG. 49, the controller 806 can automatically and separately control extension and contraction of the laterally extendable mechanisms 841 and the vertically extendable mechanisms 842 depending on the change in acceleration or situations such as wind detected by the detection mechanism 830 to achieve the optimal center of gravity.

The modes shown in FIGS. 48A to 48C and 49 are examples and can be modified in various ways. For example, the number of the cylindrical rotating bodies 810 is not limited to eight as illustrated, and one may be disposed at each of the four places, or three or more may be disposed at each of the four places. Furthermore, the number of the places at which the cylindrical rotating bodies 810 are disposed is not limited to four as illustrated and is only required to be three or more. For example, the cylindrical rotating bodies may be arranged point-symmetrically or line-symmetrically at five, six, or eight places. Furthermore, the one cylindrical rotating body 810 may have two or more sets of the blade members 811 and 812. The working apparatus 803 can also be modified to make an automobile or a ship fly, and the main body 804 may have a bottom side provided with an attachment that is attached to an automobile to be attachable to the automobile or the ship. Furthermore, the main body 804 may have the bottom side provided with an attachment for remodeling an existing airplane as being drone-like or for carrying the airplane. FIG. 50 is a side view of an example of an attachment 821 for the working apparatus 803 to be attached to a roof part of an automobile (the roof part of the automobile is required to be reinforced to be able to bear a weight of a body of the automobile). In this case, the main body 804 may have a power supply port for supplying power from a battery of the automobile or the ship to the working apparatus 803. The attachment 821 may be attachable to a vehicle such as a truck or an agricultural vehicle, heavy machinery for construction, a working machine, a civil engineering machine, an agricultural machine (a chainsaw or the like), a construction machine, a container, a basket, a ship, an airplane, a humanoid robot, a working robot, or the like.

Twenty-Fifth Embodiment

As shown in FIG. 52, a working apparatus 830 according to a twenty-fifth embodiment is a flying apparatus including a trunk section 831, main wings 832*a* to 832*b*, horizontal tails 833*a* to 833*b*, a vertical tail 834, cylindrical rotating bodies 835*a* to 835*p*, blade members 836*a* to 836*p* and 837*a* to 837*p*, coupling members 838*a* to 838*p*, supporting beams 839*a* to 839*d*, and wing coupling members 840*a* to 840*f*.

The cylindrical rotating bodies 835*a* to 835*p* are configured similarly to the cylindrical rotating body 10 according to the first embodiment and have surfaces provided with the blade members 836*a* to 836*p* and 837*a* to 837*p*. Rotation speeds and directions of the cylindrical rotating bodies 835 can be individually and separately controlled. The number of the cylindrical rotating bodies 835 is not limited to that as illustrated. For example, the main wings 832*a* to 832*b* each may have a set of the cylindrical rotating body 835, the blade members 836 and 837, and the coupling member 838 to be configured similarly to Osprey.

In the working apparatus 830 according to the twenty-fifth embodiment, the cylindrical rotating bodies 835*a* to 835*p* can be inclined at least forward or backward at 90 degrees or less (angles can be adjusted) at the coupling members 838*a* to 838*p* as in the working apparatus 803 according to the twenty-fourth embodiment. Thus, for example, many or all of the cylindrical rotating bodies 835*a* to 835*p* are extended vertically during ascension and are extended forward or backward at 90 degrees during flight, so that it is possible to switch between an ascension mode where the working apparatus 830 ascends even without a runway and a flight mode where it flies after ascending. Herein, in the flight mode, the cylindrical rotating body of which blade members are located at an advancing direction side rotates counter to the rotation direction of the cylindrical rotating body of which blade members are located at a side opposite to the advancing direction side. The working apparatus 830 can be operated as a manned vehicle by a human in a cockpit that may be provided in the trunk section 831 or can fly as an unmanned vehicle based on commands received from outside via a wireless communication unit.

FIG. 52 illustrates a configuration where the wing coupling members 840*a* to 840*d* cover the main wings 832*a* to 832*b* and the wing coupling members 840*e* to 840*f* cover the horizontal tails 833*a* to 833*b*, but the configuration of the wing coupling members 840 is not limited to the illustrated mode. For example, when the main wings and the horizontal tails have flaps, spoilers, elevators, and the like, in order not to interfere with them, the wing coupling members may be protruded from bottom surfaces of the main wings and/or the horizontal tails and have side surfaces provided with the coupling members 838. In this case, the coupling members may be provided via a supporting beam extending beyond a front end or a back end of the wing.

Note that the cylindrical rotating bodies 835, the blade members 836 and 837, and the coupling members 838 according to the present embodiment may be accessorily provided to an existing jet plane or propeller plane.

Twenty-Sixth Embodiment

FIG. 53 is a perspective view of a working apparatus 700 according to a twenty-sixth embodiment. The working apparatus 700 according to the twenty-sixth embodiment can move along an elongated member R such as a rope or a rail, and attaching a plastic sheet (not shown) as a cover member thereto yields an agricultural tunnel. The number of unit working apparatuses 703 constituting the working apparatus 700 is not limited to three as illustrated and may be arbitrarily set to be more than one.

The unit working apparatus 703 includes a main body 704, supporting members 705, a rotating member 706, a frame 707, and wheels 731, 732.

The main body 704 has a housing including a control unit, a power source, and a wireless communication unit therein and can communicate with an external computer such as a smartphone to control rotations of the wheels 731, 732. The main bodies 704a to 704c may be coupled together by a pole-like member to integrally move. The main body 704 may have a sensor such as an imaging sensor, a thermometer, a $CO_2$ sensor, a photometer, or a humidity sensor and may transmit measured values of the sensor to the external computer via the wireless communication unit. The rotating member 706 supported by a pair of the supporting members 705 is disposed above the main body 704. The rotating member 706 has a positional relationship where a bottom surface thereof is in contact with the elongated member R that bears a portion of a load of the unit working apparatus 703. The number of the elongated member R is not required to be one, and a plurality of the elongated members R may support a plurality of the rotating members 706 as a multi-system. The rotating member 706 of the present embodiment is a pulley but, unlike this, may be constituted by the above-described cylindrical rotating body. When the rotating member 706 is constituted by the above-described cylindrical rotating body 10, the wheels 731, 732 are not always required to be in contact with the ground, and the unit working apparatuses 703 can move even in a state of being hung by the elongated member R. The mode where the rotating member 706 is constituted by the cylindrical rotating body 10 is workable when the elongated member R is a rail or a rope having a certain width.

The main body 704 has a bottom surface to which an upper end of the arched frame 707 is detachably coupled. The frame 707 is covered with the plastic sheet (not shown) with the upper end of the frame 707 detached from the main body 704, and then the frame 707 covered with the plastic sheet is attached to the main body 704. A top of the plastic sheet can thus be fixed.

The frame 707 has lower ends coupled to wheel supporting sections 711, 712. The wheel supporting section 711 has a fastener 713 and the wheel 731, and the wheel supporting section 712 has a fastener 714 and the wheel 732. The fasteners 713, 714 are devices for fixing the plastic sheet and include, for example, a female thread screwed onto a male thread provided to the wheel supporting sections 712, 713. The wheel supporting sections 712, 713 include a wheel driving unit (not shown) for rotating the wheels 731, 732.

However, unlike this, the above-described cylindrical rotating body may constitute the wheel driving unit (not shown) or the wheel 731, 732. The wheel 731, 732 may be constituted by a single-axis or multi-axis driven caterpillar, a sand tire, a buggy tire, a space probe tire, or a tire having a metal peripheral surface.

The control unit included in the main body 704 controls rotations of the wheels 731, 732 so that the unit working apparatus 703 can autonomously travel. Autonomous traveling of the unit working apparatuses 703 allows for moving the agricultural tunnel without changing distances between the frames 707a to 707c and allows for adjusting a length of the tunnel by changing the distances between the frames 707a to 707c. The main body 704 may have the height adjustment unit 64 described in the twelfth embodiment so that distances between the elongated member R and the frames 707a to 707c are adjustable. The number of the elongated member R is not limited to one as illustrated and may be two or three or more, and wheels may be correspondingly added to enhance strength.

In the twenty-sixth embodiment, the exemplary agricultural tunnel has been described. However, the technical idea of the present embodiment is also applicable to a greenhouse, a building, a warehouse, and a pergola (shade), as well as a domed court for a ball game such as tennis, a disaster relief tent, and the like. The cover member can be replaced with a cloth or the like.

In a variation of the twenty-sixth embodiment, an extendable mechanism (for example, the extendable cylindrical body 90 shown in FIG. 27) may be provided to a portion where the lower end of the frame 707 and the wheel supporting section 711, 712 is coupled together. Adopting such a configuration allows for absorbing difference in ground level.

Twenty-Seventh Embodiment

FIG. 54A is a side view of a working apparatus 850 according to a twenty-seventh embodiment, FIG. 54B is a side view of a working apparatus 870, and FIG. 54C is a cross-sectional view taken along line AA of FIG. 54A. In FIGS. 54 A and 54B, cover members 857, 877 are transparently shown, and members at a back side of the cover member 857 are shown by dotted lines.

The working apparatus 850 according to the twenty-seventh embodiment includes a main body 851, cylindrical rotating bodies 852a, 852b each having a surface provided with a brush, wheels 853a to 853d, coupling members 854a to 854d, an intermediate member 855, side end members 856a, 856b, the cover member 857, and a suction port 858.

The cylindrical rotating bodies 852a, 852b disposed on a bottom surface of the main body 851 each include a motor mechanism similar to that in the first embodiment and an exterior body of which surface is provided with bristles (not shown) that function as a brush for cleaning. The number of the cylindrical rotating bodies 852a, 852b is not limited to two as illustrated and may be one or three or more. The main body 851 includes a control unit, a power source, and a wireless communication unit, not shown, and can separately control rotations of the cylindrical rotating bodies 852a, 852b. Rotation of the cylindrical rotating bodies 852a, 852b causes rotation of the wheels 853a to 853d in an interlocking or independent manner, resulting in traveling of the working apparatus 850. The wheels 853a to 853d may be omni-wheels. The main body 851 is bendable at the flexible intermediate member 855, so that the working apparatus 850 can travel with being deformed even when running into an obstacle. The main body 851 may have a gyroscope sensor to measure a rotation angular speed during traveling.

The cover member 857 transparently shown in FIG. 54A covers the cylindrical rotating bodies 852a, 852b, the wheels 853a to 853d, and the coupling members 854a to 854d and is U-shaped in side view as shown in FIG. 54C. The suction port 858 is disposed at a top of an inner peripheral space 857a of the cover member 857 along a width direction (lateral direction of FIG. 54A) and suctions debris scraped off by the cylindrical rotating bodies 852a, 852b. The suction port 858 may be disposed at not only the top but any place of the inner peripheral space 857a of the cover member 857. The main body 851 may be coupled to an external suction unit, and the suction port 858 may get suction power from the external suction unit. The working apparatus 850 can be supplied with power from a battery that may be included in the main body 851 or directly from a commercial power source or the like via a power cable.

The working apparatus 870 according to the twenty-seventh embodiment includes a main body 871, cylindrical rotating bodies 872a to 872c each having a surface provided with a brush, wheels 873a to 873f, driving sections 874a to 874d, intermediate members 875a, 875b, side end members 876a, 876b, a cover member 877, and movable sections 878a, 878b. The main body 871, the wheels 873a to 873f, and the cover member 877 are configured similarly to the corresponding elements of the working apparatus 850, and thus the description thereof is omitted. The intermediate members 875a, 875b are made of flexible material like the intermediate member 855 and thus deform depending on ground irregularities, so that the working apparatus 870 can travel with being deformed even when running into an obstacle.

The cylindrical rotating bodies 872a to 872c each include a motor mechanism similar to that in the first embodiment and an exterior body of which surface is provided with bristles (not shown) that function as a brush for cleaning. Unlike the working apparatus 850, the working apparatus 870 have driving sections 879a to 879f including motors that rotate the wheels 873a to 873f independently from the cylindrical rotating bodies 872a to 872c. The control unit (not shown) included in the main body 871 can separately control rotation speeds of the wheels 873a to 873f through the driving sections 879a to 879f so that the working apparatus 870 can travel in an arbitrary direction. The control unit may have a map creation function that uses artificial intelligence (AI) to learn a map of an area to be cleaned so that the working apparatus 870 can autonomously travel and perform cleaning in an unmanned manner. The control unit may have a GPS and a wireless communication unit so that the working apparatus 870 travels outdoors along a predetermined route in an unmanned manner based on commands received via the wireless communication unit from outside. Separately controlling rotation frequencies of the wheels 873a to 873f also allows for lateral veering, in addition to moving not only forward but also backward. Note that the wheels 873a to 873f may be eliminated, and the cylindrical rotating bodies 872a to 872c may be configured as driving wheels.

The brush for cleaning provided on the surface of the exterior body of each of the cylindrical rotating bodies 872a to 872c may be replaced with blades or claws for mowing, pruning, logging, tilling, or snow removal.

The number of the cylindrical rotating bodies 872a to 872 is not limited to three as illustrated and may be four or more. FIGS. 54A to 54C illustrate the configuration where the cylindrical rotating bodies 872a to 872c are arranged in a row but, for example, as shown in FIG. 15, the cylindrical rotating bodies 872a to 872c may be arranged in multiple rows.

Twenty-Eighth Embodiment

FIG. 55A is a side view of a washing section 901 of a working apparatus 900 according to a twenty-eighth embodiment, and FIG. 55B is a plan view of the working apparatus 900.

The working apparatus 900 according to the twenty-eighth embodiment includes the washing section 901 and a washing section supporting section 902, and is an apparatus for automatically cleaning a bathtub.

The washing section 910 includes a main body 911, cylindrical rotating bodies 910a, 910b, a base section coupling member 914, and a coupling member 920a. The cylindrical rotating bodies 910a, 910b each include a motor mechanism similar to that in the first embodiment and an exterior body of which surface is provided with bristles that function as a brush for cleaning.

The cylindrical rotating body 910a includes the motor mechanism similar to that in the first embodiment and the exterior body of which surface is provided with the bristles that function as a brush for cleaning. The cylindrical rotating body 910a sticks downward from the main body 911 via the base section coupling member 914 and can be fixed in a state where an angle at the coupling member 920a with respect to the main body 911 has been varied. This configuration allows for, even when an inside surface of the bathtub is inclined, varying the angle of the cylindrical rotating body 910a depending on the inclination.

The cylindrical rotating body 910b includes the motor mechanism similar to that in the first embodiment and the exterior body of which surface is provided with the bristles that function as a brush for cleaning. The cylindrical rotating body 910b is coupled to the cylindrical rotating body 910a via the coupling member 920a and sticks substantially horizontally. The cylindrical rotating body 910b can be fixed in a state where an angle at the coupling member 920a with respect to the cylindrical rotating body 910a has been varied. This configuration allows for, even when a bottom surface of the bathtub is inclined, varying the angle of the cylindrical rotating body 910b depending on the inclination.

The main body 911 includes a main body driving section 916 for moving on the washing section supporting section 902 as a frame body, a control unit (not shown), and a power source (not shown). The main body driving section 916 is constituted by a wheel and a motor for traveling on an upper surface of the washing section supporting section 902. The main body 911 has an engaging section 917 that engages for attachment with a groove (not shown) provided in a side surface of the washing section supporting section 902. The cylindrical rotating bodies 910a, 910b may be attachable in such a direction that they are located outside the bathtub so that an outside surface of the bathtub (a side for entering the bathtub) and a floor surface can be cleaned. Furthermore, the cylindrical rotating bodies 910a, 910b may have a hot-air blowing function for drying. The number of the cylindrical rotating bodies 910a, 910b and the number of the coupling members 920 each are not limited to two as illustrated and may be arbitrarily set. The main body 911 has an operation button, not shown, and operation of the operation button can cause the cylindrical rotating bodies 910a, 910b to rotate and the main body 911 to travel a predetermined distance along the washing section supporting section 902. The main body 911 may have a wireless communication unit to be able to be remotely operated from a smartphone or the like.

FIG. 55C is a side view of a washing section 903 of a working apparatus according to a variation of the twenty-eighth embodiment. The washing section 903 differs from the washing section 901 in including cylindrical rotating bodies 910c to 910d and coupling members 920b to 920c. The cylindrical rotating bodies 910c to 910d of the washing section 903 are similar to the cylindrical rotating bodies 910a to 910b. According to the washing section 903, the cylindrical rotating body 910c allows for simultaneously washing more than one side surface of the bathtub, and the cylindrical rotating body 910d allows for simultaneously washing the washing section supporting section 902. There may be provided an extendable mechanism (for example, the extendable cylindrical body 90 shown in FIG. 27) between the cylindrical rotating body 910b and the coupling member 920a and/or 920b so that the washing section 903 is available to a bathtub different in size.

The working apparatus 900 according to the twenty-eighth embodiment is used for cleaning a bathtub but can be modified for cleaning a toilet by changing a size of the washing section 910 and forming the washing section supporting section 902 into a valve-seat-like shape. In this case, the modified working apparatus may be able to clean a floor surface in a bathroom.

Twenty-Ninth Embodiment

FIG. 56A is a perspective view of a working apparatus 930 according to a twenty-ninth embodiment.

The working apparatus 930 according to the twenty-ninth embodiment is an apparatus for cleaning a toilet T and, as shown in FIGS. 56A and 56B, includes cylindrical rotating bodies 931 to 934, coupling members 941 to 944, a self-traveling section 950, and an extendable mechanism 951, 952.

The cylindrical rotating bodies 931 to 934 are configured similarly to the cylindrical rotating body 10 according to the first embodiment but are different in that the cylindrical rotating body 931 has an exterior body having a surface on which brush bristles are planted and the cylindrical rotating bodies 932 to 933 each have an exterior body around which a cleaning cloth is provided.

The cylindrical rotating body 931 has the brush bristles planted on the surface of the exterior body, and rotation of the exterior body allows for washing a bowl part T3 of the toilet. The cylindrical rotating bodies 932 to 934 each have the cleaning cloth provided to an outer periphery of the exterior body, and rotation of the exterior body allows for washing a valve seat, an outer peripheral surface of the toilet T (bowl part T3), and a floor surface. The cleaning cloth provided to the exterior body of each of the cylindrical rotating bodies 932 to 934 may be a disposable non-woven cloth or a washable reusable cloth. Instead of the cleaning cloth, brush bristles may be planted on the surface of the exterior body, or a sponge may be provided thereto. FIG. 56A illustrates a configuration where the four cylindrical rotating bodies are used. However, the number of the cylindrical rotating bodies is only required to be more than one and can be arbitrarily changed. Furthermore, the cylindrical rotating body 931 may be replaced with a robot hand including a plurality of fingers constituted by serially connected cylindrical rotating bodies (for example, the robot hand of the sixth embodiment shown in FIGS. 10A to 10C of which fingers or palm has a brush). Adopting the robot hand allows for cleaning even narrow grooves like a human hand.

The self-traveling section 950 has a controller therein that can individually and separately control rotation speeds and directions of the cylindrical rotating bodies 931 to 934 and can make only a specific one of them operate. The cylindrical rotating bodies 931 to 934 can be fixed in a state where relative angles thereof at the coupling members 941 to 944 have been varied.

The extendable mechanism 951, 952 is, for example, the extendable cylindrical body shown in FIG. 27 and can extend and contract for adjustment depending on difference in height of a valve seat placement surface T1 that is different from product to product. The cylindrical rotating body 932 or 933 may have a similar extendable mechanism.

The self-traveling section 950 includes the controller that controls driving of the cylindrical rotating bodies 931 to 934, the coupling members 941 to 944, and the extendable mechanism 951, 952, a power source, and wheels (not shown) for self-traveling on the floor surface in a bathroom. The controller may be equipped with artificial intelligence so that the self-traveling section 950 autonomously returns to a charging spot (not shown).

FIG. 56B is a perspective view of a working apparatus 960 according to a variation of the twenty-ninth embodiment. This working apparatus 960 is an apparatus for cleaning a urinal MT and, as shown in FIG. 56B, includes cylindrical rotating bodies 961 to 963, coupling members 971 to 973, a self-traveling section 980, and an extendable mechanism 963, 964. FIG. 56B shows a standby state during non-use where the working apparatus 960 stands ready in a self-supporting state. When the urinal MT is cleaned, a piston rod 964 is housed in a cylinder 963 so that a bottom of the urinal MT can be cleaned.

The cylindrical rotating body 961 has an exterior body having a surface on which brush bristles are planted like the cylindrical rotating body 931. The cylindrical rotating bodies 962, 963 each have an exterior body around which a cleaning cloth is provided like the cylindrical rotating bodies 932, 933. The extendable mechanism 964, 965 is similar to the extendable mechanism 951, 952. The self-traveling section 980 is similar to the self-traveling section 950. The working apparatus 960 can automatically clean the urinal MT.

FIG. 56B illustrates a configuration where the three cylindrical rotating bodies are used. However, the number of the cylindrical rotating bodies is only required to be more than one and can be arbitrarily changed. Furthermore, the cylindrical rotating body 961 may be replaced with a robot hand including a plurality of fingers constituted by serially connected cylindrical rotating bodies (for example, the robot hand of the sixth embodiment shown in FIGS. 10A to 10C of which fingers or palm has a brush). Adopting the robot hand allows for cleaning even narrow grooves like a human hand Thirtieth Embodiment FIG. 57A is a side view of a working apparatus 1000 according to a thirtieth embodiment, FIG. 57B is a side view showing a first posture of a working apparatus according to a variation of the working apparatus in FIG. 57A, 57C is a side view showing a second posture, and FIG. 57D is a side view showing a third posture.

As shown in FIG. 57A the working apparatus 1000 according to the thirtieth embodiment is a flying body including a boarding section 1001, a fixing section 1002, a movable section 1003, cylindrical rotating bodies 1010a to 1010b, blade members 1011a and 1012a, and a coupling member 1020a.

The boarding section 1001 is a space for a person to appear and permits one or more people to appear. The boarding section 1001 may be open like a balloon or may be closed to be able to provide protection against rain and wind. The working apparatus 1000 does not always require a person on board and can be utilized for carrying a load in an unmanned state.

The fixing section 1002 has a housing in which a controller constituted by a computer including an acceleration sensor and a GPS, a communication section, and a power source are stored, which allows for remotely controlling driving of the cylindrical rotating bodies 1010 and the coupling member 1020.

The cylindrical rotating bodies 1010a to 1010d are configured similarly to the cylindrical rotating body 10 according to the first embodiment. The cylindrical rotating body 1010a has a tip provided with the blade members 1011a and 1012a. The working apparatus 1000 illustrated in FIGS. 57A to 57D includes one propeller constituted by the blade members 1011a and 1012a but may include two propellers as illustrated in FIGS. 57B to 57D. Three, four, or more propellers would allow for more flexible motions such as throttle, pitch, roll, and rudder. The two propellers shown in FIGS. 57A to 57D are the same in size but may be different. For example, the blade members 1011a and 1012a may be larger than blade members 1011b and 1012b.

The controller can individually and separately control rotation speeds and directions of the cylindrical rotating bodies 1010 and can make only a specific one of them operate. Specifically, this configuration is effective when more than one propeller is included. For example, in the variation shown in FIGS. 57B to 57D, the cylindrical rotating bodies 1010a and 1010d can be fixed in a state where relative angles thereof at the coupling members 1020a and 1020b have been varied. For example, it is disclosed that, for ascension, control is performed such that the upper propeller (1011a, 1012a) and the lower propeller (1011b, 1012b) are arranged in line as shown in FIG. 57C and, for horizontal or oblique movement in the air, the control is performed such that the upper propeller (1011a, 1012a) and the lower propeller (1011b, 1012b) are arranged at a right angle to each other as shown in FIG. 57A. Herein, the angle at which the upper propeller (1011a, 1012a) and the lower propeller (1011b, 1012b) are arranged during horizontal movement in the air is not always required to be a right angle and, for example, can be adjusted within 60 to 120 degrees. The number of the cylindrical rotating bodies 1010 coupled together by the coupling members 1020 is not limited to that as illustrated, and an arbitrary number of the cylindrical rotating bodies 1010 can be coupled together by the coupling members 1020.

A position of the movable section 1003 with respect to the fixing section 1002 is movable. For example, when the working apparatus 1000 according to the variation lands on the ground G, the controller makes the movable section 1003 move to an uppermost position so that the lower propeller (1011b, 1012b) can move upward to a position not to be in contact with the ground G. Meanwhile, when the working apparatus 1000 is to move in a parallel or oblique direction in the air, the controller makes the movable section 1003 move downward by a predetermined distance from the uppermost position so that the working apparatus 1000 can move with a center of gravity being optimal for the parallel or oblique movement depending on a change in acceleration or situations such as wind. The movable section 1003 is detachable from and attachable to the fixing section 1002 and can be attached to the fixing section 1002 with a selected combination of different patterns of the cylindrical rotating bodies 1010 and the propeller (1011, 1012).

Thirty-First Embodiment

FIG. 58A is a side view showing a first posture of a working apparatus 1100 according to a thirty-first embodiment, and FIG. 58B is a side view showing a second posture.

As shown in FIGS. 58A to 58C, the working apparatus 1100 according to the thirty-first embodiment is a manned flying body including a boarding section (1101 to 1105), cylindrical rotating bodies 1110a to 1110h, blade members 1111a to 1111b and 1112a to 1112b, and coupling members 1120a to 1120f.

The boarding section is constituted by a cover 1101, a base 1102, a seat 1103, an operating section 1104, and a cockpit frame 1105. The cover 1101 has an opening-closing door, not shown, through which an operator can board inside the cover 1101. The 1101 has a watertight structure, and the working apparatus 1100 can be utilized as a submarine.

In the base 1102, a controller constituted by a computer including a GPS, and a power source are stored. The base 1102 can revolve 360 degrees with respect to the cylindrical rotating bodies 1110g and 1110h and, for example, can be positioned such that the cockpit frame 1105 is located at an upper side as shown in FIG. 58A or can be positioned such that the cockpit frame 1105 is located at a lower side as shown in FIG. 58B.

The seat 1103 and the operating section 1104 are disposed in the cockpit frame 1105. The seat 1103 and the operating section 1104 in the cockpit frame 1105 slide on a peripheral surface along with revolution of the base 1102 to keep a seating surface of the seat 1103 always level to the ground. Furthermore, the controller includes a communication unit (not shown) to receive signals of a flight program and the like from external equipment, which also allows for remotely controlling motions of the working apparatus 1000. The controller may be able to be remotely operated from a smartphone or the like.

The cylindrical rotating bodies 1110a to 1110h are configured similarly to the cylindrical rotating body 10 according to the first embodiment. The cylindrical rotating bodies 1110a and 1110d have tips provided with the blade members 1111a to 1111b and 1112a to 1112b. The working apparatus 1100 illustrated in FIGS. 58A to 58C includes two propellers constituted by the blade members 1111a to 1111b and 1112a to 1112b. However, the number of the propellers is only required to be more than one, and three, four, or more propellers would allow for more flexible motions such as throttle, pitch, roll, and rudder.

The controller can individually and separately control rotation speeds and directions of the cylindrical rotating bodies 1110 and can make only a specific one of them operate. The cylindrical rotating bodies 1110a to 1110f can be fixed in a state where relative angles thereof at the coupling members 1120a to 1120f have been varied. For example, it is disclosed that, for ascension, control is performed such that the cylindrical rotating bodies 1110a and 1110d are arranged along a vertical direction as shown in FIG. 58A and, for horizontal or oblique movement in the air, the control is performed such that the cylindrical rotating body 1110d is arranged at a right angle to the cylindrical rotating body 1110e as shown in FIG. 58B.

Note that the base 1102 may have a bottom surface provided with a wheel or a carriage. As shown in FIG. 58C, the base 1102 may have side surfaces provided with a pair of main wings 1106, 1106. In this case, the pair of main wings 1106, 1106 may be able to be stowed or be detached. The base 1102 may have the bottom surface provided with an attachment to be attachable to a vehicle (an automobile, a truck, an agricultural vehicle, or the like), heavy machinery for construction, a working machine, a civil engineering machine, an agricultural machine (a chainsaw or the like), a construction machine, a container, a basket, a ship, a humanoid robot, a working robot, or the like. The base 1102 may have a wheel or a robot hand including a plurality of fingers constituted by serially connected cylindrical rotating bodies (for example, the robot hand of the sixth embodiment shown in FIGS. 10A to 10C).

Thirty-Second Embodiment

FIG. 59 is a perspective view of a working apparatus 1200 according to a thirty-second embodiment.

As shown in FIG. 59, the working apparatus 1200 according to the thirty-second embodiment is a manned flying body including a boarding section (1201 to 1205), cylindrical rotating bodies 1210a to 1210g, blade members 1211a to 1211d and 1212a to 1212d, and coupling members 1220a to 1220d.

The boarding section is constituted by a cover 1201, a base 1202, a seat 1203, an operating section 1204, and a bottom 1205. The cover 1201 has an opening-closing door, not shown, through which an operator can board inside the cover 1201.

In the base 1202, a controller constituted by a computer including a GPS, and a power source are stored. The bottom 1202 has a bottom surface provided with four wheels 1206a to 1206d.

The cylindrical rotating bodies 1210a to 1210g are configured similarly to the cylindrical rotating body 10 according to the first embodiment. The cylindrical rotating bodies 1210a to 1210d have tips provided with the blade members 1211a to 1211d and 1212a to 1212d. The cylindrical rotating bodies 1210a to 1210c are arranged in the same straight line by the cylindrical rotating bodies 1210e and 1210f functioning as coupling pole members. The cylindrical rotating bodies 1210b and 1210d are arranged in the same straight line by the cylindrical rotating body 1210g functioning as a coupling pole member. The cylindrical rotating body 1210g is arranged perpendicular to the cylindrical rotating bodies 1210e and 1210f and is disposed on the boarding section (1201 to 1205) as a main body. The cylindrical rotating bodies 1210e to 1210f and 1210g are not always required to be constituted by the cylindrical rotating body and may be constituted by a pole member without driving force.

The controller can individually and separately control rotation speeds and directions of the cylindrical rotating bodies 1210 and can make only a specific one of them operate for motions such as pitch and roll. The cylindrical rotating bodies 1210a to 1210d can be fixed in a state where relative angles thereof at the coupling members 1220a to 1220d have been varied.

Thirty-Third Embodiment

FIG. 60 is a perspective view of a working apparatus 1300 according to a thirty-third embodiment.

The working apparatus 1300 according to the thirty-third embodiment is a manned flying body that differs from the working apparatus 1200 according to the thirty-second embodiment in including three rear propellers (1311d to 1311f and 1312d to 1312f) but is configured similarly in other respects.

Cylindrical rotating bodies 1310a to 1310j are configured similarly to the cylindrical rotating body 10 according to the first embodiment. The cylindrical rotating bodies 1310a to 1310f have surfaces provided with blade members 1311a to 1311f and 1312a to 1312f. The cylindrical rotating bodies 1310a to 1310c are arranged in the same straight line by the cylindrical rotating bodies 1310g and 1310h functioning as coupling pole members. The cylindrical rotating bodies 1310d to 1310f are arranged in the same straight line by the cylindrical rotating bodies 1310i and 1310j functioning as coupling pole members. The cylindrical rotating bodies 1310d to 1310f are arranged in the same straight line by the cylindrical rotating bodies 1310i and 1310j functioning as coupling pole members. The cylindrical rotating bodies 1310b and 1310e are arranged in the same straight line by the cylindrical rotating body 1310k functioning as a coupling pole member. The cylindrical rotating body 1310k is arranged perpendicular to the cylindrical rotating bodies 1310g and 1310h and is disposed on a boarding section 1301 as a main body. The cylindrical rotating bodies 1310g to 1310k are not always required to be constituted by the cylindrical rotating body and may be constituted by a pole member without driving force.

The controller can individually and separately control rotation speeds and directions of the cylindrical rotating bodies 1310 and can make only a specific one of them operate for motions such as pitch and roll. The cylindrical rotating bodies 1310a to 1210f can be fixed in a state where relative angles thereof at coupling members 1320a to 1320f have been varied. Since including the three rear propellers (1311d to 1311f and 1312d to 1312f), the working apparatus 1300 according to the thirty-third embodiment can perform motions such as throttle, pitch, roll, and rudder more flexibly than that in the thirty-third embodiment.

Thirty-Fourth Embodiment

FIG. 61A is a plan view of a working apparatus 1400 according to a thirty-fourth embodiment.

As shown in FIG. 61A, the working apparatus 1400 according to the thirty-fourth embodiment is a manned flying body including a boarding section (1401 to 1406), cylindrical rotating bodies 1410a to 1410d, and blade members 1411a to 1411d and 1412a to 1412d.

The boarding section is constituted by a cover 1401, a cockpit base 1402, a seat 1403, an operating section 1404, a floor section 1405, and an inner frame 1406. The cover 1401 has an opening-closing door, not shown, through which an operator can board inside the cover 1401.

In the cockpit base 1402, a controller constituted by a computer including a GPS, and a power source are stored.

The disk-shaped floor section 1405 has an underside in which a turning unit is incorporated and can be turned 360 degrees with respect to the inner frame 1406. The inner frame 1406 is disposed on outside frames 1407a, 1407b, a front frame 1408, and a rear frame 1409.

The controller can individually and separately control rotation speeds and directions of the cylindrical rotating bodies 1410 and can make only a specific one of them operate for motions such as pitch and roll.

The cylindrical rotating bodies 1410a to 1410g are configured similarly to the cylindrical rotating body 10 according to the first embodiment and have upper end portions provided with the blade members 1411a to 1411d and 1412a to 1412d. The cylindrical rotating bodies 1410a to 1410g are individually provided on both ends of the outside frames 1407a and 1407b and are arranged in a cuboid shape in top view.

FIG. 61B is a side view of a variation of the working apparatus 1400 including a pair of main wings 1430a, 1430b. The pair of main wings 1408a, 1408b may be provided with jet engines, and may be able to be stowed in the outside frames 1407a, 1407b or be detached. The outside frames 1407a, 1407b, the front frame 1408, and the rear frame 1409 may be constituted by the cylindrical rotating body 1410.

Thirty-Fifth Embodiment

FIG. 62A is a plan view of a working apparatus 1500 according to a thirty-fourth embodiment, and FIG. 62B is a side view.

As shown in FIGS. 62A and 62B, the working apparatus 1500 according to the thirty-fifth embodiment is a manned flying body including a boarding section (1501 to 1505), cylindrical rotating bodies 1510a to 1510i, blade members 1511a to 1511d and 1512a to 1512d, and coupling members 1520a to 1520f.

The boarding section is constituted by a cover 1501, a cockpit base 1502, a seat 1503, an operating section 1504, a floor section 1505, and an inner frame 1506. The cover 1501 has an opening-closing door, not shown, through which an operator can board inside the cover 1501. The 1501 has a watertight structure, and the working apparatus 1500 can be utilized as a submarine.

In the base 1502, a controller constituted by a computer including a GPS, and a power source are stored.

The disk-shaped floor section 1505 has an underside in which a turning unit is incorporated and can be turned 360 degrees with respect to the inner frame 1506. The inner frame 1506 is disposed on an outside frame 1507. The outside frame 1507 may have a lower part provided with a wheel or a working robot hand including a plurality of fingers constituted by serially connected cylindrical rotating bodies (for example, the robot hand of the sixth embodiment shown in FIGS. 10A to 10C). The outside frame 1507 may have the lower part provided with an attachment to be attachable to a vehicle (an automobile, a truck, an agricultural vehicle, or the like), heavy machinery for construction, a working machine, a civil engineering machine, an agricultural machine (a chainsaw or the like), a construction machine, a container, a basket, a ship, a humanoid robot, a working robot, or the like. The outside frame 1507 may have the lower part provided with a wheel or a robot hand including a plurality of fingers constituted by serially connected cylindrical rotating bodies (for example, the robot hand of the sixth embodiment shown in FIGS. 10A to 10C).

The cylindrical rotating bodies 1510a to 1510i are configured similarly to the cylindrical rotating body 10 according to the first embodiment. The cylindrical rotating bodies 1510a to 1510d have upper end portions provided with the blade members 1511a to 1511d and 1512a to 1512d. The cylindrical rotating bodies 1510a to 1510g are individually provided at ends of the cross-shaped outside frame 1507. The cylindrical rotating bodies 1510a to 1510f can be fixed in a state where relative angles thereof at the coupling members 1520a to 1520f have been varied. Thus, for example, during ascension, the cylindrical rotating bodies 1510a to 1510f can be positioned in a vertical direction as shown in FIG. 62B and, during horizontal or oblique movement, some of the cylindrical rotating bodies 1510 can be positioned in a parallel or oblique direction as shown in FIG. 62A.

Thirty-Sixth Embodiment

FIG. 63A is a side view of a working apparatus 1600 according to a thirty-sixth embodiment, and FIG. 63B is a side view of a variation of the working apparatus in FIG. 63A.

As shown in FIG. 63A, the working apparatus 1600 according to the thirty-sixth embodiment is an unmanned flying body including a housing section 1601, an opening-closing door 1602, wheels 1603a to 1603d, a frame 1604, cylindrical rotating bodies 1610a to 1610b, blade members 1611a to 1611b and 1612a to 1612b, and coupling members 1620a to 1620b.

The housing section 1601 is a space for housing a load to be carried. The opening-closing door 1602 can be opened and closed for the load to be put in the housing section 1601. The housing section 1601 has a bottom in which a controller constituted by a computer including a GPS, a communication section, and a power source are stored. A driving source (not shown) allows the wheels 1603a to 1603d to autonomously travel.

The cylindrical rotating bodies 1610a to 1610c are configured similarly to the cylindrical rotating body 10 according to the first embodiment. The cylindrical rotating bodies 1610a to 1610b have tips provided with the blade members 1611a to 1611b and 1612a to 1612b and bases to which the coupling members 1620a to 1620b are coupled. The cylindrical rotating bodies 1610a to 1610b can be fixed in a state where relative angles thereof at the coupling members 1620a to 1620b have been varied. For example, during ascension, the cylindrical rotating bodies 1610a to 1610b can be positioned in a vertical direction and, during horizontal or oblique movement, the cylindrical rotating body 1610b can be positioned in a parallel or oblique direction as shown in FIG. 63A.

The coupling members 1620a to 1620b are movably coupled to the frame 1604 provided at an upper end of the housing section 1601. The frame 1604 may be relatively movable with respect to the housing section 1601.

In the variation shown in FIG. 63B, the frame 1604 is provided at a side surface of the housing section 1601. In FIG. 63B, members denoted with the same numerals have the same configurations as those in FIG. 63A, and thus explanations thereof are omitted. Even in the variation shown in FIG. 63B, for example, during ascension, the cylindrical rotating bodies 1610a to 1610b can be positioned in the vertical direction and, during horizontal or oblique movement, the cylindrical rotating body 1610b can be positioned in the parallel or oblique direction as shown in FIG. 63B. Note that the housing section 1601 may be formed for a person to be on board to constitute an automobile capable of transforming into a manned flying body. The working apparatus 1600 can also be utilized as an agricultural working machine (agricultural vehicle), a construction working machine (construction working vehicle), and a transportation working machine (transportation working vehicle).

Thirty-Seventh Embodiment

FIG. 64A is a perspective view of a working apparatus 1700 according to a thirty-seventh embodiment.

As shown in FIG. 64A, the working apparatus 1700 according to the thirty-seventh embodiment is a flying body including a main body 1701, cylindrical rotating bodies 1710a to 1710o, blade members 1711a to 1711e and 1712a to 1712e, coupling members 1720a to 1720j, and base section coupling members 1730a to 1730e.

The main body 1701 includes a loading section 1702 on which a load is placed, a rail 1703 to which the base section coupling members 1730a to 1730e are attached, an annular groove section 1704 in which a moving unit (not shown) that moves the base section coupling members 1730a to 1730e along the rail 1703 is embedded, and a detection mechanism (not shown).

The main body 1701 has a housing in which a controller constituted by a computer including a GPS, a communication section, and a power source are stored, which allows for remotely controlling driving of the cylindrical rotating bodies 1710, the coupling members 1720, and the base section coupling members 1730. The detection mechanism (not shown) is similar to the detection mechanism 830 according to the twenty-fourth embodiment.

The cylindrical rotating bodies 1710a to 1710o are configured similarly to the cylindrical rotating body 10 according to the first embodiment. The cylindrical rotating bodies 1710a to 1710e have tips provided with the blade members 1711a to 1711e and 1712a to 1712e.

The controller can individually and separately control rotation speeds and directions of the cylindrical rotating bodies 1710 and can make only a specific one of them operate. The cylindrical rotating bodies 1710a to 1710o can be fixed in a state where relative angles thereof at the coupling members 1720a to 1720j and the base section coupling members 1730a to 1730e have been varied.

Like a variation shown in FIG. 64B, a pair of main wings 1741, 1742 may be included and, in this case, may be able to be stowed or be detached. Note that the main wings 1741, 1742 may be provided with jet engines or propellers.

In the working apparatus 1700 according to the thirty-seventh embodiment, the cylindrical rotating bodies 1710a, 1710f, and 1710k constitute a first finger, the cylindrical rotating bodies 1710b, 1710g, and 1710l constitute a second finger, the cylindrical rotating bodies 1710c, 1710h, and 1710m constitute a third finger, the cylindrical rotating bodies 1710d, 1710i, and 1710n constitute a fourth finger, and the cylindrical rotating bodies 1710e, 1710j, and 1710o constitute a fifth finger. That is, the working apparatus 1700 can be used just like a robot hand including five fingers. Inclining the cylindrical rotating bodies 1710f to 1710o at the coupling members 1720f to 1720j and/or the base section coupling members 1730a to 1730e allows for holding the load placed on the loading section 1702. Also in this case, adjusting angles of the cylindrical rotating bodies 1710a to 1710e having the blade members at the coupling members 1720a to 1720e allows the working apparatus 1700 to fly. FIGS. 64A and 64B illustrate the configuration including the five fingers. However, the number of the fingers is only required to be more than one and can be changed.

Furthermore, moving the base section coupling members 1730a to 1730e along the rail 1703 allows for adjusting positional relationships among the first to fifth fingers, so that the load can be appropriately fixed depending on a size and a shape of the load.

In the present embodiment, a configuration has been illustrated where the load is placed on the loading section 1702. However, the loading section 1702 may have a surface equipped with a solar panel. In this case, a loading space in which the load is placed is preferably provided below the main body 1701. A basket for carrying the load may be provided below the main body 1701. The main body 1701 may have a bottom surface provided with an attachment to be attachable to a vehicle (an automobile, a truck, an agricultural vehicle, or the like), heavy machinery for construction, a working machine, a civil engineering machine, an agricultural machine (a chainsaw or the like), a construction machine, a container, a basket, a ship, a humanoid robot, a working robot, or the like. The main body 1701 may have a lower part provided with a wheel or a robot hand including a plurality of fingers constituted by serially connected cylindrical rotating bodies (for example, the robot hand of the sixth embodiment shown in FIGS. 10A to 10C).

Thirty-Eighth Embodiment

FIG. 65 is a perspective view of a working apparatus 1800 according to a thirty-eighth embodiment.

As shown in FIG. 65 (A), the working apparatus 1800 according to the thirty-eighth embodiment is a flying body including a main body (1801, 1802), cylindrical rotating bodies 1810a to 1810o, blade members 1811a to 1811e and 1812a to 1812e, coupling members 1820a to 1820j, and base section coupling members 1830a to 1830e.

The main body is constituted by an upper main body 1801 and a lower main body 1802 and can be folded on a folding section 1803 to form a valley part. The upper main body 1801 has a side surface provided with a sliding mechanism (not shown) to which the base section coupling members 1830a to 1830d are slidably attached. The lower main body 1802 has a sliding mechanism 1804 to which the base section coupling member 1830e is slidably attached. Shaded portions in the upper main body 1801 and the lower main body 180 in the figure represent recessed areas.

The main body (1801, 1802) has a housing in which a controller constituted by a computer including a GPS, a communication section, and a power source are stored, which allows for remotely controlling driving of the cylindrical rotating bodies 1810, the coupling members 1820, and the base section coupling members 1830. Furthermore, the main body (1801, 1802) includes a detection mechanism (not shown) similar to the detection mechanism 830 according to the twenty-fourth embodiment.

The working apparatus 1800 according to the thirty-eighth embodiment can be utilized not only as a flying body but also as a robot hand. Herein, FIG. 65 illustrates a configuration including five fingers. However, the number of the fingers is only required to be more than one and can be changed. Note that a pair of main wings may be provided to the main body (1801, 1802) and, in this case, may be able to be stowed or be detached. A basket for carrying a load may be provided below the main body 1701. The main body 1801 may have a bottom surface provided with an attachment to be attachable to a vehicle (an automobile, a truck, an agricultural vehicle, or the like), heavy machinery for construction, a working machine, a civil engineering machine, an agricultural machine (a chainsaw or the like), a construction machine, a container, a basket, a ship, a humanoid robot, a working robot, or the like. The main body 1801 may have a wheel or a robot hand including a plurality of fingers constituted by serially connected cylindrical rotating bodies (for example, the robot hand of the sixth embodiment shown in FIGS. 10A to 10C).

Thirty-Ninth Embodiment

FIG. 66A is a side view for explaining a first posture of a working apparatus 1900 according to a thirty-ninth embodiment, and FIG. 66B is a side view for explaining a second posture.

As shown in FIG. 66A, the working apparatus 1900 according to the thirty-ninth embodiment is an automobile 1902 including a lift-generating mechanism to be able to fly. The lift-generating mechanism of the working apparatus 1900 includes a base 1901, cylindrical rotating bodies 1910*a* to 1910*d*, blade members 1911*a* to 1911*b* and 1912*a* to 1912*b*, and coupling members 1920*a* to 1920*d*.

The working apparatus 1900 includes a controller (not shown) that controls driving of the cylindrical rotating bodies 1910 and the coupling members 1920. The cylindrical rotating bodies 1910 can be inclined in any direction at the coupling members 1920 and can take one posture during traveling on the ground and another posture during flying in the air. For example, as shown in FIG. 66B, during traveling on the ground, the propellers (1911*a* to 1911*b*, 1912*a* to 1912*b*) can be inclined inward not to interfere with traveling.

FIG. 66C is a side view of a working apparatus 1900' according to a variation of the thirty-ninth embodiment. The working apparatus 1900' according to the variation differs from the working apparatus 1900 according to the thirty-ninth embodiment in including cylindrical rotating bodies 1910*e* to 1910*f* and coupling members 1920*e* to 1920*f*. The working apparatus 1900' according to the variation can also take one posture during traveling on the ground and another posture during flying in the air. As shown in FIG. 66C, during traveling on the ground, the propellers (1911*a* to 1911*b*, 1912*a* to 1912*b*) can be inclined to an automobile side not to interfere with traveling. A pair of main wings may be provided to side surfaces of the base 1901 and, in this case, may be able to be stowed or be detached.

Fortieth Embodiment

FIG. 68 is a side view of a working apparatus 890 according to a fortieth embodiment. The working apparatus 870 according to the fortieth embodiment is a variation of the working apparatus 870 shown in FIG. 54B and differs mainly in including extendable mechanisms 90*a* to 90*c*.

The vertically extendable mechanism 90*a* is a mechanism for adjusting a height in a vertical direction and is constituted by the hydraulic extendable cylindrical body 90 described in FIG. 27, a suspension, an air spring, an elastic body, an actuator, or a motor, for example. In FIG. 68, the four vertically extendable mechanisms 90*a* are included. However, the number of the vertically extendable mechanisms 90*a* is only required to be more than one and thus may be three or five.

The main body width direction extendable mechanism 90*b* is a mechanism for adjusting a width of the main body 871 and is constituted by the extendable cylindrical body 90 shown in FIG. 27, for example.

The wheel width direction extendable mechanism 90*c* is a mechanism for adjusting a distance between side end members 876, 876*b* in a width direction and is constituted by the extendable cylindrical body 90 shown in FIG. 27, for example.

Since the working apparatus 890 according to the fortieth embodiment includes the extendable mechanisms 90*b* to 90*c*, the cylindrical rotating bodies 872 different in length can be attached, and the number of the cylindrical rotating bodies 872 can be reduced or increased. Additionally, since the extendable mechanisms 90*a* are included, the cylindrical rotating bodies having exterior bodies different in shape can be attached.

The intermediate members 875*a*, 875*b* are made of flexible material like the intermediate member 855 and thus deform depending on ground irregularities, so that the working apparatus 890 can travel with being deformed even when running into an obstacle.

Forty-First Embodiment

FIG. 69 is a plan view of a working apparatus 2000 according to a forty-first embodiment. The working apparatus 2000 according to the forty-first embodiment is a mouthguard-shaped working apparatus including a main body 2001, an inside-washing rotation mechanism 2010 for brushing inside of teeth, and an outside-washing rotation mechanism 2020 for brushing outside of the teeth. A handle may be provided in a vicinity of a U-shaped bottom surface (a pressing member 2022*c*) of the main body 2001 for a third party to easily detach and attach the working apparatus 2000 from and to an assisted person.

The inside-washing rotation mechanism 2010 includes cylindrical rotating bodies 2011*a* to 2011*j*, pressing members 2012*a* to 2012*e*, coupling members 2013*a* to 2013*i*, and end coupling members 2014*a*, 2014*b*.

The cylindrical rotating bodies 2011*a* to 2011*j* each have a surface on which many bristles (not shown) are planted like the cylindrical rotating body 210 according to the sixteenth embodiment shown in FIG. 35, and rotation of the cylindrical rotating bodies 2011*a* to 2011*j* allows for brushing. The cylindrical rotating bodies 2011*a* to 2011*j* are coupled together by the flexible coupling members 2013*a* to 2013*i*. The coupling members 2013*b*, 2013*c*, 2013*e*, 2013*g*, 2013*h* are pressed by the pressing members 2012*a* to 2012*e*. The main body 2001 has a power button, not shown. Pushing this power button causes the pressing members 2012*a* to 2012*e* to protrude and press the cylindrical rotating bodies 2011*a* to 2011*j* against the inside of the teeth, and causes the cylindrical rotating bodies 2011*a* to 2011*j* to rotate. The pressing members 2012*a* to 2012*e* are protruded by a driving unit constituted by a ball screw and a motor, for example. The end coupling members 2014*a*, 2014*b* are flexible and supply the cylindrical rotating bodies 2011*a* to 2011*j* with power from a power source (not shown) included in the main body 2001.

The outside-washing rotation mechanism 2020 includes cylindrical rotating bodies 2021*a* to 2021*h*, pressing members 2022*a* to 2022*e*, coupling members 2023*a* to 2023*m*, and end coupling members 2024*a*, 2024*b*. The cylindrical rotating bodies 2021*a* to 2021*h* each have a surface on which many bristles (not shown) are planted like the cylindrical rotating body 2011, and rotation of the cylindrical rotating bodies 2021*a* to 2021*h* allows for brushing. The cylindrical rotating bodies 21*a* to 2021*h* are coupled together by the flexible coupling members 2023*a* to 2023*m*. The coupling members 2023*c*, 2023*e*, 2023*g*, 2023*i*, 2023*k* are pressed by the pressing members 2022*a* to 2022*e*. Pushing the power button (not shown) of the main body 2001 causes the pressing members 2022*a* to 2022*e* to protrude and press the cylindrical rotating bodies 2021*a* to 2021*h* against the outside of the teeth, and causes the cylindrical rotating bodies 2021*a* to 2021*h* to rotate.

The working apparatus 2000 is used with upper teeth or lower teeth put into a groove section 2030 like a mouthguard. The number of the cylindrical rotating bodies 2011, the number of the pressing members 2012, the number of the cylindrical rotating bodies 2021, and the number of the pressing members 2022 shown in FIG. 69 are examples and can be increased or reduced (in a minimum configuration, the inside-washing rotation mechanism 2010 and the outside-washing rotation mechanism 2020 can each be constituted by the three cylindrical rotating bodies 2011).

Forty-Second Embodiment

FIG. 70 is a side view of a working apparatus 2100 according to a forty-second embodiment. The working apparatus 2100 according to the forty-second embodiment is a manned flying body including a propeller mechanism in an octothorpe-shaped arrangement.

The cylindrical rotating bodies 2110a to 2110h are configured similarly to the cylindrical rotating body 10 according to the first embodiment. The cylindrical rotating bodies 2110a to 2110h have surfaces provided with blade members 2111a to 2111h and 2112a to 2112h. The cylindrical rotating bodies 2110a to 2210b are arranged in the same straight line by coupling pole members 2113a, 2215a, and 2115b, and the cylindrical rotating bodies 2110c to 2110d are arranged in the same straight line by coupling pole members 2113b, 2215c, and 2115b.

The cylindrical rotating bodies 2110e and 2210g are arranged in the same straight line by a coupling pole member 2114a, and the cylindrical rotating bodies 2110f and 2110h are arranged in the same straight line by a coupling pole member 2114b.

The coupling pole member 2114a has a main wing 2116a, and the coupling pole member 2114b has a main wing 2116b. A pair of the main wings 2116a, 2116b may be provided with jet engines, and may be able to be stowed in the coupling pole members 2114a, 2114b or be detached.

The coupling pole members 2113a, 2113b, 2114a, 2114b may have a rack section constituting a loading section or may have a boarding section for a person to be on board.

A controller (not shown) can individually and separately control rotation speeds and directions of the cylindrical rotating bodies 2110 and can make only a specific one of them operate for motions such as pitch and roll. The cylindrical rotating bodies 2110a to 2110h can be fixed in a state where relative angles thereof at coupling members 2120a to 2120h have been varied. For example, all the cylindrical rotating bodies 2110a to 2110h can be fixed such that the blade members 2111a to 2111h and 2112a to 2112h are turned to an upward direction or to a horizontal direction.

Forty-Third Embodiment

FIG. 71 is a perspective view of a working apparatus 2200 according to a forty-first embodiment. The working apparatus 2200 according to the forty-third embodiment is a variation of the working apparatus 703 according to the twenty-sixth embodiment shown in FIG. 53. The same components as those of the working apparatus 703 are denoted with the same reference signs and explanations thereof are omitted.

The working apparatus 2200 according to the forty-third embodiment can move along three elongated members R1 to R3, and attaching a plastic sheet (not shown) as a cover member thereto yields an agricultural tunnel. The number of the unit working apparatuses 703 coupled to the frames 707 is not limited to three as illustrated and may be arbitrarily set to be more than one. The main bodies 704a to 704c of the unit working apparatuses 703a to 703c may be coupled together by a pole-like member.

The unit working apparatuses 703a to 703c include the wheel supporting sections 711a to 711c provided with extendable mechanisms 2201a to 2201c and the wheel supporting sections 712a to 712c provided with extendable mechanisms 2202a to 2202c. Even when the ground is irregular, the extendable mechanisms 2201a to 2201c and 2202a to 2202c absorb the irregularities, which allows for stable travelling.

Forty-Fourth Embodiment

FIG. 72A is a side view of a working apparatus 2300 according to a forty-fourth embodiment, and FIG. 72B is a bottom view. The working apparatus 2300 according to the forty-fourth embodiment is a variation of the working apparatus 903 according to the twenty-eighth embodiment shown in FIGS. 55A to 55C. The same components as those of the working apparatus 903 are denoted with the same reference signs and explanations thereof are omitted.

Cylindrical rotating bodies 910a to 910f each include a motor mechanism similar to that of the cylindrical rotating body 10 and an exterior body of which surface is provided with bristles that function as a brush for cleaning. The coupling members 920a to 920d can each fix the cylindrical rotating bodies 910 coupled together at an angle that has been varied.

A main body 2301 includes a cylindrical rotating body 2303, wheels 2304a, 2304b, an extendable mechanism 2305, a handle 2306, a control unit (not shown), and a power source (not shown). The main body 2301 is coupled to an island section 2032 as a slave via the extendable mechanism 2305. The extendable mechanism 2305 is a mechanism for adjusting a distance between the main body 2301 and the island section 2032 and is constituted by the extendable cylindrical body shown in FIG. 27, for example. Since the extendable mechanism 2305 can adjust a distance between the base section coupling members 914a, 914b, the working apparatus 2300 can be attached to a bathtub of which sidewall is different in thickness. Another extendable mechanism similar to the extendable mechanism 2305 may be provided between the wheel 2304a and the base section coupling member 914a.

The wheels 2304a, 2304b are wheels for traveling on an upper surface of the sidewall of the bathtub and are driven by a motor, not shown. As in the cylindrical rotating body 910, the cylindrical rotating body 2303 includes a motor mechanism and an exterior body of which surface is provided with a brush for cleaning, and can clean the upper surface of the sidewall of the bathtub. The cylindrical rotating bodies 910a and 910c are used for cleaning an inside surface of the sidewall of the bathtub, the cylindrical rotating body 910d is used for cleaning the upper surface of the sidewall of the bathtub, the cylindrical rotating body 910e is used for cleaning an outside surface of the sidewall of the bathtub, and the cylindrical rotating body 910f is used for cleaning a floor surface of a washing space. The cylindrical rotating body 910f may have a tip to which a self-traveling cleaner can be joined. The base section coupling members 914a, 914b may have extendable mechanisms (for example, the extendable cylindrical bodies 90 shown in FIG. 27) for adjusting a height in a vertical direction.

The preferred embodiment examples of the present invention have been described above. However, the technical scope of the present invention is not limited to the description of the above-described embodiments. Various alterations and modifications can be applied to the above embodiment examples, and such altered or modified modes also fall within the technical scope of the present invention.

In any embodiment described above, a secondary battery can be used as the power source and, in this case, can be charged via radio waves by a publicly known method.

Alternatively, the secondary battery can be supplied with power from a photovoltaic generation apparatus or from a battery included in a machine such as the automobile coupled by the attachment. The secondary battery can be directly connected to a commercial power source or a power generator to be supplied with power. For example, the flying body in the embodiments can also fly with being charged via a power cable when utilized as a radio station in times of disaster.

A route generation function and a map update function using artificial intelligence are applicable to the controller in any embodiment described above. The route generation function causes a processing unit of the controller to generate a route for autonomous traveling utilizing an environment map stored in a storage of the controller without communicating with an external server. The map update function causes the processing unit of the controller to update a surrounding map around itself in real time while traveling, by getting positional and shape information on a surrounding object based on signals from a distance sensor (for example, an ultrasonic sensor). All the apparatuses without a wireless communication unit out of the apparatuses in the above-described embodiments can be modified to be able to be remotely operated by having the wireless communication unit. The controller in any embodiment described above may be able to be remotely operated from a smartphone or the like via wireless communication.

Furthermore, attaching an accessory (attachment) different from the coupling member 20 to the cylindrical rotating body 10 or the rotating body aggregate 1 allows the cylindrical rotating body 10 or the rotating body aggregate to be utilized for various purposes. For example, a rope that can be wound up by rotation of the cylindrical rotating body 10 can be attached to the cylindrical rotating body 10. This configuration allows the cylindrical rotating body 10 to be utilized as a winch. Attaching a suction port and a suction mechanism to the cylindrical rotating body 10 also allows the cylindrical rotating body 10 to be utilized as a vacuum cleaner that sucks debris and the like. Furthermore, attaching a brush to the exterior body 13 of the cylindrical rotating body 10 also allows the cylindrical rotating body 10 to be used as a cleaner that blows pressurized air to sweep debris and the like or sucks them. Examples of the apparatus utilizing the cylindrical rotating body 10 as such a cleaner include an apparatus for sweeping dust and the like on a surface of a solar panel in such a way that the cylindrical rotating body 10 to which the brush is attached shuttles on the surface of the solar panel, and an apparatus for removing snow from a roof. In this case, inputting a program that causes the cylindrical rotating body 10 to shuttle on the surface of the solar panel every fixed time allows for usage as a cleaning robot that shuttles on the surface of the solar panel every fixed time for cleaning. Forming the cylindrical rotating body 10 into a long thin shape also allows for effective usage for cleaning a gap of furniture and the like. Additionally, attaching a blade 19 to some of the cylindrical rotating bodies 10 allows for simultaneously removing lint and dust on a carpet or a suit. Additionally, a mechanism for air ejection or water ejection may be attached to the cylindrical rotating body 10. Furthermore, a water absorption (water discharge) mechanism or a snow removal mechanism can be attached to the cylindrical rotating body 10. Attaching a blade 19 to the exterior body 13 of the cylindrical rotating body 10 also allows for usage as an auger (snow shoveling mechanism) of a rotary snowplow.

Attaching an accessory for holding a rope or a rail to the cylindrical rotating body 10 to which the blade 19 is attached also allows for usage as an apparatus that shovels snow on a roof while moving along the rope or the rail. Furthermore, increasing a size and a weight of the cylindrical rotating body 10 also allows the cylindrical rotating body 10 to be utilized as a road roller. FIG. 33 is a bottom view showing a configuration example where the cylindrical rotating bodies 10 are utilized as a road roller 74. The road roller 74 in the illustration includes a first row made up of three cylindrical rotating bodies 10i, a second-row roller group made up of two cylindrical rotating bodies 10i, and roller coupling frames 75 that couple the first-row roller group to the second-row roller group. The cylindrical rotating bodies 10i are arranged in a zigzag pattern such that the cylindrical rotating bodies 10i of the second-row roller group are positioned to overlap with coupling members 20i of the first-row roller group. The number of the cylindrical rotating bodies 10i constituting the first-row roller group and the number of the cylindrical rotating bodies 10i constituting the second-row roller group are not limited to those as illustrated, and the number of the roller groups may be three or more.

Attaching a sponge to the exterior body 13 of the cylindrical rotating body 10 also allows the cylindrical rotating body 10 to be utilized as a painting apparatus. Attaching crushing protrusions to the exterior body 13 of the cylindrical rotating body 10 also allows the cylindrical rotating body 10 to be utilized as a roller of a grinding machine. Furthermore, attaching a useful tool for digging or agriculture to one end of the cylindrical rotating body 10 also allows the cylindrical rotating body 10 to be utilized as a digging machine, a cultivating machine, or agricultural equipment in which rotation of the cylindrical rotating body 10 results in digging, cultivation, weeding, or the like.

Depending on an accessory attached to a tip of the cylindrical rotating body 10, trimming on an animal, brushing, massage, skin care, scalp care, washing hair, or the like can also be performed. Additionally, attaching a tool to the cylindrical rotating body 10, such as a turnscrew, a driver, a ratchet, a wrench, a spanner, a trimmer, a chainsaw, a cutter, a drill, a power saw, a hooker for rebar, or a brush, also allows the cylindrical rotating body 10 to be utilized as a motorized tool. It is also possible to utilize the cylindrical rotating body 10 having the exterior body 13 to which a cooking device is attached. For example, attaching an agitating blade to the cylindrical rotating body 10 also allows for usage as an agitating machine, and attaching a blade to the exterior body 13 of the cylindrical rotating body 10 also allows for usage as a mixer. Note that these configurations can be implemented using publicly known technique (hereinafter the same). The above-described accessories each include a coupling section capable of being coupled to the second coupling section 15 of the cylindrical rotating body 10 as in the coupling member 20 (hereinafter the same).

Additionally, in the first embodiment described above, the configuration has been illustrated where the cylindrical rotating bodies 10 are utilized as the wheels of the carriage. However, the present invention is not limited to this configuration and, for example, the cylindrical rotating bodies 10 can also be utilized as wheels of a moving body that carries a person or a thing. For example, attaching the cylindrical rotating bodies 10 to a ground-contact portion of a litter or a stretcher can yield a mobile litter or stretcher. Attaching the cylindrical rotating bodies 10 to a ground-contact portion of a care bed can yield a mobile care bed. Furthermore, attaching the cylindrical rotating bodies 10 to an upper surface of a care bed can also yield a care bed having a function of massaging a patient who is unable to roll over. Attaching brushes to the cylindrical rotating bodies 10 and assembling them also allows for usage as a collapsible car-washing machine, a bathtub cleaner, and a toilet cleaner.

In the seventh embodiment described above, as shown in FIG. 11, the working apparatus 4 having a plurality of the cylindrical rotating bodies 10 coupled together by the long coupling members 25a, 25b in the width direction has been illustrated. In addition to this configuration, an endless track (or chain) may be attached to the rotating body aggregate 1c. The working apparatus 4 can thus rotate and travel comparatively easily even on an irregular road and can also be utilized as a robot for disaster, for example. In the fifth embodiment described above, the rotating body aggregate 1b in which the cylindrical rotating bodies 10 are coupled together in the length direction and can turn at the coupling members 22 has been illustrated. In addition to this configuration, the rotating body aggregate 1b can also be utilized as a snake-shaped robot for disaster. For example, in such a snake-shaped robot for disaster, controlling the coupling members 22 such that the whole body is wriggled and controlling rotation of the cylindrical rotating bodies 10 allows for free movement. Attaching a camera or a sensor to the cylindrical rotating body 10 also allows for usage for check in a pipe.

Additionally, in the eighth and ninth embodiments described above, the configuration has been illustrated where the cylindrical rotating body 10 or the rotating body aggregate 1 is utilized as agricultural equipment or a component thereof. For example, attaching a mechanism for spraying disinfectant or agrochemicals to the cylindrical rotating body 10 allows the cylindrical rotating body 10 or the rotating body aggregate 1 to be utilized for spraying disinfectant or agrochemicals. In this case, controlling a motion (timing of spraying the agrochemicals) of the cylindrical rotating body 10 such that the spraying is performed only in one direction can prevent from spraying the agrochemicals to an unexpected place. A mechanism for generating air may be attached to the cylindrical rotating body 10 to spray the agrochemicals in a specified direction. Furthermore, the cylindrical rotating bodies 10 or the rotating body aggregates 1 may be attached to finger parts of a glove wearable by a person. Thus, rotation of the cylindrical rotating bodies 10 with grass gripped by an operator allows for pulling out the grass from the ground, or rotation of the cylindrical rotating bodies 10 with a fruit or a vegetable gripped by the operator allows for plucking off the fruit or the vegetable. Furthermore, in the realm of forestry, attaching the looped rotating body aggregate 1 to a trunk of a tree and making the cylindrical rotating bodies 10 to which a blade 19 is attached rotate and travel (go up and down) along the tree allows for cutting off (pruning) branches from the tree or barking the tree to process the tree as wood material. Coupling the rotating body aggregates 1 including the cylindrical rotating bodies 10 to which the blade 19 is attached together in the length direction to form them into a snake shape and making the rotating body aggregates 1 operate to creep up a tree can also result in pruning. Additionally, attaching a camera and a speaker or a light source to the cylindrical rotating body 10 also allows for usage for a crime prevention device or a harmful animal repellent device. Note that a robot hand to which the above-described cylindrical rotating body 10 is attached can also perform wood-processing or pruning.

Furthermore, in addition to the above-described embodiments, the cylindrical rotating bodies 10 or the rotating body aggregates 1 may be attached to bottoms of shoes wearable by a person. This configuration enables the person to move without walking. When the rotating body aggregates 1 are attached to the bottoms of the shoes, the control unit preferably controls braking of each of the cylindrical rotating bodies 10 to prevent the person from falling.

In addition to the above-described embodiments, the cylindrical rotating body 10 or the rotating body aggregate 1 may be attached to a moving body such as Segway or a drone to constitute a working apparatus. For example, the cylindrical rotating bodies 10 or the rotating body aggregates 1 can also be utilized in place of wheels of Segway or in addition to a vehicle of Segway. When the cylindrical rotating body 10 is attached to a drone, adding a weeding function, a harvest function, a watering function, or the like to the cylindrical rotating body 10 allows for agricultural support from the air even in a poor footing environment. The cylindrical rotating body 10 or the rotating body aggregate 1 can also be utilized in place of a vehicle of a weeding machine, a farming machine, an agricultural machine, a cleaner, an industrial robot, or the like.

Furthermore, the cylindrical rotating body 10 or the rotating body aggregate 1 can also be utilized as a medical device. For example, attaching a blade of a medical knife (including an electric knife) to the cylindrical rotating body 10 that is downsized allows for usage as a medical knife. Enabling emission of a laser beam from a portion of the cylindrical rotating body 10 allows the cylindrical rotating body 10 to be utilized as a laser knife. In this case, rotation of the cylindrical rotating body 10 allows for 360° emission of a laser beam toward an arbitrary point. Rotation of the cylindrical rotating body 10 attached to a tip of a pole-shaped member also allows for usage for applying medicine to a back, for example. Additionally, the cylindrical rotating body 10 or the rotating body aggregate 1 can also be utilized as a beauty device. For example, attaching a blade 19 to the cylindrical rotating body 10 also allows for usage as a shaver. As shown in FIG. 11, attaching blades individually corresponding to a beard, a sideburn, and the like to a plurality of the cylindrical rotating bodies 10 also allows for simultaneously shaving the beard and the sideburns. Furthermore, a rotating body aggregate may be formed using a plurality of the cylindrical rotating bodies 10 to surround a whole face from a nose, to constitute a shaver capable of shaving the whole face at once. In this way, for example, a caregiver can easily shave a face of a person who requires care. The cylindrical rotating body 10 can be utilized not only for the shaver but also for cutting hair of a head and removing a hangnail. The cylindrical rotating body 10 without a blade can also be utilized for massaging a face and a body. Furthermore, the cylindrical rotating body 10 can also be utilized for makeup and skin care. When the cylindrical rotating body 10 is utilized for face massage, makeup, and skin care, forming a rotating body aggregate that surrounds a whole face allows for massaging the whole face at once, and providing a surface of the rotating body aggregate with a puff allows for removing and cleansing makeup. Furthermore, the cylindrical rotating body 10 embedded in a pillow can also be utilized as a massager for a head, a neck, shoulders, and a back, and may additionally have a vibrating function.

Additionally, in the third embodiment described above, the configuration has been illustrated where programming motions of the cylindrical rotating bodies 10 or the rotating body aggregates 1 results in utilizing the cylindrical rotating bodies 10 or the rotating body aggregates 1 as an intellectual toy. In addition to this configuration, putting a plate or a member equivalent thereto on one end of the rotating body aggregate 1 can also result in a toy for plate spinning. With this configuration, it is possible to compete on the number of the cylindrical rotating bodies 10 coupled together when the plate spinning is successful. The cylindrical rotating body 10 that discharges water can also be utilized as a device for a performance with water. Furthermore, the rotating body aggregates 1 may also constitute a snake-shaped robot that is programmable and can be assembled. The rotating body aggregate 1 can also be utilized as wheels of play equipment such as a roller coaster. Furthermore, the rotating body aggregate 1 can also be utilized for a chair-type or vehicle-type attraction apparatus that vibrates to a movie, to vibrate a spectator or a rider.

In addition to the embodiments described above, the smaller cylindrical rotating body 10 can be disposed in the larger cylindrical rotating body 10. The cylindrical rotating body 10 can also be utilized in water and in the air. For example, attaching a screw to the cylindrical rotating body 10 allows for usage as a motor for traveling in or on water, and attaching a plurality of blades to the cylindrical rotating body 10 allows for usage as a propeller (the cylindrical rotating body 10 can also constitute an underwater drone, and the propeller can be further utilized as a machine for gathering seaweed). Furthermore, the cylindrical rotating body 10 can be utilized as a motor for traveling in water horizontally or vertically according to an attachment direction thereof (including a horizontal direction and a vertical direction). The cylindrical rotating body 10 may also include a solar panel to be supplied with power by photovoltaic generation. The cylindrical rotating bodies 10 may be continuously arranged on a road or a load transportation path. Thus, rotation of the cylindrical rotating bodies 10 also allows for carrying a person, a vehicle, a load, etc. like a belt conveyer.

In addition to the embodiments described above, attaching a camera and a speaker to the cylindrical rotating body 10 or the rotating body aggregate 1 allows for usage as an apparatus for crime prevention. In this case, for example, making the rotating body aggregate 1 hold a vertically standing pole as in the fifth embodiment can yield a mobile camera and speaker for crime prevention. Attaching a heat generation mechanism also allows for usage as a self-traveling iron. Furthermore, the cylindrical rotating body 10 can also be utilized for an internal combustion engine, an engine (including a hybrid engine, a rocket engine, and a hydrogen engine), and a power generator.

Furthermore, it is also possible to utilize the cylindrical rotating body 10 or the rotating body aggregate 1 to which a fishing implement is attached. For example, the cylindrical rotating body 10 can be used as a roller of a winding machine that winds up a net. The cylindrical rotating body 10 can also constitute a reel to be attached to a fishing rod, a fishing implement, a winch for winding up a net, or the like.

The cylindrical rotating body 10 or the rotating body aggregate 1 may be utilized as a tire (wheel) of a vehicle, a caterpillar, or a wheel of a train (or a train-shaped moving body). Such a train-shaped moving body may transport a container and can also travel on a road. In the sixth embodiment described above, the configuration where the cylindrical rotating body 10 or the rotating body aggregate 1 is utilized for a robot hand has been illustrated. However, instead of or in addition to this configuration, the cylindrical rotating body 10 or the rotating body aggregate 1 can be utilized for a foot section of a robot. For example, attaching the cylindrical rotating bodies 10 or the rotating body aggregates 1 to bottoms of the feet of the robot allows the robot to move. In this case, the control unit can control braking of each of the cylindrical rotating bodies 10 to prevent the robot from falling. The number of feet included in the robot is not particularly limited. Furthermore, the cylindrical rotating body 10 may be used as an arm, a trunk section, or a leg section of the robot.

Additionally, the cylindrical rotating bodies 10 constituting the above-described rotating body aggregate 1 are not all required to rotate in the same direction and each can rotate in an independently controlled direction. Furthermore, each rotation speed and whether each of the cylindrical rotating bodies 10 rotates or not can be independently determined.

In the sixth embodiment described above, the rotating body aggregate 1b that holds the rope R to rotate and travel on the rope R has been illustrated. However, the present invention is not limited to this configuration and, for example, as shown in FIG. 34, a plurality of sets of robot hands 101 vertically or laterally facing to each other may be provided to a main body section 57 via couplers 43. The main body section 57 includes a control unit that controls driving of the robot hands 101, a power source, and a wireless communication unit. The main body section 57 may be an inspection unit or may be a carrying section having a carrying space.

Ropes R are arranged in parallel not vertically but laterally in some cases. The rope R may be a wire, an electric wire, a reinforcing bar, a rail, or a pole.

In the eighth embodiment described above, the configuration where the blades 19 are attached to the exterior bodies 13 of the cylindrical rotating bodies 10 has been illustrated. In addition to this configuration, the blades 19 may also be attached to a surface of the coupling member 20. In this way, equipping the coupling member 20 with a function similar to that of the cylindrical rotating bodies 10 allows for uniform mowing or the like even when the cylindrical rotating bodies 10 are coupled together by the coupling member 20.

As shown in FIG. 25A, the cylindrical rotating body 10 can be attached to a vertically standing pole via an attachment. As shown in FIG. 25B, the cylindrical rotating body 10 can also be attached to a pole P extending horizontally away from the ground via the attachment. The attachment 56 is not particularly limited and can be a publicly known attachment. Thus, using the attachment 56 allows the cylindrical rotating body 10 to be attached to any member. Herein, the motor of the cylindrical rotating body 10 may be constituted by a hydraulic motor, and a hydraulic pump, a hydraulic tank, or a fuel tank for an engine may be provided in a hollow space. There may be provided a hybrid driving source having both an engine and a motor. A spraying unit (spray) for spraying agrochemicals or the like may be attached to the cylindrical rotating body 10. FIGS. 25A and 25B illustrate a configuration including the one cylindrical rotating body 10, but more than one cylindrical rotating body 10 may be connected serially with each other.

In the above-described embodiment, the configuration where the blades 19 are attached to the cylindrical rotating bodies 10 has been illustrated, but the shape of the blades 19 is not particularly limited. For example, a reel-type structure including a plurality of blades like a razor is also possible. A rotary-type structure like a so-called "electric circular saw" is also possible where rotation of the cylindrical rotating body 10 having an end to which a disk with an outer edge as a blade is attached causes cutting. The cylindrical rotating body 10 having the end to which a grinder is attached may be rotated. A structure like a chain saw where the cylindrical rotating body 10 rotates only an edge as a blade is also possible. Furthermore, a structure is also possible where rotation of the cylindrical rotating body 10 having the exterior body 13 to which a comb having a plurality of comb-like protrusions is attached results in trimming on an animal, a human head, and the like. Attaching blades to the cylindrical rotating body 10 like an electric fan also allows the cylindrical rotating body 10 to be utilized as a dryer or a blower. When utilized as the dryer, the cylindrical rotating body 10 may also blow hot air. Furthermore, the cylindrical rotating body 10 may emit UV light to be able to be utilized as a hand dryer having a sterilization function. Attaching blades to the cylindrical rotating body 10 also allows for usage for wind power generation and hydraulic power generation. Furthermore, the cylindrical rotating body 10 may include blades and may blow hot air to be able to be utilized for a bio-toilet. Additionally, the cylindrical rotating body 10 may include blades to be able to be utilized as an agitating machine that agitates water to aerate it in a farm or the like, an agitating machine for agricultural fertilizer, a wind power generator, or a hydraulic power generator.

In the fifth embodiment described above (FIGS. 8 and 9), the configuration where the cylindrical rotating bodies 10 are coupled together by the coupling member 22 having the shaft 23 has been illustrated. In addition to this configuration, for example, as shown in FIG. 26A, a plurality of the cylindrical rotating bodies 10 can also be coupled by the coupling member 22. Herein, FIG. 26B illustrates a configuration where a rack section 81 is attached to a rotating body aggregate 1o shown in FIG. 26A via the cylindrical rotating bodies 10. As shown in FIG. 26B, coupling the cylindrical rotating bodies 10 together via the coupling members 22 allows for rotating and moving smoothly on the ground even when the ground is irregular. In this case, making respective rotation frequencies of the cylindrical rotating bodies 10 different from each other also allows for change in an advancing direction. The rotating body aggregate 1o can also move on stairs and the like. Especially, in the example shown in FIG. 26B, the cylindrical rotating bodies 10 are utilized as vertically extendable props and are controlled to be extended and contracted so that the rack section 81 can be kept substantially horizontal even when the ground is irregular. Thus, for example, the rotating body aggregate 1o can also move on an irregular road with a person, a load, and the like thereon. For example, the rotating body aggregate 1o can also move with a container or a vehicle (a vehicle to be carried) thereon. Furthermore, replacing wheels of a stroller, a suitcase, or a wheelchair with the rotating body aggregate 1o also allows the stroller, the suitcase, or the wheelchair to smoothly move. Additionally, the rotating body aggregate to may include a suspension to be able to absorb more shocks. The rotating body aggregates 1o coupled together in a front-back direction can also be utilized.

Furthermore, in the above-described embodiment, the configuration where the cylindrical rotating body 10 has the motor 11, 13 has been illustrated. However, the present invention is not limited to this configuration. For example, as shown in FIG. 11, when the cylindrical rotating bodies 10 are coupled together in parallel, some of the cylindrical rotating bodies 10 may include no motor 11, 13 and may be driven to rotate by the other cylindrical rotating bodies 10 having the motor 11, 13.

The invention claimed is:

1. A flying apparatus comprising:
   a main body having an upper surface on which a load can be placed;
   a first cylindrical rotating body including a propeller;
   a second cylindrical rotating body including a propeller;
   a third cylindrical rotating body including a propeller;
   a fourth cylindrical rotating body including a propeller;
   a first coupling member including a rotating shaft and connecting the first cylindrical rotating body and the third cylindrical rotating body;
   a second coupling member including a rotating shaft and connecting the second cylindrical rotating body and the fourth cylindrical rotating body;
   a first base section coupling member provided near the main body which includes a rotating shaft and connects the third cylindrical rotating body and the main body;
   a second base section coupling member provided near the main body which includes a rotating shaft and connects the fourth cylindrical rotating body and the main body;
   a power source section; and
   a controller including an acceleration sensor, wherein rotation of the propellers of the first to fourth cylindrical rotating bodies generates thrust so that the flying apparatus can fly,
   wherein the first to fourth cylindrical rotating bodies include a built-in motor and an exterior body provided with the propeller that is configured to be rotated by the built-in motor, and
   wherein the controller has an ascension mode in which the first to fourth cylindrical rotating bodies are extended vertically by the first and second coupling members and the first and second base section coupling members, and a loading mode in which the first to fourth cylindrical rotating bodies are inclined outward by the first and second base section coupling members.

2. The flying apparatus according to claim 1, wherein the main body includes two width direction extendable mechanisms, the two width direction extendable mechanisms each allowing for adjusting a horizontal distance between the propellers.

3. The flying apparatus according to claim 1, wherein the main body includes two vertically extendable mechanisms, the two vertically extendable mechanisms each allowing for adjusting a vertical distance from the main body, and
   the controller is configured to automatically adjust extension and contraction of the vertically extendable mechanisms based on a signal from the acceleration sensor.

4. The flying apparatus according to claim 1, wherein the controller is configured to separately control the angles of the first to fourth cylindrical rotating bodies using the first and second coupling members and the first and second base section coupling members, and separately control rotation directions of the propellers to achieve switching between the ascension mode and a horizontal movement mode.

5. The flying apparatus according to claim 1, wherein the main body includes a housing section that is a space for housing a load.

6. The flying apparatus according to claim 1, comprising an attachment to be coupled to an external automobile, an external airplane, or an external ship, wherein
   horizontal thrust can be generated by inclining the propellers using the first and the second coupling members and the first and second base section coupling members.

7. The flying apparatus according to claim 1 that can also be utilized as a submarine boat.

8. The flying apparatus according to claim 1, comprising:
   a fifth cylindrical rotating body including a propeller;
   a sixth cylindrical rotating body including a propeller;
   a seventh cylindrical rotating body including a propeller;

an eighth cylindrical rotating body including a propeller;
a fifth coupling member including a rotating shaft and connecting the fifth cylindrical rotating body and the seventh cylindrical rotating body;
a sixth coupling member including a rotating shaft and connecting the sixth cylindrical rotating body and the eighth cylindrical rotating body;
a third base section coupling member provided near the main body which includes a rotating shaft and connects the seventh cylindrical rotating body and the main body; and
a fourth base section coupling member provided near the main body which includes a rotating shaft and connects the eighth cylindrical rotating body and the main body, wherein
the fifth to eighth cylindrical rotating bodies include a built-in motor and an exterior body provided with the propeller that is configured to be rotated by the built-in motor, and
the controller raises the first to eighth cylindrical rotating bodies using the first to fourth coupling members and the first to fourth base section coupling members in the ascension mode, and the first to eighth cylindrical rotating bodies are inclined outward by the first to fourth coupling members and the first to fourth base section coupling members in the loading mode.

9. The flying apparatus according to claim 8, wherein the controller is configured to separately control the angles of the first to eighth cylindrical rotating bodies using the first to eighth coupling members and separately control rotation directions of the propellers to achieve switching between the ascension mode and a horizontal movement mode.

10. The flying apparatus according to claim 8, wherein the main body includes a housing section that is a space for housing a load.

11. The flying apparatus according to claim 8, comprising an attachment to be coupled to an external automobile, an external airplane, or an external ship, wherein
horizontal thrust can be generated by inclining the propellers using the first to fourth coupling members and the first to fourth base section coupling members.

12. The flying apparatus according to claim 8 that can also be utilized as a submarine boat.

* * * * *